United States Patent [19]
Ramkumar et al.

[11] Patent Number: 6,154,877
[45] Date of Patent: Nov. 28, 2000

[54] METHOD AND APPARATUS FOR PORTABLE CHECKPOINTING USING DATA STRUCTURE METRICS AND CONVERSION FUNCTIONS

[75] Inventors: Balkrishna Ramkumar, Coralville, Iowa; Volker Strmupen, Boston, Mass.

[73] Assignee: The University of Iowa Research Foundation, Iowa City, Iowa

[21] Appl. No.: 08/911,908

[22] Filed: Aug. 15, 1997

Related U.S. Application Data

[63] Continuation-in-part of application No. 08/888,013, Jul. 3, 1997.

[51] Int. Cl.[7] .................................................. G06F 9/44
[52] U.S. Cl. ................................................................ 717/11
[58] Field of Search .............................. 395/704; 717/11

[56] References Cited

U.S. PATENT DOCUMENTS

| | | | |
|---|---|---|---|
| 5,146,460 | 9/1992 | Ackerman et al. | 371/23 |
| 5,440,726 | 8/1995 | Fuchs et al. | 395/82.18 |
| 5,530,802 | 6/1996 | Fuchs et al. | 395/182.15 |
| 5,583,988 | 12/1996 | Crank et al. | 395/185.01 |
| 5,590,277 | 12/1996 | Fuchs et al. | 395/183.14 |
| 5,630,047 | 5/1997 | Wang | 395/182.13 |

OTHER PUBLICATIONS

Myer, J.F., "On Evaluating the Performability of Degradable Computing Systems," IEEE Transactions on Computers, 29(8), pp. 720–731, Aug. 1980.

Deconinck et al., "Survey of Checkpointing and Rollback Techniques," Technical Report 03.1.8 and 03.1.12, ESAT–ACAA Laboratory, Katholieke Universiteit, Leuven, Belgium, Jun. 1993.

Elnozahy, et al., "A Survey of Rollback–Recovery Protocols in Message–Passing Systems," Technical Report CMU–CS–96–181, School of Computer Science, Carnegie Mellon University.

Beck et al., "Compiler–Assisted Checkpointing," Technical Report CS–94–269, University of Tennessee, Dec. 1994.

Elnozahy et al., "The Performance of Consistent Checkpointing," IEEE Symposium on Reliable and Distributed Systems, pp. 39–47, Oct. 1992.

Li et al, "CATCH—Compiler–Assisted Techniques for Checkpointing," International on Fault Tolerant Computing, pp. 74–81, 1990.

Li et al., "Compiler Assisted for Checkpointing," Software–Practice and Experience, vol. 24, No. 10, Oct. 1994.

Plank et al., "Libckpt: Transparent Checkpointing Under Unix," Proceedings of the Usenix Winter Conference, San Francisco, California, Jan. 1995.

Franz M. Kaashoek, "Code Generation on the Fly: A Key to Portabel Software," Ph.D. Thesis, Institute for Computer Systems, ECH Zurich, 1994.

J. Gosling, "The Java Language Environment," Technical Report, Sun Microsystems, Mountain View, California, 1995 (White Paper, http.//java.sun.com).

(List continued on next page.)

*Primary Examiner*—Tariq R. Hafiz
*Assistant Examiner*—Todd Ingberg
*Attorney, Agent, or Firm*—Fleshner & Kim, LLP

[57] ABSTRACT

A method and apparatus for portable checkpointing comprising the steps of: pre-compiling an input application source code and basic data type conversion functions; and outputting an associated output application source code and structure metrics and conversion function source code, wherein the output application source code includes support for portable checkpointing. The portability of the checkpoints allows migration between systems with different hardware, software, and operating systems. The present invention additionally provides a method and apparatus for conversion of data representations between a local machine format and a Universal Checkpoint Format (UCF) and a method for pointer handling, which involves transforming as absolute pointer into a machine independent offset and vice versa.

32 Claims, 44 Drawing Sheets

OTHER PUBLICATIONS

Theimer et al., "Heterogeneous Progress Migration by Recompilation," Proceeding of the 11$^{th}$ International Conference on Distributed Computing Systems, pp. 18–25, Jul. 1991.

Richards et al., "Blocking Entry Points in Message–Driven Parallel Systems," International Conference on Parallel Processing, Aug. 1995.

Zhou et al., "Heterogeneous Distributed Shared Memory," IEEE Transactions on Parallel and Distributed Systems, vol. 3, No. 5, pp. 540–554, Sep. 1992.

Seligman et al., "High–Level Fault Tolerance in Distributed Programs," Technical Report CMU–CS–904–223, Carnegie Mellon University, Dec. 1994.

"Tutorial on Lint" from Cornell Theory Center, Jul. 11, 1991.

"Portable Checkpointing and Recovery" Silva et al IEEE International Symposium, Aug. 1995.

"Portable Transparent Checkpointing for Distributed Shared Memory", IEEE International Symposium, Aug. 1996.

"The Performance of Consistent Checkpointing" Elnozacky et al NSF and Rice University, Dec. 1993.

"Compiler–assited Full Checkpointing" C.C. J. Li et al, John Wiley & Sons Ltd., Mar. 1994.

"Compiler–Assisted Checkpointing" Beck et al University of Tennessee, Dec. 1995.

CATCH—Compiler Assisted Techniques for Checkpointing Jim et al University of Illinois, Sep. 1990.

Libckpt: Transparent Checkpointing under Unix Plank et al. University Tennessee, Jan. 1995.

"A Survey of Rollback–Recovery Protocols in Message Passing Systems", Elnozahy et al. Carnegie Mellon, Dec. 1995.

"Code Generation On the Fly A Key to Portable Software", Franz et al. Doctor Thesis, Dec. 1994.

"Heterogeneous Distributed Shared Memory" Zhou et al. IEEE article, Sep. 1992.

"On Evaluating the Performability of Degradable Computing Systems", Meyers IEEE Transactions, Aug. 1980.

"Heterogeneous Process Migration by Recompilation", Theimer et al. IEEE, Jul. 1991.

"High–Level Fault Tolerance in Distributed Programs" Seligman et al. Carnegie Mellon, Dec. 1994.

"An efficient coordinated checkpointing scheme for multicomputers", Sharma et al. IEEE, Jun. 1994.

"Architecture of fault tolerant multiprocessor workstations" Banatre et al., Sep. 1989.

Portable and Fault–Tolerant Software Systems, Volker Strumpen IEEE, 1998.

ELMO:Extending (Sequential) Languages with Migratable Objects Compiler Support Richards, Ramkumar et al., 1997.

Portable Checkpointing for Heterogeneous Architectures, Ramkumar et Strumpen, 1997.

Performance Prediction for Portable Parallel Execution on MIMD Architectures, Chillariga et Ramkumar, 1995.

Performance Analysis of Task Migration in a Portable Parrellel Environment, Ramkumar et al, 1996.

ProperPLACE: A Portable Parallel Algorithm for Standard Cell Placement, Kim et al, Jun. 1994.

ProperSYN: A Portable Parallel Algorithm for Logic Synthesis, De, Ramkumar et al., Aug. 1992.

A Portable Parallel Algorithm for Logic Using Transduction, De, Ramkumar et al. IEEE, May 1994.

Distributed Last Call Optimization for Portable Parallel Logic Programming, Ramkumar, ACM, Sep. 1992.

ProperTEST:A Portable Parallel Test Generator for Sequential Circuits, Ramkumar et al. IEEE, May 1997.

```
typedef struct {          typedef struct {
  char    c ;               char    c;
  double  d;                int pad;
} cd_t;                     double d;
                          } cd_t;
```

FIG. 2

```
extern int checkpoint ( ) ;

main (int argc, char *argv[] ) {
 chkpt_main(argc, argv) ;
} chkpt_main(int argc, char *argv []) {
    int n, result;

n = atoi (argv [1]);
    result = fib (n);
} fib (int n) {
  if (n > 2)
     return (fib(n-1) + fib(n –2)) ;
  else {
    checkpoint ( ) ;
    return 1 ;
  }
}
```

FIG. 3

```
int fib (int n)
{
   unsigned long _SL_callid, _Sl_addr;
   int _SL_fun0 , _SL_fun1 ;

switch (_SL_chkptmode) {
      case (_SL_EXEC) : break ;
      case (_SL_RESTORE) :
         _SL_addr = s_stack. top;
         _SL_RESTORE_fib_0 ;
         _SL_CONVERT_fib_0(_SL_addr) ;
         switch(_SL_callid) {
            case (0); goto L_SL_call0;
            case (1); goto L_SL_call1;
            case (2); goto L_SL_call2;
         }
      case (_SL_RECOVER) ;
         _SL_addr = s_stack.top ;
         _SL_CONVERT_fib_0 (_SL_addr) ;
         _SL_RESTORE_fib_0 ;
         switch (_SL_callid) {
            case (0) : goto L_SL_call0 ;
            case (1); goto L_SL_call1;
            case (2); goto L_SL_call2;

```
        ⋮
        ⋮
        ⋮
      if (n > 2) {
        _SL_callid = 0 ;
L_SL_call0:
        _SL_fun0 = fib (n-1) ;
        switch (_SL_chkptmode) {
          case (_SL_EXEC) : break ;
          case (_SL_SAVE) : _SL_SAVE_fib_0;
              return 0;
        }

_SL_callid = 1;
L_SL_call1:
          _SL_fun1 = fib (n-2)
          switch (_SL_chkptmode) {
            case (_SL_EXEC) : break ;
            case (_SL_SAVE) : _SL_SAVE_fib_0;
                              return 0;
          }
        return _SL_fun0 + _SL_fun1;
      }
      else {
        _SL_callid = 2 ;
L_SL_call2:
          checkpoint ( ) ;
          switch (_SL_chkptmode ) {
            case (_SL_EXEC) : break ;
            case (_SL_SAVE) : _SL_SAVE_fib_0;
                              return 0;
          }
          return 1 ;
      }
}
```

FIG. 5

```
#define _SL_SAVE_fib_0 { \
*--( (unsigned long * ) s_stack.top) = _SL_callid; \
*--( (int * ) s_stack.top) = n; \
*--( (int * ) s_stack.top) = _SL_fun0; \
*--( (int * ) s_stack.top) = _SL_fun1; \
} define _SL_RESTORE_fib_0 { \
_SL_fun1 = * ( (int * ) s_stack.top) ++; \
_SL_fun0 = * ( (int * ) s_stack.top) ++; \
n = * ( (int * ) s_stack.top)++; \
_SL_callid = * ( (unsigned long * ) s_stack.top)++; \
} static __inline__ void _SL_CONVERT_fib_0(addr)
unsigned long addr;
{
_SL_conv_word(addr);      ( (int * ) addr)++;
_SL_conv_word(addr);      ( (int * ) addr)++;
_SL_conv_word(addr);      ( (int * ) addr)++;
_SL_conv_word(addr);      ( (unsigned long * ) addr)++;
}
```

FIG. 6

```
extern int checkpoint ( ) ;

chkpt_main ( )                    function1 (long *p)
{                                 {
   long  a [4];                       p += 1;
                                      checkpoint ( ) ;
   function1 (a) ;                    *p = 2;
}                                 }
```

FIG. 7

| System | plain [s] | instr. [s] | ovh [%] |
|---|---|---|---|
| HP 9000/705 /HPUX9.0 | 9.0 | 34.9 | 289 |
| HP 9000/715 /HPUX9.0 | 2.7 | 11.1 | 301 |
| i486DX475 / Linux | 20.0 | 38.0 | 90 |
| SPARCstation1+ / Sunos4.1 | 27.5 | 66.7 | 143 |
| SPARCstation20 / Sunos5.3 | 5.8 | 14.5 | 150 |

FIG. 17

| System | plain | instr | copy | local | NFS |
|---|---|---|---|---|---|
| i486/Linux | 0.71 | 1.09 | 2.26 | 6.54 | - |
| Sparc1+/4.1 | 0.59 | 1.78 | 2.43 | 5.78 | 21.76 |
| Sparc20/5.3 | 0.10 | 0.46 | 0.66 | 0.79 | 8.56 |

FIG. 18

|  | heat | matmult | prime |
|---|---|---|---|
| file | 1,061,208 | 4,546,420 | 10,836 |
| data/bss | 2,156 | 116 | 10,528 |
| heap | 1,058,884 | 4,546,148 | 20 |
| stack | 104 | 92 | 224 |

FIG. 19

| # of chkpts | UCCF compatible | | | UCCF incompatible | | |
|---|---|---|---|---|---|---|
| | $t_{chkpt}$ | ovh | $t_{rec}$ | $t_{chkpt}$ | ovh | $t_{rec}$ |
| 0 | 196.1 | 7 | 196.1 | 196.1 | 7 | 196.1 |
| 1 | 198.0 | 8 | 201.3 | 198.0 | 8 | 202.6 |
| 3 | 200.4 | 9 | 207.2 | 201.9 | 10 | 209.5 |
| 6 | 205.2 | 12 | 215.0 | 207.8 | 13 | 220.5 |
| 12 | 213.0 | 16 | 231.6 | 218.7 | 19 | 240.7 |
| 24 | 228.9 | 25 | 262.3 | 240.5 | 31 | 282.7 |
| 47 | 262.9 | 44 | 331.6 | 285.2 | 56 | 374.1 |
| 91 | 342.2 | 77 | 453.2 | 363.0 | 98 | 539.0 |
| 168 | 430.3 | 135 | 684.4 | 505.3 | 176 | 846.5 |
| 1000 | 1662.5 | 807 | - | 1996.5 | 990 | - |
| runtime without instrumentation: 183.2s | | | | | | |

| # of chkpts | UCCF compatible | | | UCCF incompatible | | |
|---|---|---|---|---|---|---|
| | $t_{chkpt}$ | ovh | $t_{rec}$ | $t_{chkpt}$ | ovh | $t_{rec}$ |
| 0 | 325.8 | 0 | 325.8 | 325.8 | 0 | 325.8 |
| 1 | 328.2 | 1 | 330.0 | 328.6 | 1 | 330.8 |
| 2 | 330.3 | 1 | 333.5 | 331.4 | 2 | 335.4 |
| 5 | 336.8 | 3 | 343.9 | 339.3 | 4 | 348.9 |
| 10 | 347.1 | 7 | 361.2 | 352.8 | 8 | 371.9 |
| 20 | 368.6 | 13 | 395.6 | 379.0 | 16 | 418.5 |
| 40 | 410.9 | 26 | 463.1 | 431.9 | 33 | 507.0 |
| 77 | 491.7 | 51 | 590.6 | 529.7 | 63 | 672.9 |
| 145 | 631.4 | 94 | 825.7 | 709.7 | 118 | 975.8 |
| 252 | 851.1 | 161 | 1201.6 | 1001.2 | 207 | 1460.8 |
| 1000 | 2441.6 | 649 | - | 2977.7 | 813 | - |
| runtime without instrumentation: 325.8s | | | | | | |

| # of chkpts | UCCF compatible | | | UCCF incompatible | | |
|---|---|---|---|---|---|---|
| | $t_{chkpt}$ | ovh | $t_{rec}$ | $t_{chkpt}$ | ovh | $t_{rec}$ |
| 0 | 62.1 | 0 | 62.1 | 62.1 | 0 | 62.1 |
| 1 | 62.3 | 1 | 62.7 | 62.5 | 1 | 62.8 |
| 3 | 62.6 | 1 | 63.7 | 62.7 | 1 | 64.1 |
| 7 | 62.9 | 2 | 65.8 | 63.4 | 3 | 66.7 |
| 15 | 63.8 | 3 | 69.9 | 64.9 | 5 | 71.9 |
| 30 | 65.6 | 6 | 77.6 | 67.5 | 9 | 81.5 |
| 59 | 68.8 | 11 | 92.5 | 72.7 | 18 | 100.2 |
| 1000 | 173.7 | 181 | - | 241.0 | 290 | - |
| runtime without instrumentation: 61.8s | | | | | | |

| System | MinTBC [s] | # of chkpts | without storing checkpoint to disk | | | | without storing checkpoint to local disk | | | |
|---|---|---|---|---|---|---|---|---|---|---|
| | | | UCF compatible | | UCF incompatible | | UCF compatible | | UCF incompatible | |
| | | | time | ovh | time | ovh | time | ovh | time | ovh |
| i486/ Linux (179.4s) | 32 | 5 | 456.2 | 154 | 443.0 | 147 | 565.5 | 215 | 566.5 | 216 |
| | 64 | 2 | 272.6 | 52 | 274.1 | 53 | 328.4 | 83 | 331.5 | 85 |
| | 128 | 1 | 215.0 | 20 | 218.5 | 22 | 235.1 | 31 | 235.4 | 31 |
| | 256 | 0 | 180.5 | 1 | 181.7 | 1 | 181.5 | 1 | 183.3 | 2 |
| Sparc1+/ Sunos4.1 (300.3s) | 32 | 9 | 314.7 | 5 | 332.6 | 11 | 382.7 | 27 | 412.4 | 37 |
| | 64 | 4 | 307.8 | 2 | 317.1 | 6 | 353.9 | 18 | 356.1 | 19 |
| | 128 | 2 | 306.0 | 2 | 311.5 | 4 | 330.2 | 10 | 340.5 | 13 |
| | 256 | 1 | 304.5 | 1 | 307.6 | 2 | 319.7 | 6 | 323.6 | 8 |
| | 512 | 0 | 302.9 | 1 | 303.8 | 0 | 303.3 | 1 | 302.6 | 1 |
| | | | storing checkpoint to local disk | | | | storing checkpoint via NFS | | | |
| | | | UCF compatible | | UCF incompatible | | UCF compatible | | UCF incompatible | |
| | | | time | ovh | time | ovh | time | ovh | time | ovh |
| Sparc20/ Sunos5.3 (62.8s) | 0 | 615 | 351.5 | 460 | 562.9 | 796 | - | - | - | - |
| | 1 | 61 | 91.5 | 46 | 112.0 | 78 | 1313.8 | 1992 | 1203.6 | 1817 |
| | 2 | 30 | 77.0 | 23 | 80.1 | 42 | 719.2 | 1045 | 632.3 | 907 |
| | 4 | 15 | 70.1 | 12 | 75.1 | 20 | 328.7 | 423 | 327.9 | 422 |
| | 8 | 7 | 67.6 | 8 | 68.7 | 9 | 185.7 | 196 | 202.3 | 222 |
| | 16 | 3 | 64.5 | 3 | 65.9 | 4 | 115.4 | 84 | 119.2 | 90 |
| | 32 | 1 | 63.5 | 1 | 63.8 | 2 | 79.6 | 27 | 79.1 | 26 |
| | 64 | 0 | 62.8 | 0 | 62.8 | 0 | 62.8 | 0 | 62.8 | 0 |

FIG. 21

| MinTBC [s] | i486/Linux | | | Sparc1+/Sunos4.1 | | | Sparc20/Sunos5.3 | | |
|---|---|---|---|---|---|---|---|---|---|
| | # of chkpts | time [s] | ovh [%] | # of chkpts | time [s] | ovh [%] | # of chkpts | time [s] | ovh [%] |
| 0 | 256 | 48.8 | 87 | 256 | 294.9 | 18 | 256 | 83.6 | 1.3 |
| 1 | 24 | 28.6 | 10 | 188 | 282.7 | 13 | 69 | 82.8 | 0.4 |
| 2 | 12 | 27.4 | 5 | 101 | 267.9 | 7 | 37 | 82.7 | 0.2 |
| 4 | 6 | 26.9 | 3 | 55 | 260.1 | 4 | 19 | 82.6 | 0.1 |
| 8 | 3 | 26.6 | 2 | 29 | 255.6 | 2 | 10 | 82.6 | 0.1 |
| 16 | 1 | 26.4 | 1 | 15 | 253.3 | 1 | 5 | 82.5 | 0.0 |
| 32 | 0 | 26.3 | 1 | 7 | 251.9 | 1 | 2 | 82.5 | 0.0 |
| 64 | | | | 3 | 251.1 | 0 | 1 | 82.5 | 0.0 |
| 128 | | | | 1 | 250.7 | 0 | 0 | 82.5 | 0.0 |
| 256 | | | | 0 | 250.5 | 0 | - | - | - |
| plain | - | 26.1 | - | - | 250.5 | - | - | 82.5 | - |

FIG. 22

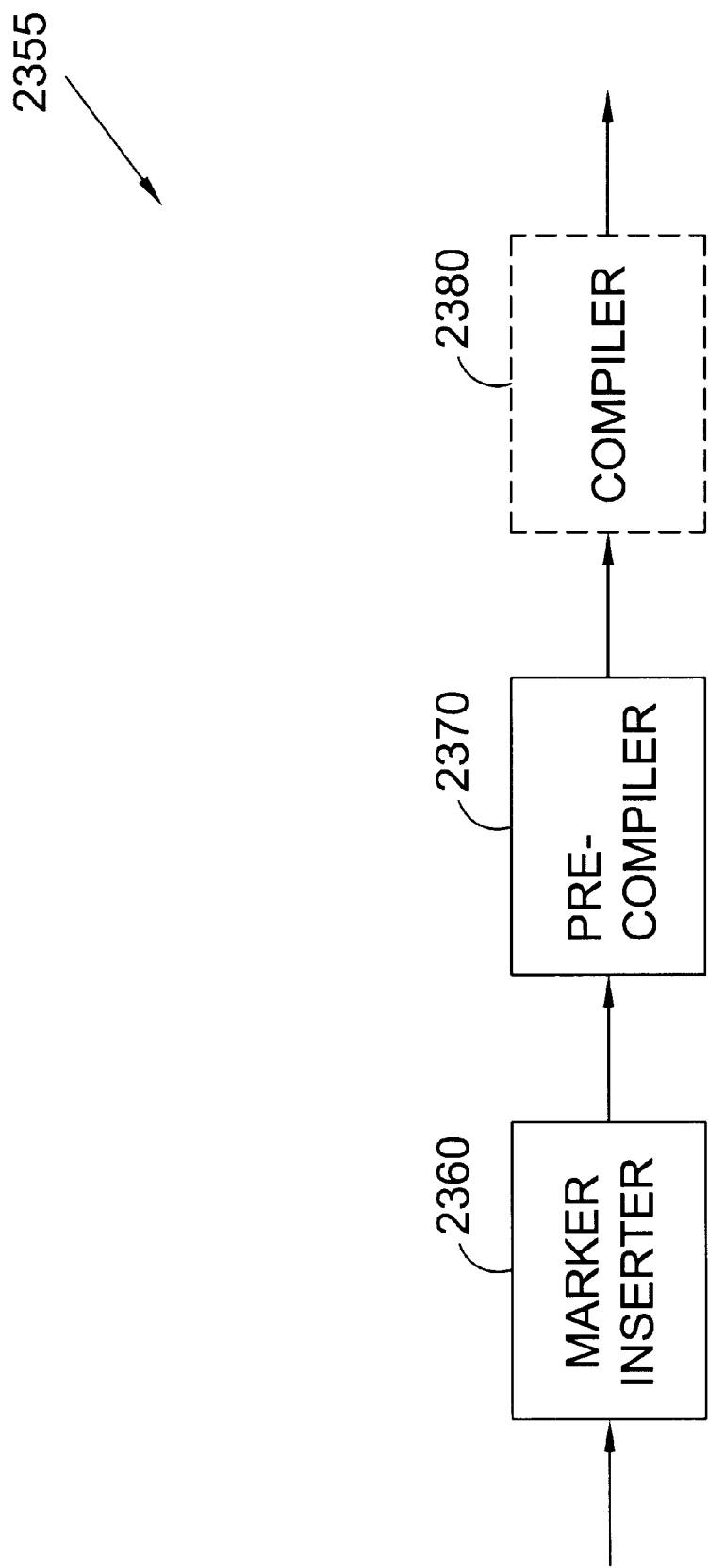

```
struct X {           struct Y {           struct Z {
  short s;             int i;               long long d;
} ;                  } ;                    struct X x;
                                            char c;
                                          } z;

struct Y *p;
struct timeval t;
```

FIG. 29A

```
typedef struct FieldMetric {            typedef struct StructMetric {
  int offset, size;                       int numfields;
  int ucfoffset, ucfsize;                 fieldmetric_t *m;
  int dim;                                int size, align;
} fieldmetric_t;                          int ucfsize, ucfalign;
                                        } structmetric_t;
```

FIG. 29B

```
struct X {          fieldmetric_t  fm[2] = {
  char x[2];          { 0, 1, 0, 1, 2 },
  double d;           { 4, 8, 8, 8, 1 }
} a[3];             };
                    structmetric_t X_metric =
                      { 2, fm 12, 4, 16, 8, ... };
```

METHOD AND APPARATUS FOR PORTABLE CHECKPOINTING USING DATA STRUCTURE METRICS AND CONVERSION FUNCTIONS

This invention is a continuation-in-part of application No. 08/888,013, entitled "A Method and Apparatus for Portable Checkpointing" which was filed on Jul. 3, 1997.

BACKGROUND OF THE INVENTION

1. Field of the Invention

This invention relates generally to a method and apparatus for portable checkpointing and specifically to a method and apparatus for pre-compiling user software, written in a general-purpose programming language, to enable portable checkpoints in a Universal Checkpoint Format (UCF).

2. Background of the Related Art

As Internetworking matures, worldwide distributed computing will become more prevalent. Simple probabilistic analysis suggests that such large geographically distributed systems will exhibit a high probability of single failures, even if each individual component is quite reliable. Due to the difficulties associated with programming such systems today, local area networks (LANs) are still used heavily for long running simulations. Even on such systems, failures occur frequently due to a variety of reasons including network failures, process failures, and even administration downtime. Thus, fault tolerance is fast becoming an essential feature for networked programming systems.

Large distributed systems are inherently heterogenous in nature. Even LANs today often consist of a mixture of binary incompatible hardware components and operate with an even larger variety of operating systems, or different versions of the same operating system. Providing fault tolerance in such environments is a key technical challenge, especially since it requires that checkpointing and recovery be portable across the constituent architectures and operating systems.

A checkpoint is the state of a computation, saved partway through its execution. A checkpoint can be restored and the computation can be recovered from that state. Portable checkpoints are machine independent checkpoints based on the automatic generation of checkpointing and recovery code.

The subject of checkpoints has been investigated by several researchers, especially in the field of fault tolerance. Unfortunately, no one has been able to develop the technology (software or otherwise) that provides for machine independent state generation and restoration for general-purpose programming languages.

In the present invention, a user software program is pre-compiled with a source-to-source pre-compiler before a native compiler generates the machine dependent object code. This object code may now generate portable checkpoints of the program state on a stable storage medium at a desired frequency. The checkpoint can be recovered on a binary incompatible machine, possibly with a different processor and operating system.

Some application areas of this technology are support of fault tolerance in heterogeneous computer networks, migrating processes to binary compatible machines for load balancing or load redistribution, suspension of execution of a program for subsequent execution at a later time on a possibly different configuration of machines, or retrospective diagnostics and debugging.

This method provides a cheap and cost-effective solution to computationally intensive problems where dependability is critical, either because a quick response time is essential, or because failures result in higher operation costs. Important application areas include e.g., air-traffic control, battlefield virtual realty simulation, hardware design, and VLSI design and test. Current technology requires companies (e.g., IBM, Intel, Boeing) to invest heavily in replicated hardware, or spend substantial effort and time running long and complex simulations to identify and debug flaws and potential weaknesses in their product designs.

The problem of reliability in computing systems has been studied in many different forms. The evaluation of the performability of degradable computing systems was first addressed in a seminal paper by Myer, J. F. On evaluating the performability of degradable computing systems, *IEEE Transactions on Computers*, 29(8):720–731, August 1980.

Reliable computing has also received attention in the context of parallel and distributed systems, ranging from hardware and/or interconnection network-specific solutions, language specific solutions, algorithm-specific solutions to application-specific solutions. A good survey of checkpointing and rollback techniques can be found in: (1) Deconinck, G. Vounckx J., Cuyvers R., Lauwereins R., Survey of Checkpointing and Rollback Techniques. Technical Report 03.1.8 and 03.1.12, ESAT-ACAA Laboratory, Katholieke Universiteit, Leuven, Belgium, June 1993 and (2) Elnozahy E. N., Johnson D. B., Wang Y. M. A Survey of Rollback-Recovery Protocols in Message-Passing Systems. *Computing Surveys*, 1996. (submitted), Also Technical Report CMU-CS-96-181, School of Computer Science, Carnegie Mellon University.

There has also been work in optimizing the checkpointing and recovery process. Beck M., Plank J. S., Kingsley G. Compiler-assisted checkpointing. Technical Report CS-94-269, University of Tennessee, December 1994. submitted to FTCS 95. Beck et al classify checkpointing optimizations into two categories: latency hiding optimizations and memory exclusion optimizations. Latency hiding optimizations make a copy of the checkpoint in main memory and overlap the task of writing the checkpoint to stable storage with useful computation. Compression algorithms have been used to reduce the amount of data to be checkpointed, although it has been shown that compression is only beneficial in systems exhibiting contention for secondary storage.

Memory exclusion optimizations include incremental checkpointing, compiler-assistance to reduce the frequency and volume of checkpoints, and user-directed checkpointing. The use of hardware support to identify memory pages that have changed since the last checkpoint has been proposed (Elnozahy E. N., Johnson D. B., Zwacnepoel W. The performance of consistent checkpointing. *IEEE Symposium on Reliable and Distributed Systems*, pages 39–47, October 1992). These pages are then copied to secondary storage using copy-on-write while program execution continues. While yielding very low checkpointing overhead, a primary disadvantage of this method is that is restricted to binary compatible hardware and operating systems.

The use of compilers to assist in the checkpointing process was first proposed by Li and Fuchs (Li C-C. J., Fuchs W. K. CATCH—Compiler-assisted Techniques for Checkpointing. In *International Symposium on Fault Tolerant Computing*, pages 74–81, 1990 and Li C-C J., Stewart E. M., Fuchs W. K. Compiler Assisted Full Checkpointing. *Software—Practice and Experience*, 24 no. 10:871–8861, October 1994), where the compiler identifies points in the program where checkpoints may potentially be taken, and heuristics are used to determine which of these checkpoints will be activated. Beck et al propose extensions to the transparent libckpt library for automatic uniprocessor checkpointing. They support compiler directives that may be provided by the programmer (or a static analyzer) to optimize the frequency of checkpointing and the amount of information that needs to be checkpointed, by identifying memory that can be excluded from being checkpointed. This work does not address portability.

Elnozahy et al (Elnozahy E. N., Johnson D. B., Zwaenepoel W. The performance of consistent checkpointing. In *IEEE Symposium on Reliable and Distributed Systems*, pages 39–47, October 1992) and Plank et al Clank J. S., Beck M., Kingsley G., Li K. Libckpt: Transparent Checkpointing under Unix. In *Proceedings of the Usenix Winter Technical Conference*, San Francisco, Calif., January 1995) have proposed efficient implementation techniques to minimize the overhead of checkpointing to few percent of the execution time, The techniques developed in these references rely on efficient page-based bulk copying and hardware support to identify memory pages modified since the last checkpoint, Unfortunately, these optimizations are restricted to binary compatible hardware and operating systems.

The issue of portability across heterogeneous architectures has been addressed in the language community (Franz M. Code generation on the Fly: A Key to Portable Software. PhD thesis, Institute for Computer Systems, ETH Zurich, 1994 and Gosling J. The Java Language Environment. Technical Report, Sun Microsystems, Mountain View, Calif., 1995. white paper. Languages like Java provide an interpreter-based approach to portability where the program byte code is first "migrated" to the client platform for local interpretation. Unfortunately, such methods severely compromise performance since they run at least an order of magnitude slower than comparable C programs. Another possibility is "compilation on the fly" which provides portability by compiling the source code on the desired target machine immediately prior to execution. This technique requires the construction of a complex language environment. Moreover, to date neither interpreter-based systems nor compilation on the fly are explicitly designed to support fault tolerance.

The idea of stack mobility has been explored by researchers in a limited context. Theimer and Hayes (Theimer M. M., Hayes B. Heterogeneous Process Migration by Recompilation. In *Proceedings of the 11th International Conference on Distributed Computing Systems*, pages 18–25, July 1991) present a recompilation-based approach to heterogeneous process migration. Their compilation technique is to, upon migration, translate the state of a program into a machine independent state. Then, a migration program is generated that represents the state, and can be compiled on a target machine. When run, the machine independent migration program recreates the process. Rather than compiling a migration program each time that a checkpoint is to be taken, the present method instruments the original program with code that barely affects the runtime during normal execution. This avoids the overhead of compiling a migration program and is conceptually much simpler. Furthermore, Theimer and Hayes make several assumptions including one that "the state of a program at any migration point is sufficiently well-specified to allow its complete translation between machine-dependent and machine-independent forms." What constitutes a migration point, and how this program state is identified and translated are not discussed.

Richards and Ramkumar (Richards, R. J., Ramkumar B. Blocking Entry Points in Message-Driven Parallel Systems. In *International Conference on Parallel Processing*, August 1995) report the transformations needed to support runtime stack mobility for small tasks in a portable parallel language called ELMO. The technique relied on explicit programmer support for marshaling and unmarshalling complex data structures. The transformations were developed for task migration in portable parallel programming environments for homogeneous networks and did not discuss fault tolerance or checkpointing.

Zhou et al (Zhou S., Stumm M., Li K., Wortman D. Heterogeneous Distributed Shared Memory. *IEEE Transactions on Parallel and Distributed Systems*, 3 no. 5:540–554, September 1992) describe the Mermaid system for distributed shared memory on heterogeneous systems. This system is not fault tolerant, but generates data representation conversion routines automatically for all shared memory objects. This paper provides a detailed treatment on conversion. A major difference from the present invention is the conversion code generation for complex data types. Whereas Mermaid uses "utility software" to generate this code, the present invention utilizes the information provided by the abstract syntax tree to this end. Another design decision of Mermaid is the dedication of a page of memory to a particular data type. Although the authors defend this method in the context of dynamically allocated shared memory, such an organization is clearly impractical for the runtime stack, which has to be converted too when saving a checkpoint. Moreover, the poor data locality caused by this data organization is likely to result in a significant loss in performance.

Seligman and Beguelin (Seligman E., Beguelin A. High-Level Fault Tolerance in Distributed Programs. Technical Report CMU-CS-904-223, Carnegie Mellon University, December 1994) have developed checkpointing and restart methods in the context of the Dome C++ environment. Dome provides checkpointing at multiple levels, ranging from high level user-directed checkpointing that sacrifices transparency for portability and low overhead, to low level checkpointing that is transparent but results in non-portable code and requires larger checkpoints. Dome's checkpointing is designed for portability, but requires that the program be written in the form of a main loop that computes and checkpoints alternately. This obviates the need to store the runtime stack. Our approach, on the other hand, provides a general mechanism to save the runtime stack.

Smith and Hutchinson (Smith P., Hutchinson N. C., Heterogeneous Process Migration: The Tui System, Technical report, Department of Computer Science, University of British Columbia, Vancouver BC V6T IZ4, Canada) address the problem of migration of tasks across incompatible architectures using a scheme that translates the binary image of a process from one machine representation to another. In Tui, when a process is selected for migration, a migout process is called to checkpoint the process. The checkpoint state is converted to an intermediate form and sent to the target machine. On the destination machine, a migin process creates a new process and translates the intermediate form into the local representation. It assumes that type information is available for the data segment on the destination machine. In order to achieve this, the language compiler is modified to obtain location and type information needed by migin and migout. The complexity of compiler modification led the authors to choose the Amsterdam Compiler Kit (ACK) over more widely used compilers like gcc. Moreover, ACK had to be modified in a machine dependent manner to effect the migration. Unlike the present invention, the Tui system is only designed for programs compiled using the ACK compiler and is limited to the target machines supported by this compiler.

In contrast to these other methods, our invention presents a novel method and apparatus for portable checkpointing in heterogeneous network environments. Programs can be checkpointed on one machine running UNIX, and transparently recovered on a machine with different byte-ordering and data-alignments. The present invention provides a new, efficient portable checkpointing and recovery mechanism that provides both portable program execution as well as fault tolerance in heterogeneous environments.

The above references are incorporated by reference herein where appropriate for appropriate teachings of additional or alternative details, features and/or technical background.

SUMMARY OF THE INVENTION

The present invention provides a method of portable checkpointing in which a source-to-source pre-compiler is used to pre-compile the source code of a user program into a semantically equivalent program with the additional functionality to save and recover from portable checkpoints.

More specifically, the present invention provides a method and apparatus for conversion of data representations between a local machine format and a Universal Checkpoint Format (UCF) and a method for pointer handling, which involves transforming an absolute pointer into a machine independent offset and vice versa.

The method and apparatus according to the present invention, called shadow checkpointing, uses extensive compiler and run-time support to provide migratable checkpoints and heterogeneous recovery across all UNIX-based workstations and personal computers. It is demonstrated, through appropriate testing, that shadow checkpoints are robust across architecture, operating system as well as compiler variations across target platforms. Furthermore, the overhead of providing shadow checkpointing is very low making it both viable and practical.

Most of the results presented in relation to the present invention relate to C programs, although this idea can be extended to other programming languages such as C++, Java, and Fortran. The flexibility afforded by pointers provides the real technical challenge when supporting portable checkpointing. It is assumed that any program under consideration for shadow checkpointing has been written in a portable manner. In other words, it is assumed that the program can be compiled and executed to yield the desired result on any of the heterogeneous platforms under consideration without modification.

An object of the present invention is to provide a method for machine independent (e.g., PCs, Workstations, etc) generation and restoration of checkpoints for generalpurpose programming languages (e.g., C, C++, Fortran).

An additional object of the present invention is to provide a Universal Checkpoint Format (UCF) which can be optimized for particular computing platforms and operating systems.

Another object of the present invention is to provide a general and extensible method for conversion of data representations between the local machine format and the UCF.

An additional object of the present invention is to provide a method for pointer handling which involves transforming an absolute pointer into a machine independent offset and vice versa.

Another object of the present invention is to provide a method for portable checkpointing which is transparent to the programmer and which can be applied to legacy code for which source code is available.

An additional object of the present invention is to provide a method for portable checkpointing having low runtime overhead and low memory and disk overhead.

An advantage of the present invention is that the method provides fault tolerance in heterogeneous computer networks.

An additional advantage of the present invention is that it provides a cost effective solution to computationally intensive problems in which dependability is critical.

Another advantage of the present invention is that it allows the migration of processes to binary incompatible machines for load balancing or load redistribution, suspension of execution of a program for subsequent execution at a later time on a possibly different configuration of machines, or retrospective diagnostics and debugging.

A feature of the present invention is a Universal Checkpoint Format (UCF) which to can be optimized for particular computing platforms and operating systems.

An additional feature of the present invention is the applicability of the method to any general-purpose programming language.

Another feature of the present invention is heterogeneous recovery that makes it possible to write a checkpoint on one architecture, and read it during recovery on a possibly different architecture.

These and other objects, advantages, and features can be accomplished in accordance with the present invention by provision of a method for portable checkpointing comprising the steps of pre-compiling an input application source code and basic data type conversion functions; and outputting an associated output application source code and structure metrics and conversion function source code, wherein the output application source code includes support for portable checkpointing.

Additional objects, advantages, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 shows UCF padding of source code according to an embodiment of the invention.

FIG. 3 shows a recursive program, fib, to compute Fibonacci numbers according to an embodiment of the invention.

FIG. 4 shows the jump table generated at the entry of function fib according to an embodiment of the invention.

FIG. 5 shows the function call wrappers generated in the body of function fib according to an embodiment of the invention.

FIG. 6 shows compiler generated code for saving, restoring, and converting the variables in function fib according to an embodiment of the invention.

FIG. 7 shows a code fragment illustrating the shadow checkpointing method, according to one embodiment of the invention, with call by reference.

FIG. 17 shows the overhead of code instrumentation for fib, according to an embodiment of the invention.

FIG. 18 shows the runtimes of different systems without checkpoint instrumentation (plain), with instrumentation but without storing a single checkpoint (instr), saving one checkpoint specified by using an appropriate timer value— on the shadow stack without writing it to disk (copy), saving one checkpoint on the shadow stack and writing it to a local disk (local) and via NFS to a remote disk (NFS), according to an embodiment of the invention.

FIG. 19 shows checkpoint sizes and break-downs for example applications, according to an embodiment of the invention.

FIG. 21 summarizes the runtimes and overheads for the checkpointed dense matrix-matrix multiplications of two dense 615×615 matrices without failures, according to an embodiment of the invention.

FIG. 22 shows the results of running prime without failures on the first 10,000,000 natural numbers with a grain size of 250, according to an embodiment of the invention.

FIG. 23B shows an apparatus of pre-compiling input source code and outputting an output source code which includes support for portable checkpointing, according to a preferred embodiment of the invention.

FIG. 29A shows an example to illustrate the dependency analysis method, according to a preferred embodiment of the invention.

FIG. 29B shows a simplified form of structure metric, according to a preferred embodiment of the invention.

DETAILED DESCRIPTION OF PREFERRED EMBODIMENTS

Figure 1:
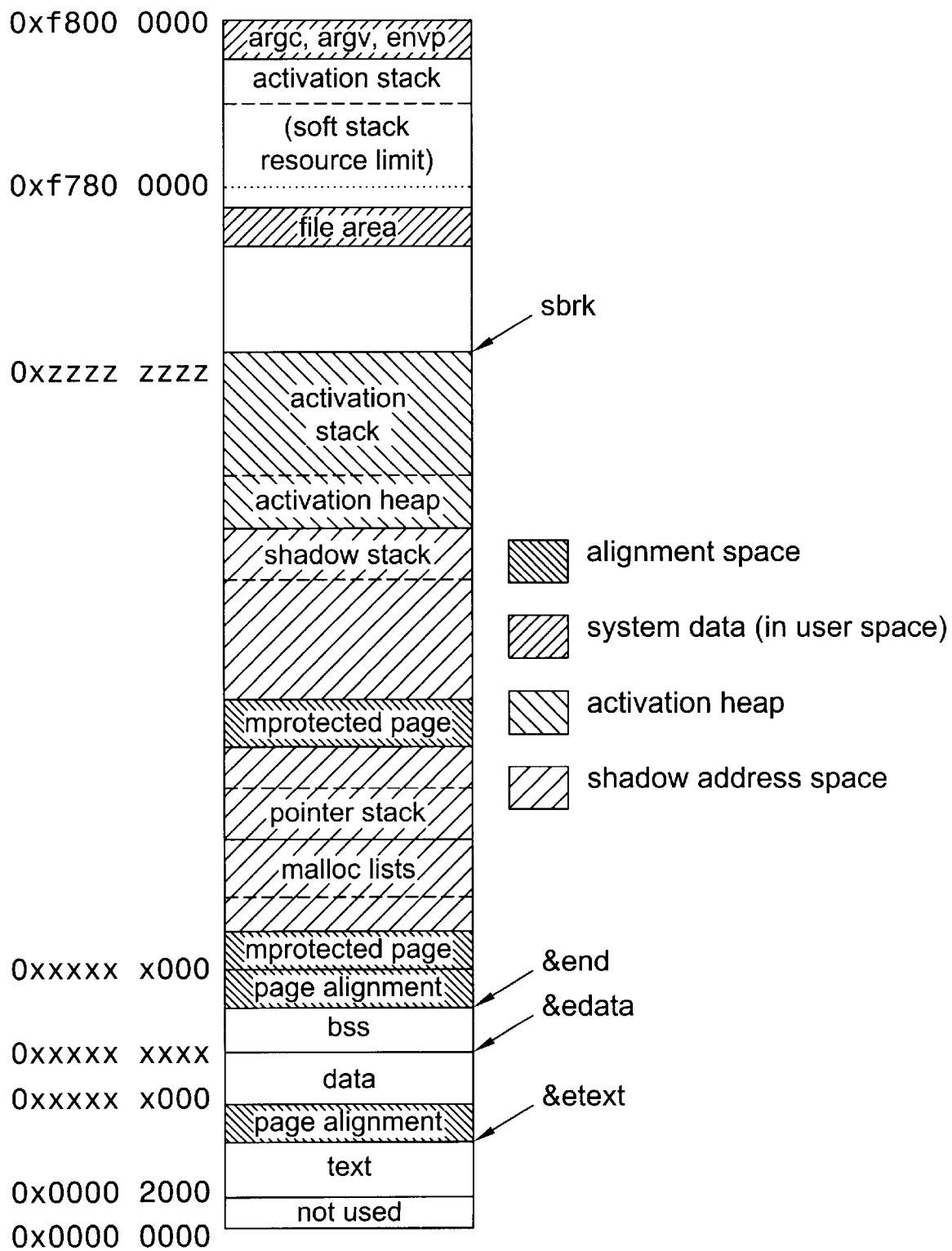
FIG. 1 shows an example of the organization of a typical shadow address space according to an embodiment of the invention.

Some of the concepts related to this invention are disclosed in the following two reports by the inventors: Volker Strumpen, Balkrishna Ramkumar, *Portable Checkpointing and Recovery in Heterogeneous Environments*, Dept. of Electrical and Computer Engineering, University of Iowa, Technical Report No. 96-6-1, June 1996 and B. Ramkumar and V. Strumpen, *Portable Checkpointing for Heterogeneous Architectures*, Proceedings of the 27th Fault-Tolerant Computing Symposium, Jun. 25–27, 1997. Both of these reports are incorporated herein by reference.

Recent advances in networking and architecture design are making workstations and personal computers omnipresent. The arrival of the next generation of personal workstations will only serve to increase this trend. Their low cost and easy availability make workstation networks scalable and, in all likelihood, the parallel processing systems of the future.

A direct consequence of this wide availability and use is the wide variation in computing environments in use today. Such networks are typically heterogeneous and support a variety of processor and operating system configurations. Moreover, it is possible to find two or more workstations on a network with identical hardware configurations running different operating systems or different versions of the same operating system. Finally, each workstation typically presents the programmer/user with a choice of compilers, which are typically incompatible with each other. Compilers impose their own differences during the creation of stack frames, handling of procedure calls, etc. On machines that are not binary compatible, programs need to be compiled separately for different machines, and no assumptions can be made about compiler compatibility during checkpointing and recovery.

This diversity in platforms makes it very difficult to recover from failure on one machine on a different machine on the network. Providing fault tolerance in such environments presents two key challenges: (a) migratable checkpoints: a universal checkpoint format (LJCF) that is generated and recognized by every architecture, and (b) heterogeneous recovery that makes it possible to write a checkpoint on one architecture, and read it during recovery on a possibly different architecture. This problem is broadly defined as portable checkpointing.

Besides fault tolerance, portable checkpointing also provides portable program execution together with the ability to migrate processes across the different platforms during program execution. This also allows for the interesting possibility of running each phase of a multi-phase computation on the machine best suited to it.

CHECKPOINTING PROPERTIES

For a checkpointing method to be commercially viable, it must exhibit the following properties:

Transparency: The programmer should not need to do more than use a different compiler and link in a library with the application object code in order to render the executable code fault tolerant. The pre-compiler should also be able to analyze and insert checkpoint requests at suitable points in the user code. Since users frequently run legacy codes, it is not reasonable to require them to specify where in the code checkpoints must be taken. The runtime system will use a timer to selectively exercise pre-compilergenerated checkpoint requests. This yields some interesting tradeoffs between the frequency of checkpointing and the mean time between failures (MTBF) on the target machine.

Portability: Checkpoints must be portable. Sometimes, it is necessary or desirable to recover a failed or interrupted computation on a different processor architecture. Upon failure, it is not reasonable to assume a binary compatible processor using the same operating system is always available.

Runtime Overhead: The overhead due to checkpointing must be minimized. If the overhead is unacceptably high, it may be more efficient to avoid checkpointing and simply rerun the application in the event of failure, The overhead on the overall execution time must be kept very low. The overhead will depend on the volume of data that will need to be checkpointed.

Memory overhead: The size of checkpoints must be minimal. On real systems, the available memory and disk space may affect both the ability to checkpoint, as well as the performance of checkpointing (due to increased swapping). The available memory may even limit the problem size of the program.

PORTABILITY OBSTACLES

In order to make checkpoints portable across different architecture-operating system configurations, it is necessary to identify and overcome several hurdles. The primary obstacles to portable checkpointing are as follows:

Architecture: The primary obstacle for portability is the variety of representation and sizes of basic data types and the data layout in memory.

Data representation: Although most recent architectures support the IEEE floating point standard 754, there is no agreement about implementing little endian and big endian memory addressing. Furthermore, the number of bits invested into the representation of basic data types varies, and is currently changing with the introduction of 64-bit architectures.

Alignment: Different memory architectures require different alignments. Since compiler writers tend to optimize space efficiency, alignment computations optimize the underlying memory, architecture to a certain extent. As a consequence, data objects can have different sizes on different architectures if the data representations are identical.

Hardware Support of Efficient Compilation: The number of registers available and related hardware support plays an important role in the organization of the runtime stack. On Sun workstations, the presence of register windows leads to a very different stack frame layout when compared to, for example, an HP workstation. As a result, the runtime stack layout varies from architecture to architecture.

UNIX (Operating System) implementation: Differences among UNIX implementations (BSD/System V) complicate checkpoint portability.

Address space: The address space, or memory layout, of a UNIX process is not portable. Besides the fact that different page sizes are used, the quasi-standard address space places the text and data/bss segments at the bottom and grows the heap segment upwards above these segments. The stack grows downwards from the address space. The HPUX operating system, on the other hand, divides the address space into four quadrants, places the text segment into the first quadrant, data/bss and heap into the second, and grows the stack upwards starting near the middle of the second quadrant. Page-based checkpointing cannot provide portability across different address space layouts.

System calls: Different UNIX systems may provide access to the same functionality by means of different names (getpagesize/sysconf) or provide system calls with the same name but different functionalities (mprotect). Whereas some operating systems allow for protecting any page of a process's virtual address space at user level, some only provide this feature for memory-mapped areas. The later ones do not facilitate the implementation of page-based checkpointing methods.

Language features: Certain programming language features yield runtime behavior that is not portable.

Pointers into a process's address space are in general not portable when considering different architectures or different address space layouts.

Dynamic memory management is system specific, due to differences in allocation methods.

SHADOW CHECKPOINTING

As discussed earlier, it is desirable to transparently checkpoint a program at periodic intervals. The interval can be determined as a function of:

The mean time between Failures (MTBF). Assuming that the application is not responsible for the failure, for an application to converge toward successful completion, it is necessary that checkpointing frequency be higher than the expected failure frequency.

The recomputation required. The more frequently a program is checkpointed, the less the amount of computation loss. The computation loss is defined as the amount of the computation between the last checkpoint and the point of failure. It is important that this recomputation be reported as part of the cost of recovery. The size of the program data that needs to be checkpointed. If the checkpoints are very large, it is clearly desirable to checkpoint as infrequently as possible.

The design trade-offs in checkpoint and recovery methods involve both system and program properties. In particular, the mean time between failure (MTBF) can be viewed as a system property, assuming that the failure is not caused by the application program. On the other hand checkpoint size is primarily dependent on the program, and the points in the program execution where the checkpoint is taken. Therefore, the method distinguishes potential checkpoint locations of a program from checkpoints that are actually stored. Potential checkpoint locations are program specific and may be chosen by a pre-compiler or user in order to minimize checkpoint size. The optimal frequency of checkpointing depends on the underlying system's MTBF. Assuming that potential checkpoint locations are reached relatively often during MTBF, the minimum time between checkpoints (MinTBC) can be optimized based on the system's MTBF.

In general, at compile time it is not possible to determine the ideal location for each checkpoint. However, a pre-compiler may be able to determine good potential checkpoint locations with a view to minimize the checkpoint size. At run time, an optimal checkpointing frequency can be computed and used to selectively exercise some of these checkpoints in the event that the potential checkpoints are encountered relatively frequently.

In accordance with one embodiment of the invention, a portable checkpointing method provides (1) a mechanism to mark potential checkpoint locations, (2) timer-based control for selective activation of checkpoints. The first potential checkpoint marker encountered after the timer has expired is selectively activated. The timer is then reset following completion of the checkpoint.

In accordance with another embodiment of the invention, a source-to-source pre-compiler, c2ftc, translates C programs into fault tolerant C programs. This pre-compiler generates code for saving and recovering portable checkpoints to enable fault tolerance across heterogeneous architectures. The c2ftc pre-compiler instruments the source program based on potential checkpoint locations in the program specified by the programmer.

In a further embodiment, the pre-compiler automatically inserts checkpoint requests at pre-compile time. c2ftc maintains checkpoints in a Universal Checkpoint Format (UCF), a machine independent format which is customizable for any given configuration of heterogeneous machines by specifying basic data types including byte order, size, and alignment. Other representation issues such as the encoding of denormalized numbers can be handled by supplying architecture specific conversion routines. Once generated, these checkpoints can be restored on binary incompatible architectures.

The c2ftc pre-compiler represents an approach to portable checkpointing based on source-to-source pre-compilation. This approach represents an elegant solution to three key problems:

Preservation of program semantics: Source-to-source transformations guarantee that program semantics remain invariant, because they are target independent.

Availability of type information of program data during checkpointing: In order to generate conversion code, type information for all variables declared in the program must be available.

Portable runtime support: The approach permits the choice of fault tolerance transformations that do not expose architecture dependencies, thereby enabling portable runtime support.

Source-code level transformations, i.e. pre-compiling the original source code, can provide portability, where system-based approaches would become very complex or even fail. For example, in order to capture the state of the stack at the system level, not only do program counter, stack pointer, and other architecture specific states need to be saved, knowledge of compiler-specific behavior is also necessary. The stack frame layout must be known in order to associate type information with corresponding memory locations to effect conversion of data representations. Some compilers do not reserve stack space for variables stored in registers. In such cases, a system-based approach would also have to provide support for saving and restoring register contents across machines with potentially different register sets. It is unclear how portability could be provided in such situations.

Moreover, source-to-source pre-compilation provides opportunities for additional optimizations that cannot be exploited by system-based methods such as:

1) It is possible to perform live variable analysis at pre-compile time and reduce the amount of data that needs to be checkpointed.
2) Pre-compile-time analysis can be used to identify potential checkpoint locations in a program to reduce checkpointing overhead.
3) Pre-compile-time analysis can be used to support garbage collection of the heap at run time before checkpoints are taken.

c2ftc applies transformations for fault tolerance to the abstract syntax tree of a C program. These transformations involve analysis, minor changes to the source code such as moving function calls out of expressions, and adding new code to effect portable checkpoints at the application level.

In the current embodiment, the user must specify potential checkpoint locations by inserting a call to the library function checkpoint. The frequency of checkpointing is controlled using a timer that activates checkpointing when the next potential checkpoint location is visited. Then, the state of the program is pushed onto the shadow stack, which is subsequently saved on stable storage. The shadow stack is maintained in the Universal Checkpoint Format (UCF). On UCF-incompatible machines, data are converted on-the-fly while pushing the state onto the shadow stack, and vice versa during recovery. The code for pushing and popping variables from the shadow stack as well as for conversion is pre-compiler generated.

PORTABILITY STRUCTURES

The following structures, shadow address space and Universal Checkpoint Format (UCF), are presented to support portable checkpoints, according to one embodiment of the invention:

1. Shadow address space is user-level partitioning of a process's virtual address space. Its functions are to (1) reserve memory for the shadow stack, which can be viewed as a marshaling buffer for the checkpoint, (2) support user-level heap allocation to simplify pointer resolution, and (3) provide performance optimization by using interrupts to handle shadow stack overflows.

FIG. 1 shows an example of the organization of a typical shadow address space. At the bottom are the text, data and bss segments, whereas the stack is aligned to the top of the address space. The heap area is used to allocate a sufficient amount of memory that holds the activation heap, the shadow stack and the data structures needed for managing memory and checkpointing. These include the pointer stack, explained below, and the malloc lists of our user-level memory management of the activation heap. To distinguish the runtime stack from the shadow stack, it is called activation stack in the following. The shadow stack is the central data structure for checkpointing. All variables defining the state of the program at the time of checkpointing are pushed onto the shadow stack. Eventually, the shadow stack holds the checkpoint in a contiguous area of memory, that can be transferred to stable storage.

The pointer stack and malloc lists are dynamic data structures. Write protected virtual memory pages are used to handle overflows efficiently. On systems that do not allow for write protecting virtual memory pages at user-level, overflow checks need to be included in the shadow stack and memory allocation operations.

Malloc lists are managed by a heap memory management method that maintains more information about a heap object than the operating system is necessary for checkpointing and recovering pointers. During program translation, functions are generated to explicitly save, convert and restore data in each stack frame, each dynamically allocated data type, and global data in the program. References to these functions are associated with each allocated memory block.

An important reason for introducing the shadow stack has been the fact that transferring a large checkpoint via a network is the most time consuming portion of checkpointing. Once the checkpoint is available on the shadow stack, communication latency hiding can be used to transfer the checkpoint and continue the computation at the same time.

The shadow address space is a user-level partitioning of a process's virtual address space. Its functions are to: (1) reserve memory for the shadow stack, which can be viewed as a marshaling buffer for the checkpoint, (2) support user-level heap allocation to permit efficient pointer resolution, and (3) provide performance optimization by using interrupts to handle shadow stack overflows.

The shadow stack is the central data structure for checkpointing. All variables defining the state of the program (e.g., global, dynamically allocated and automatic stack variables) at the time of checkpointing are systematically pushed onto the shadow stack. During the checkpointing process, pointer variables are translated into offsets to render them portable. During recovery, the offsets are replaced by the references to the original target. Eventually, the shadow stack holds the checkpoint in a contiguous area of memory, that can be transferred to stable storage.

The shadow stack essentially doubles the memory requirement of an application. One of several options to service memory, if the DRAM cannot hold the shadow stack, is to memory-map the shadow stack to local disk, trading checkpointing overhead for memory requirement. This will still be substantially faster than transferring a large checkpoint via a network which is the most time-consuming portion of checkpointing to date. Once the checkpoint is available on the shadow stack, copy-on-write methods or communication latency hiding, as disclosed in Strumpen V. Software-Based Communication Latency Hiding for Commodity Networks. In *International Conference on Parallel Processing*, August 1996, which is incorporated herein by reference, may be used to efficiently transfer the checkpoint and continue the computation at the same time.

2. Universal Checkpoint Format (UCF) specifies the layout of a portable checkpoint, such as header information and data segments, as well as the data representations and alignments used in the checkpoint. UCF data representations and alignments can be specified by the user. As such, UCF is an adaptable format that can be customized to particular networks. For example, data representations and alignments of the majority of available machines in the network can be chosen. Since UCFincompatible systems have to convert data types, UCF-incompatible systems pay a runtime penalty. The concept of UCF for portable checkpoints is similar to, but more flexible than, the external data representation (XDR) for remote procedure calls.

UCF is a flexible and adaptable format that can be customized to a particular network by specifying byte order, size and alignment of basic types, as well as complex data representations such as denormalized numbers. Typically, data representations and alignments of the majority of available machines in the network should be chosen as the UCF format to minimize the overhead of converting data types to and from the UCF format on UCF-incompatible systems. In evolving networks, the UCF format can be changed as frequently as necessary; this only requires that programs requiring checkpointing be recompiled before execution.

Alignment incompatibilities pose special problems on portability. Consider the example in FIG. 2. The size of structure cd_t on the left, depends on the data representations and alignment. For example, on both i486/Linux system and Sparc/SunOS system, a char consumes 1 byte and a double 8 bytes. However, on the former system, a double is 4 byte aligned leading to a structure size of 12 bytes, whereas a double on the later system is 8 byte aligned, yielding a structure size of 16 bytes. To cope with such alignment incompatibilities, the pre-compiler generates padding variables into the source code according to the UCF alignment. The declaration in FIG. 2 on the right introduces the integer pad for this purpose. The benefits of uniform structure sizes during checkpointing and recovery outweigh the possible loss of space efficiency incurred on all UCF-incompatible systems. All UCF data representations and alignments must be at least as large as the maximum values on all systems potentially being used. Data representation conversion, which happens on all systems incompatible to UCF, is done in-place on the shadow stack.

EXISTENTIAL VARIABLES

Reduction of checkpoint size and thus overall checkpointing overhead is based on the identification of the state of a program at a potential checkpoint location at pre-compile time. The state consists of the set of existential variables at a given potential checkpoint location. A variable is existential at a potential checkpoint location $1_c$, if it is assigned before $1_c$, and appears in an expression after $1_c$.

The basic method for saving the existential variables of the stack is to visit all stack frames, and save the existential variables specified at pre-compile time. For a portable implementation, only function call and return instructions can be used safely. Consequently, checkpointing the stack is implemented by returning the function call sequence, thereby visiting each individual stack frame, and restoring the stack by calling the same function call sequence again. This method allows for identifying existential variables at pre-compile time, accessing each variable individually rather than blockcopying the stack, and avoids non-portable implementations based on setjmp/longjmp pairs, as for example libckpt.

CHECKPOINTING METHODS

In accordance with a preferred embodiment of the invention, a method and apparatus for checkpointing the runtime stack will now be described. For simplicity, one can first consider only non-pointer variables on the runtime stack. The method can then be extended to support pointer variables.

The Stack

The basic approach for saving the variables on the stack is to visit each stack frame, and save its local variables identified at pre-compile time. A preferred embodiment would only save the live variables determined by data-flow analysis. The stack is checkpointed by returning the active function call sequence, thereby visiting each individual stack frame starting from the top of the stack down to the bottom. For each stack frame visited, the state of the local variables is pushed onto the shadow stack. The stack must then be restored by executing the original function call sequence again. c2ftc generates code to access each local variable by name rather than block-copying the stack. This eliminates problems caused by non-portable implementations based on setjmp/longjmp pairs, as for example used in libckpt, as disclosed in Plank, J. S., Beck M., Kingsley G., Li K. Libckpt:
Transparent Checkpointing under Unix. In *Proceedings of the Unix Winter Technical Conference*, San Francisco, Calif., January 1995 which is incorporated herein by reference.

In order to preserve the program's state while checkpointing, none of the program's statements may be executed. Therefore, the program must be instrumented with function calls and returns to visit each stack frame during checkpointing without affecting the semantics of normal execution. Pre-compile time analysis identifies function call sequences that can lead to a potential checkpoint location. All functions that lie in such a sequence are subject to instrumentation.

For each function requiring instrumentation, stack growth may happen in one of two modes: normal execution, or stack restoration. For the latter, it is necessary to supply a "computed goto" at the top of the function body that causes a jump to the next function call in the call sequence leading to the checkpoint location. This is accomplished by c2ftc by inserting a jump table with goto statements to each of the function calls in the function body that can lead to a potential checkpoint location.

Stack shrinkage may also occur in one of two modes: normal execution, or stack saving when an activated checkpoint location is visited. For the latter, it is necessary to provide a function call wrapper that will save variables in the current stack frame upon return from the function call, and then cause a return from the calling function to save its parent's fame.

FIG. 3 shows a recursive program to compute Fibonacci numbers. Functions main and checkpoint can be provided in a library. Here, main is supplied only to clarify the function call sequence. The application consists of the functions chkpt_main, which substitutes for the original function main by renaming, and function fib. It is assumed that a potential checkpoint location is specified within fib by means of a call to function checkpoint. c2ftc transforms function fib into the code shown in FIGS. 4, 5 and 6. Function main is transformed analogously.

The program may execute in one of four modes. This mode of execution is kept in the global state variable __SL__chkptmode.

Normal execution: During normal execution of the program the execution mode is set to __SL__EXEC. The jump table is skipped as shown in FIG. 4 and variable __SL__callid is assigned to encode the entry point into the function for use during the restore and recover phases as shown in FIG. 5.

Save phase: The variables of the stack frames are saved on the shadow stack. Value __SL__SAVE is assigned to __SL__chkptmode in function checkpoint before it returns. Then, the variables of the calling function are stored, and this function returns. This process is repeated until all stack frames on the call sequence between main and checkpoint are popped from the runtime stack. Local variables, including __SL__callid, are saved by macro __SL__SAVE_fib_0 given as shown in FIG. 6.

Restore Phase: The runtime stack, which has been destructed during the save phase, is reconstructed during the restore phase by re-executing the original call sequence from main to checkpoint. Value __SL__RESTORE is assigned to __SL__chkptmode in function main. Since more than one function call may lie on a call sequence to checkpoint, variable __SL__callid is used to identify which call is in the call sequence being restored, cf. FIG. 5. Local variables are restored by macro __SL__RESTORE_fib_0 as shown in FIG. 6.

Recovery phase: Recovery is almost the same as the restore phase. The only difference is that the variables have to be converted before they can be popped from the shadow stack, whereas during the restore phase they need to be restored, and then converted to be available in UCF representation on the shadow stack, cf. FIG. 4. The conversion function __SL__CONVERT_fib_0 is shown in FIG. 6.

Note that all variables on the runtime stack are accessed by name to push and pop them from the shadow stack as shown in FIG. 6. This renders the checkpointing code independent of differences in the organization of the runtime stack on different machines. Once the state of the runtime stack has been restored, the contents of the shadow stack is part of the checkpoint, which can be written to stable storage.

Pointers

The basic method for providing pointer portability is as follows—pointers are translated into displacements within the checkpoint. According to one embodiment of the invention, the displacement is computed relative to a point of reference on the shadow stack, e.g. the bottom of the shadow stack, or the current position of the pointer on the shadow stack. One possible implementation of this method step is described below.

Pointers are classified using two orthogonal categories: their target segments and the direction denoting the order in which the pointer and its target are pushed onto the shadow stack. The following target segments are common in UNIX environments, and have to be distinguished when treating pointers since segment addresses and sizes differ from target to target. In the UCF format, all pointer displacements are tagged to identify their target segments.

1. Stack pointer: The shadow stack offset is the displacement between the pointer address on the shadow stack and its target on the shadow stack.

2. Heap pointer: The shadow stack offset is calculated with respect to the bottom of the heap segment. The use of user-level memory management ensures that this offset is target invariant.

3. Data/bss pointer: The shadow stack offset is the displacement between the pointer address on the shadow stack and its target on the shadow stack.

4. Text pointer: These are function pointers or pointers to constant character strings in C. The latter do not require any special attention, because they will be available automatically after recovery. Function pointers are translated into a unique identifier assigned by the runtime system. According to another embodiment of the invention, both types of pointers are translated into a unique identifier assigned by the runtime system.

Pointers with these four targets can exist as automatic variables on the stack dynamically allocated variables on the heap, and as global variables in the data/bss segment. Note that the classification of pointers by their target segments permits the handling of pointer casting or the use of opaque pointers (e.g., void *) during parameter passing.

Pointers are also classified with respect to their direction relative to the order in which they are pushed onto the shadow stack:

1. Forward pointer: The pointer is pushed on the shadow stack before its target object.

2. Backward pointer: The pointer is pushed onto the shadow stack after its target object.

Call-by-reference parameters are pointers into an ancestor frame on the runtime stack. During execution, the stack frame (callee frame) containing a pointer passed as a parameter is always pushed onto the runtime stack after the caller's frame, During the save phase, the callee frame is pushed onto the shadow stack before the caller frame. Thus, all inter-frame pointers are forward stack pointers. Intra-frame pointers, on the other hand, may be either forward or backward stack pointers.

Stack Pointers

Forward and backward stack pointers must be treated differently when translating them into machine independent offsets. Accordingly, each will be considered separately starting with the forward stack pointer.

The conversion of a pointer into its portable offset, when it is saved on the shadow stack, is accomplished by introducing a temporary data structure called a pointer stack. The pointer stack keeps track of all pointers found on the runtime stack in order to effect its conversion into its corresponding offset. During the save phase, when a pointer is encountered, two actions are taken: (a) the pointer is copied onto the shadow stack, (b) its shadow stack address is pushed onto the pointer stack. This is necessary, because the location of the target on the shadow stack is not known yet.

During the restore phase, any object being restored to the runtime stack may potentially be the target of one or more pointers elsewhere on the runtime stack. When an object o is restored from address $A_o$, on the shadow stack, entries in the pointer stack are checked to see if the object is a pointer target. If so, for each such pointer on the pointer stack, the difference between the pointer's shadow stack address and the target shadow stack address $A_o$, is computed, and stored in the corresponding pointer stack entry.

Once the entire runtime stack has been restored, the computed displacements in the pointer stack are then written into the corresponding locations in the shadow stack, thereby overwriting the pointer target addresses with portable offsets.

Figure 8:
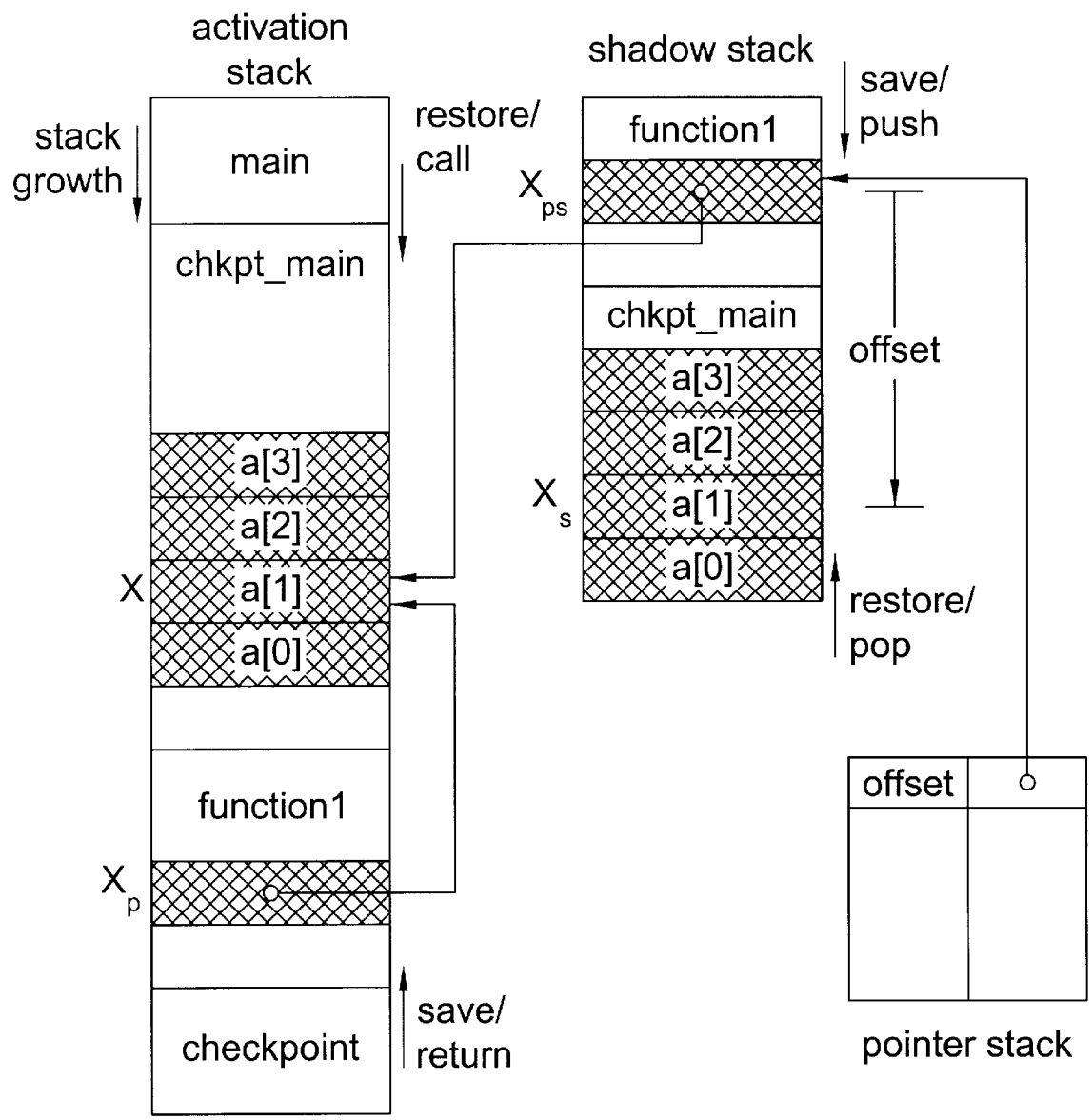
FIG. 8 shows checkpointing of the stack for the code fragment of FIG. 7 according to an embodiment of the invention.

As an example, consider the code fragment in FIG. 7 and the illustration in FIG. 8. During the save phase, the variables of functions, in particular pointer p, are pushed onto the shadow stack. In FIG. 8, p is stored on stack at $X_p$, and pushed into $X_{ps}$ on the shadow stack. At this time, a pointer to p's address on the shadow stack $X_{ps}$ is pushed on the pointer stack. Next, the frame of chkpt_main is pushed onto the shadow stack. In FIG. 8, the target address of p is the array element a[1], marked X, and its shadow $X_s$.

During the restore phase, the frame of chkpt_main is restored before the frame of functions. Before restoring array a, the pointer stack is checked for a reference into a on the stack. In this example, the pointer in $X_{ps}$ points to address X. Note that for arrays it is necessary to check that $X_{ps}$, lies within the address range of the array a. The shadow stack offset can be computed according to the rule:

offset=pointer target address—pointer address, where both addresses are shadow stack addresses. In FIG. 8, offset=$X_s$-$X_{ps}$. $X_{ps}$ is retrieved from the pointer stack. Determining $X_s$ requires some additional offset computation. The offset cannot be stored immediately in $X_{ps}$, because it holds the value of pointer p, which is needed, when restoring the stack frame of functions. Once the entire stack is restored, a sweep through the pointer stack copies the offsets into the addresses on the shadow stack. Offset $X_s$-$X_{ps}$, will overwrite the value of p in address $X_{ps}$.

Forward Stack Pointers

Figure 9:
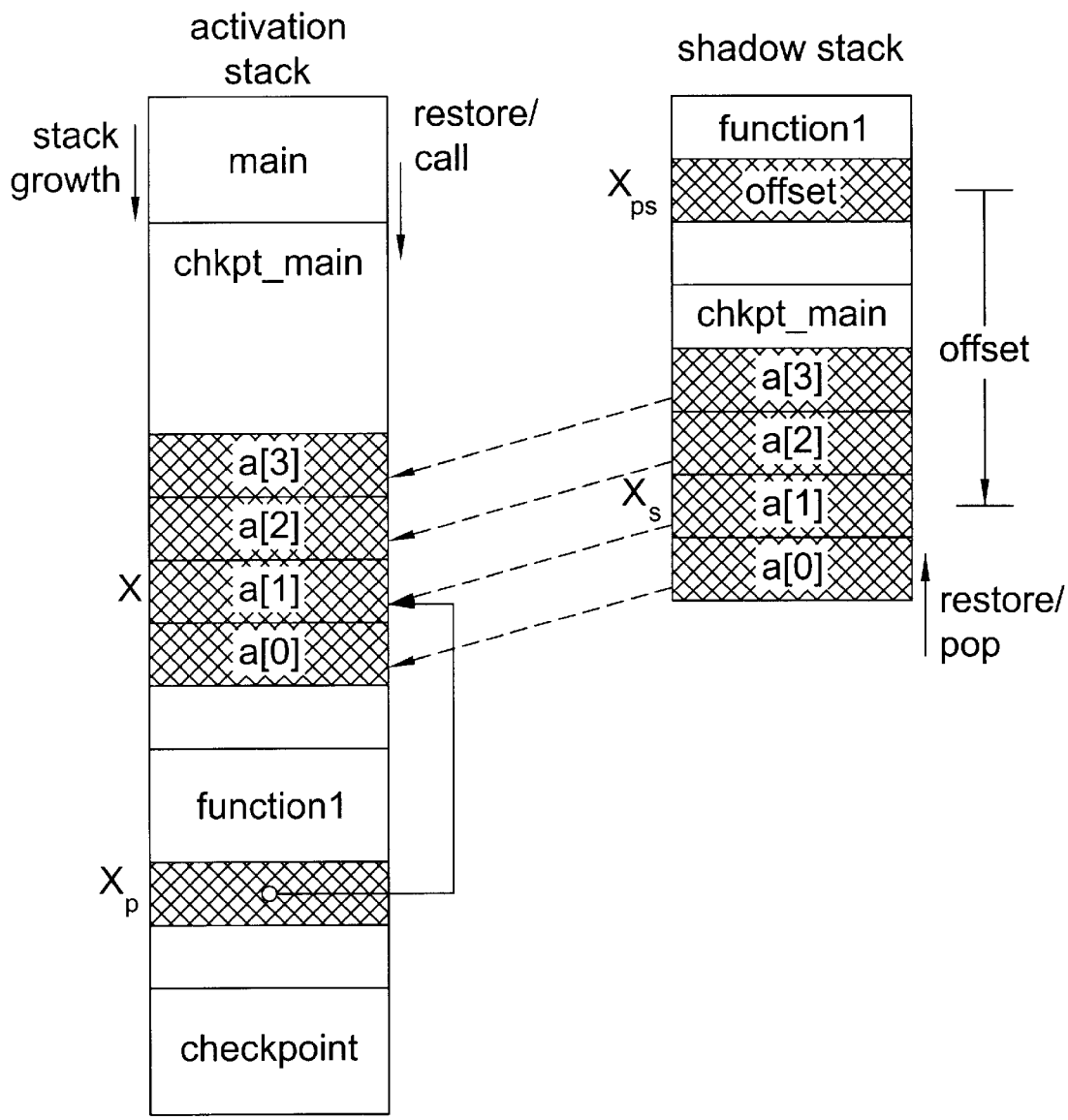
FIG. 9 shows recovery of the stack for the code fragment of FIG. 7 according to an embodiment of the invention.

Although recovery from a checkpoint is conceptually very similar to the restore phase, recovery of pointers presents a difference. All pointer offsets have to be transformed into virtual addresses again. Unlike the checkpointing transformation, this reverse transformation does not require a pointer stack. FIG. 9 illustrates the recovery from the checkpoint in FIG. 8.

Analogous to the restore phase, the shadow stack is restored from the top to the bottom, i.e., the frame of function chkpt_main is copied first. Note that a shadow stack pop operation affects an entire object. Array a is restored as a whole, not element-wise.

In order to recover forward pointers—here p to a[1]—the address of each object's element on the runtime stack is stored in its location on the shadow stack after the value of the element has been restored on the runtime stack; cf. broken lines in FIG. 9. This mapping is needed, when functions are restored. The frame of functions contains the offset to a[1] in address $X_{ps}$. Recovering pointer p involves the transformation of the offset into the pointer. This requires the lookup operation: p=[$X_{ps}$+[$X_{ps}$]]. The pointer can be found in the shadow stack address which is computed according to the rule:

pointer address=shadow pointer address + offset. This simple lookup is bought by saving the complete mapping of the restore target addresses on the runtime stack in the shadow stack. This expense is justified by the fact that recovery will be the infrequent case.

Backward Stack Pointers

The only backward pointers that might occur on the stack are intra-frame pointers. The number of backward stack pointers can be restricted to the case where the pointer target is another pointer by choosing the order in which variables are pushed on the shadow stack appropriately. c2ftc generates save and restore macros such that all non-pointer variables are saved after, and restored before, pointer variables. All pointers to non-pointer variables will then be forward pointers. Only a pointer pointing to another pointer may potentially be a backward stack pointer.

Figure 10:
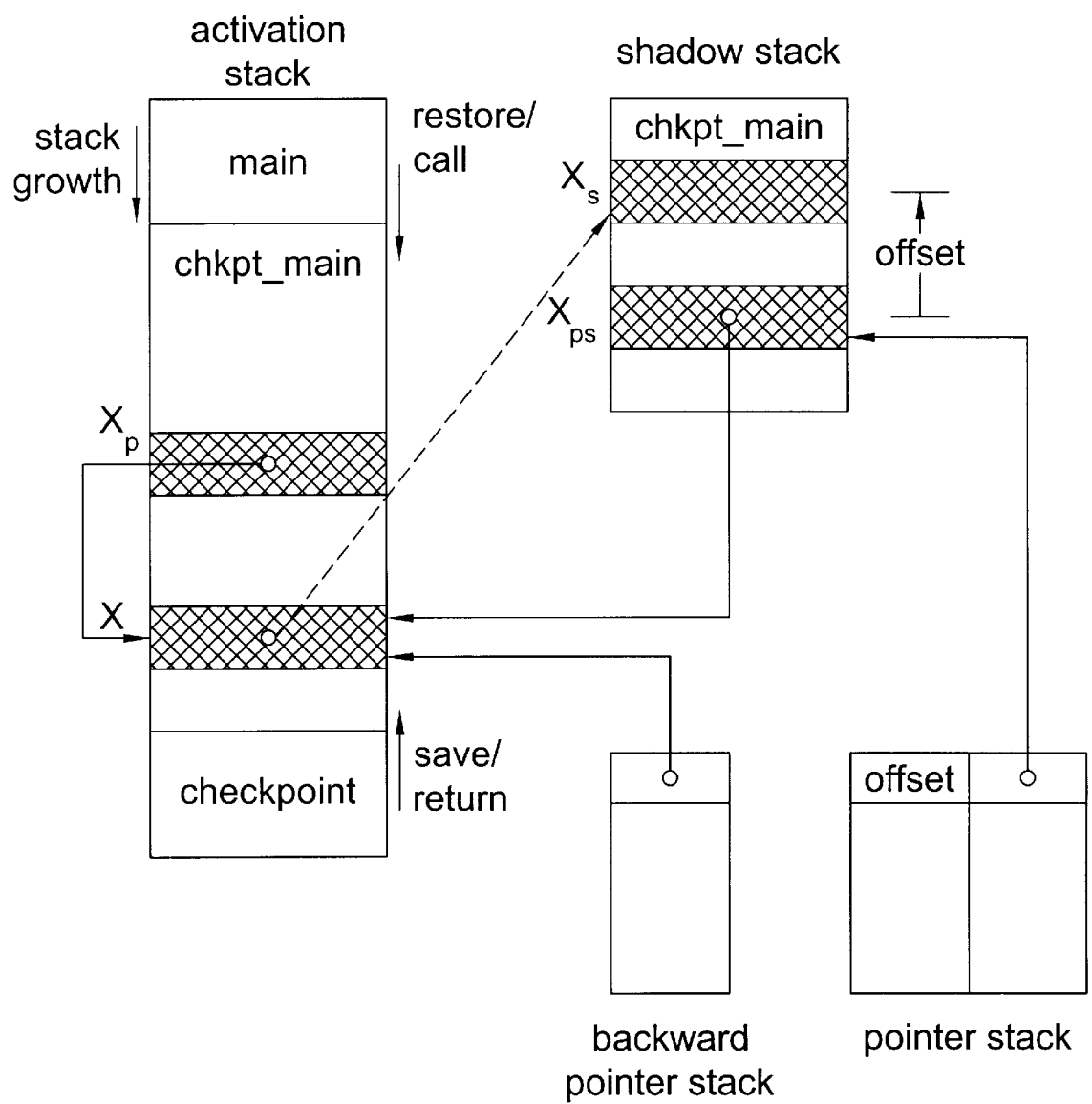
FIG. 10 shows checkpointing of backward pointers, according to an embodiment of the invention.

Checkpointing of backward pointers, according to an embodiment of the invention, is illustrated in FIG. 10, where $X_p$, is a backward stack pointer to X. To deal with backward pointers, the save method step presented thus far is modified as follows: for each stack frame, before saving any variables on the shadow stack, all pointer targets of backward pointers are saved in a data structure called the backwardpointer stack. In FIG. 10, X, the pointer target of backward stack pointer $X_p$, is pushed onto the backward pointer stack.

Objects are then copied onto the shadow stack as before. If the object is pointed to from the backward pointer stack, i.e., it is a backward pointer target, its address on the shadow stack is saved temporarily by overwriting the object on the runtime stack with its address on the shadow stack. In the example, the value of X becomes $X_s$. Next, when the backward pointer in $X_p$ is saved, its shadow address $X_{ps}$ is pushed onto the pointer stack. Furthermore, since the pointer can be recognized as a backward stack pointer by comparing its target address with its own address, the offset is calculated, and saved on the pointer stack. In the example, the offset is $[X_p]-X_{ps}=X_s-X_{ps}$.

The restore phase is the same as before except that it requires the additional step of restoring backward pointers from the backward pointer stack to the runtime stack. Finally, the pointer stack offsets are transferred to the shadow stack as described earlier. Recovery of backward pointers can be implemented similarly to that of forward pointers. However, the pointer stack is needed to store the pointer's shadow address until the target is visited.

The difference in the treatment of forward and backward stack pointers is the computation of the offset. Whereas the offset of forward pointers is computed during the restore phase, offsets of backward pointers can be computed during the save phase, because the pointer target has been copied before the backward pointer is visited.

Data/Bss and Heap-Located Stack Pointers

Figure 11:
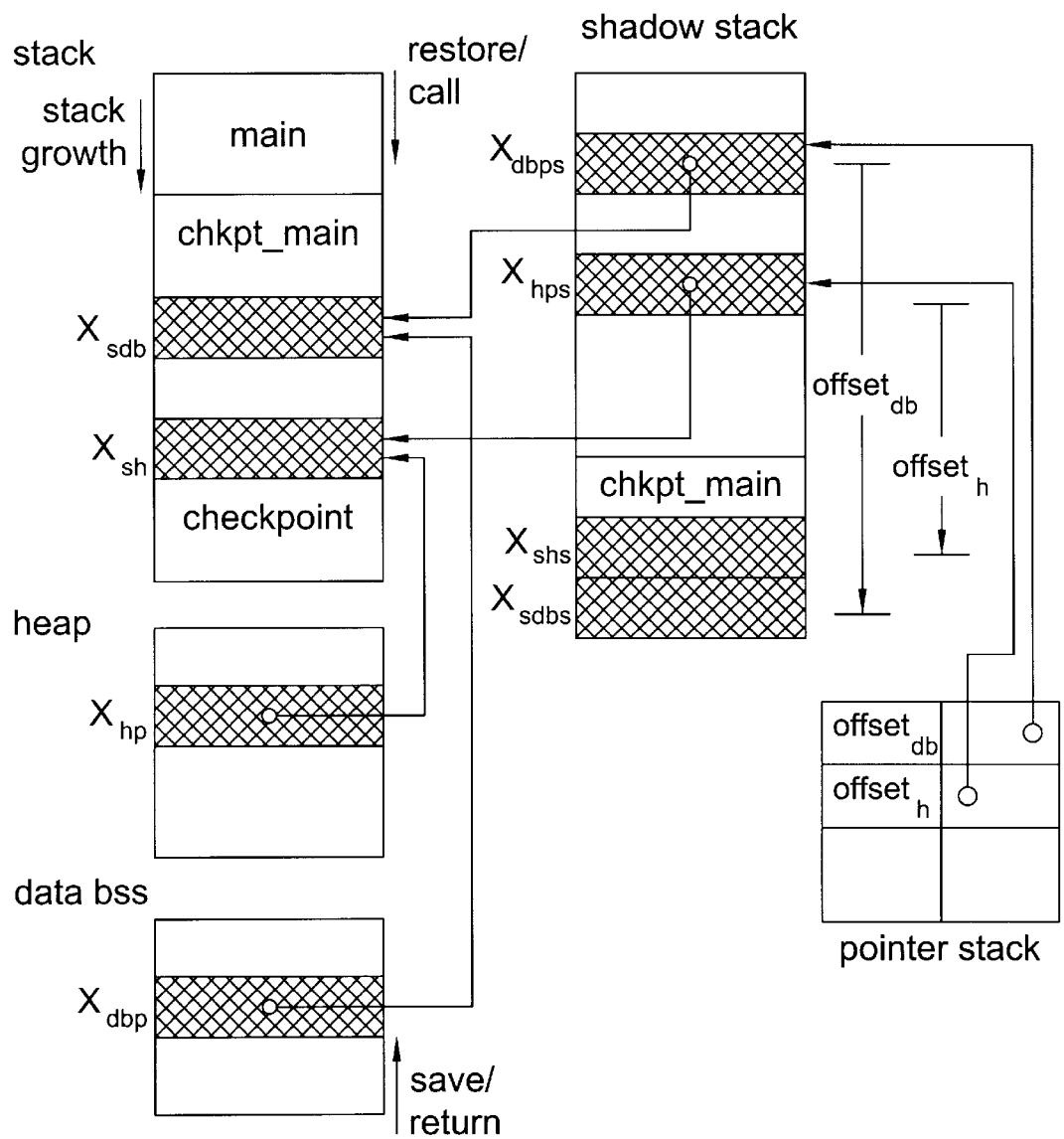
FIG. 11 shows checkpointing in the presence of forward stack pointers from heap and data/bss segments into the stack, according to an embodiment of the invention.

So far, the method has treated stack pointers located in the stack. Now consider stack pointers located in data/bss and the heap. FIG. 11 shows a stack pointer located in data/bss ($X_{dpb} \to X_{sdb}$) and a stack pointer located on the heap ($X_{hp} \to X_{sh}$). Since the order chosen to push segments onto the shadow stack is data/bss before heap before stack, both stack pointers are forward pointers. Forward pointers are resolved by means of a pointer stack analogous to the handling of stack pointers located in the stack as described above.

The following actions are added to the save and restore phases of the stack to handle the stack pointers in FIG. 11 located in data/bss and the heap:

Save phase: Additionally to saving the existential variables on the shadow stack, push pointers to the shadow copies of $X_{dbp}$ and $X_{hp}$ in $X_{dbps}$ and $X_{hps}$ onto the pointer stack.

Restore phase: When restoring stack pointer targets ($X_{sdb}$ and $X_{sh}$), calculate the corresponding offsets—the shadow stack pointer points to the target, used to recognize that the offset needs to be computed, and the pointer stack pointer to the pointer's shadow copy itself—and save them on the pointer stack. After the shadow stack has been restored, substitute the offsets for all pointers. In FIG. 11, assigned $X_{dbps} \leftarrow \text{offset}_{db} = X_{sdbs}-X_{dbps}$ and
$X_{hps} \leftarrow \text{offset}_h = X_{shs}-X_{hps}$.

Figure 12:
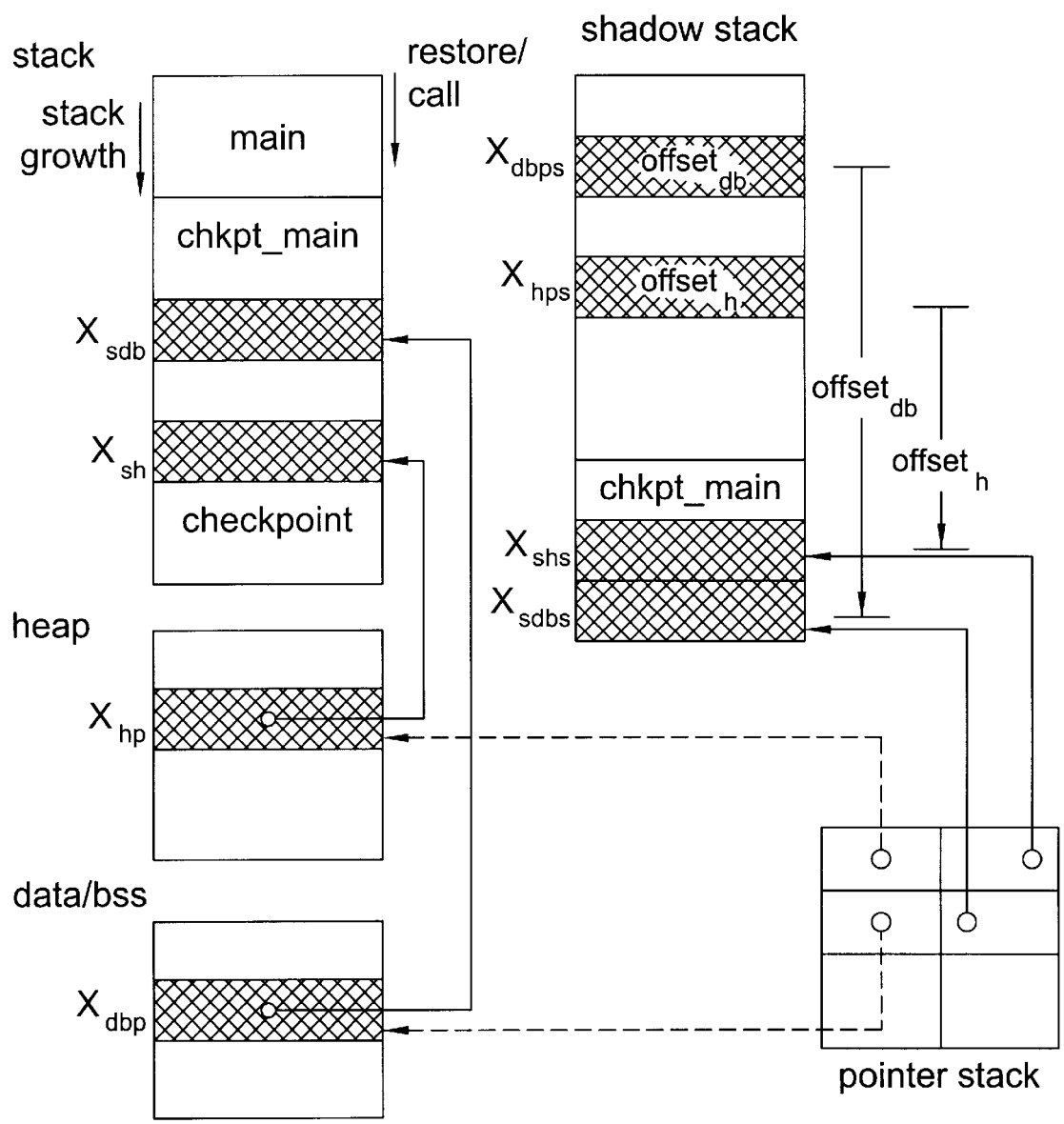
FIG. 12 illustrates recovery from the checkpoint for the stack pointers of FIG. 11, according to an embodiment of the invention.

Recovery from the checkpoint containing the stack pointers of FIG. 11 is illustrated in FIG. 12.

Restore phase: First, data/bss and heap segments are restored. When arriving at a pointer, i.e., the offset on the shadow stack, a pointer to the corresponding target as well as to the pointer's origin in the activation space, accessed by name, is pushed onto the pointer stack. For example, when arriving at address $X_{dbps}$ in FIG. 12, pointers to the origins of $X_{dbps}=X_{dbp}$ and $X_{sdbs}=X_{dbps}-[X_{dbps}]$, where $[X_{dbps}]=\text{offset}_{db}$, are pushed onto the pointer stack. $X_{hps}$ is handled analogously.

After an object is restored, the pointer stack is checked to find those pointers pointing to the object. Here, the pointer in $X_{dbps}$ and $X_{hps}$ are forward pointers, and can be resolved in an single phase, because the targets are visited after the pointers themselves. When restoring the shadow addresses $X_{shs}$ and $X_{sdbs}$, the pointers on the pointer stack indicate that these are pointer targets. Since the corresponding addresses on the activation stack can be accessed by name, the pointers in $X_{hp}$ and $X_{dbp}$, accessible from the pointer stack, are assigned these addresses ($X_{sh}$, $X_{sdb}$).

Heap Pointers

Unlike the stack, the heap does not require restoration. Furthermore, all heap objects are aligned according to the UCF convention, so that all heap offsets remain invariant. Therefore, the offset computation of heap pointers is as follows: the offset is the heap pointer target address minus the heap bottom address. The distinction between forward and backward pointers is redundant for heap pointers.

Figure 13:
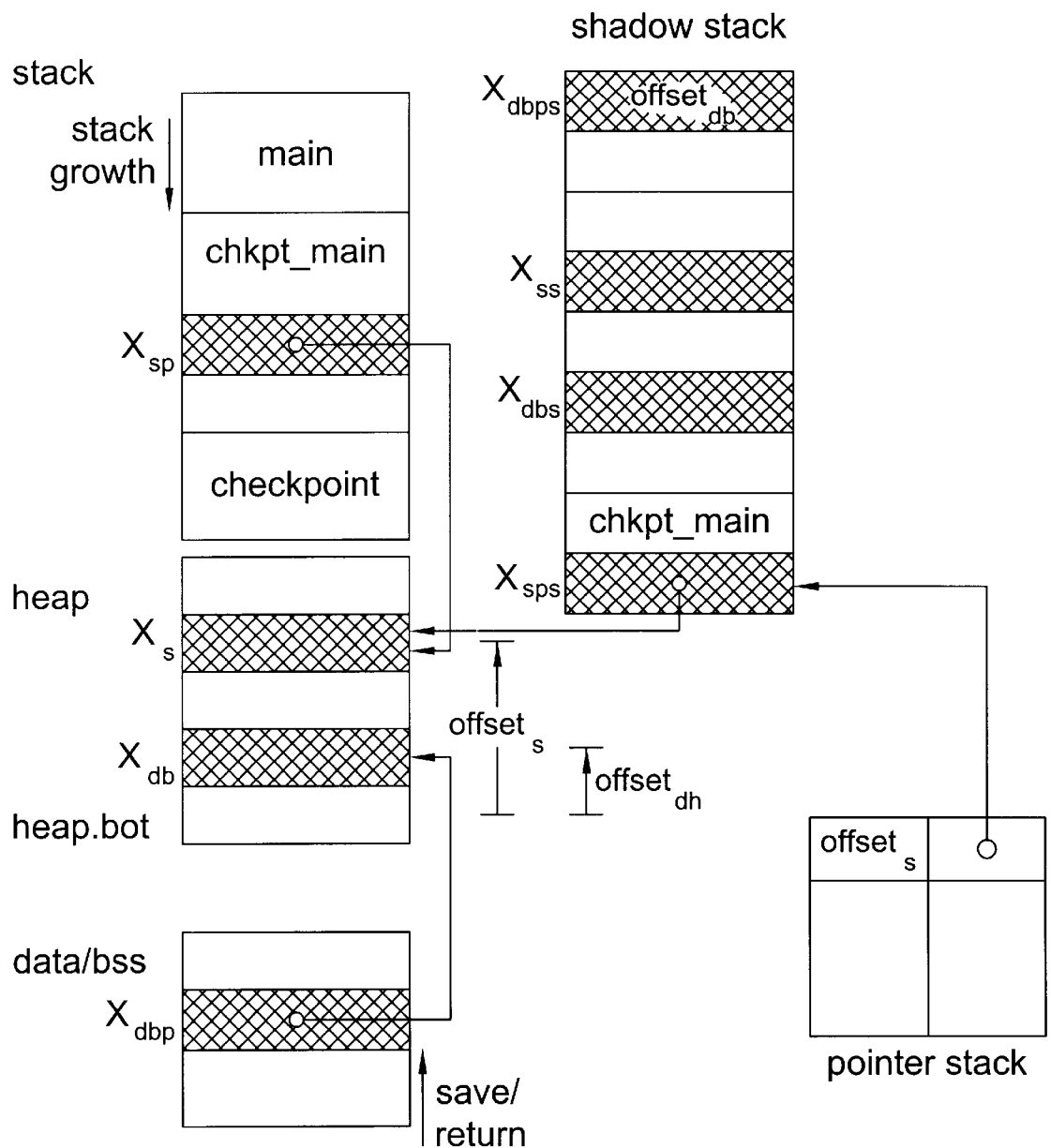
FIG. 13 shows the handling of heap pointers located in the data/bss segment and on the stack, according to an embodiment of the invention.

Instead of saving heap pointers located in the heap on the shadow stack, the offset can be saved immediately. The handling of heap pointers located in the data/bss segment and on the stack is illustrated in FIG. 13.

First, consider the heap pointer in the data/bss segment, located in address $X_{dbp}$, and pointing to $X_{db}$. Since the data/bss segment is pushed onto the shadow stack before the heap, all heap pointers in data/bss are forward pointers. However, since heap pointer offsets can be computed immediately when visiting the heap pointer, no pointer stack is required. In FIG. 13, the offset becomes $\text{offset}_{db}=X_{db}-\text{heap.bot}$, and is saved in $X_{dbps}$.

Next, treat the heap pointer in $X_{sp}$ on the stack. Since the stack needs to be restored, temporary storage is required for the offset that can be calculated during the save phase. This storage is provided by the pointer stack, as described above. During the save phase in the example, the offset that replaces the heap pointer shadow in $X_{sps}$ is computed $\text{offset}_s=X_s-\text{heap.bot}$ and saved on the pointer stack. After restoring the stack, the offset replaces the copy of the heap pointer in $X_{sps}$.

The simplicity of the heap pointer treatment is paid for by a less space efficient heap memory management, which requires UCF compatible alignment. Since UCF specifies the largest data representations and alignments existing in the network, all UCF incompatible architectures suffer from a less space efficient data layout. This trade-off is justified by the fact that architectures are converging and memory capacities are growing.

Recovery of heap pointers is reasonably simple, because the memory layout of the heap is invariant, based on UCF alignment. All heap pointers can be recovered immediately by adding the offset stored on the shadow stack to the heap bottom address.

Data/Bss Pointers

Like the heap, the data/bss segment does not require restoration, with the exception of pointer target addresses.

Unlike the heap, the data/bss segment may contain data that do not require checkpointing. For example, our runtime system provided in the shadow library, manages several book keeping tasks in the data/bss segment, resulting in a large amount of data that are not existential. Thus, analogous to the stack, the method only checkpoints the existential variables of the data/bss segment.

Since the data/bss segment is pushed onto the shadow stack before the heap and stack, all data/bss pointers located in the heap and stack are backward pointers. Since backward pointers can only be collected on the stack while saving the stack, the backward pointer stack cannot be built up before the save sweep. Consequently, the mapping from data/bss objects to their copies on the shadow stack must be saved when saving the data/bss segment. This is done by overwriting the word at the base address of the data/bss object with its shadow address (cf. broken lines in FIG. 14).

After the data/bss segment, the heap is saved. The data/bss pointer on the heap can be resolved immediately, because the data/bss shadow mapping is available $\text{offset}_h = [[X_{hp}]] - X_{hps}$ is saved in $X_{hps}$ of the shadow stack.

The data/bss pointer on the stack can be resolved during the save phase, because it is a backward pointer $\text{offset}_s = [[X_{sp}]] - X_{sps}$ is pushed together with a pointer to the pointers shadow in $X_{sps}$ onto the pointer stack. After the stack is restored, and during the pointer substitution sweep, the pointer on the shadow stack will be replaced by the offset.

Additionally, a restore phase is needed for the data/bss segment to copy the shadow values of all object base addresses back into the activation segment. Since the pointers to these values are stored in the base addresses, this substitution is straightforward, for example, $X_s \leftarrow [[X_s]]$.

Figure 15:
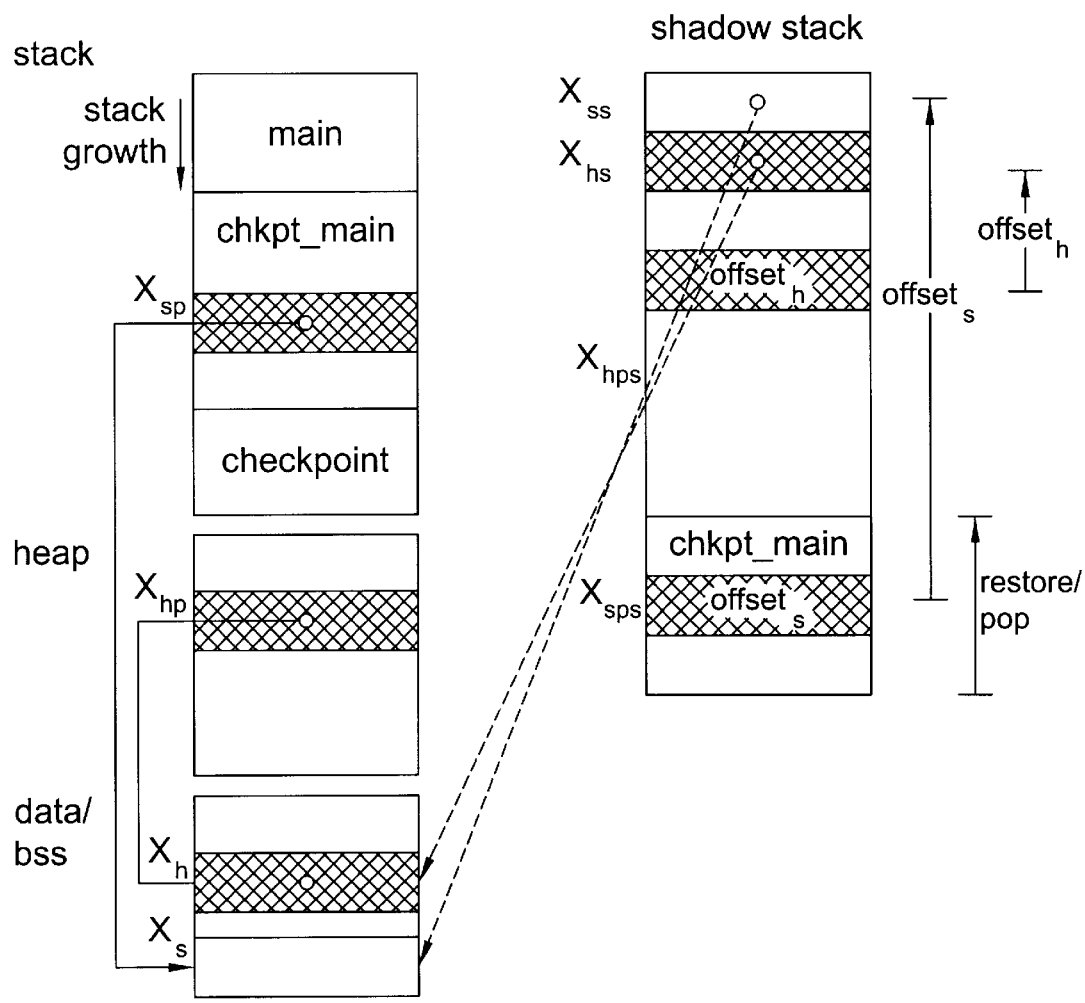
FIG. 15 shows recovery in the presence of data/bss pointers located on the stack and heap, according to an embodiment of the invention.

Recovery in the presence of data/bss pointers located on heap or stack is analogous to the recovery of stack-located stack pointers. Since the data/bss segment is restored first, pointer targets in data/bss cannot be recognized while restoring this segment. Consequently, the mapping from the data/bss shadow addresses to the activation addresses needs to be stored. This is done by overwriting the shadow stack values, as indicated by the broken lines in FIG. 15.

When restoring the data/bss pointers on the heap and stack, these pointers can be computed by means of the lookup operation: $X_{hp} \leftarrow [X_{hps} + [X_{bps}]]$ and $X_{sp} \leftarrow [X_{sps} + [X_{sps}]]$.

Figure 14:
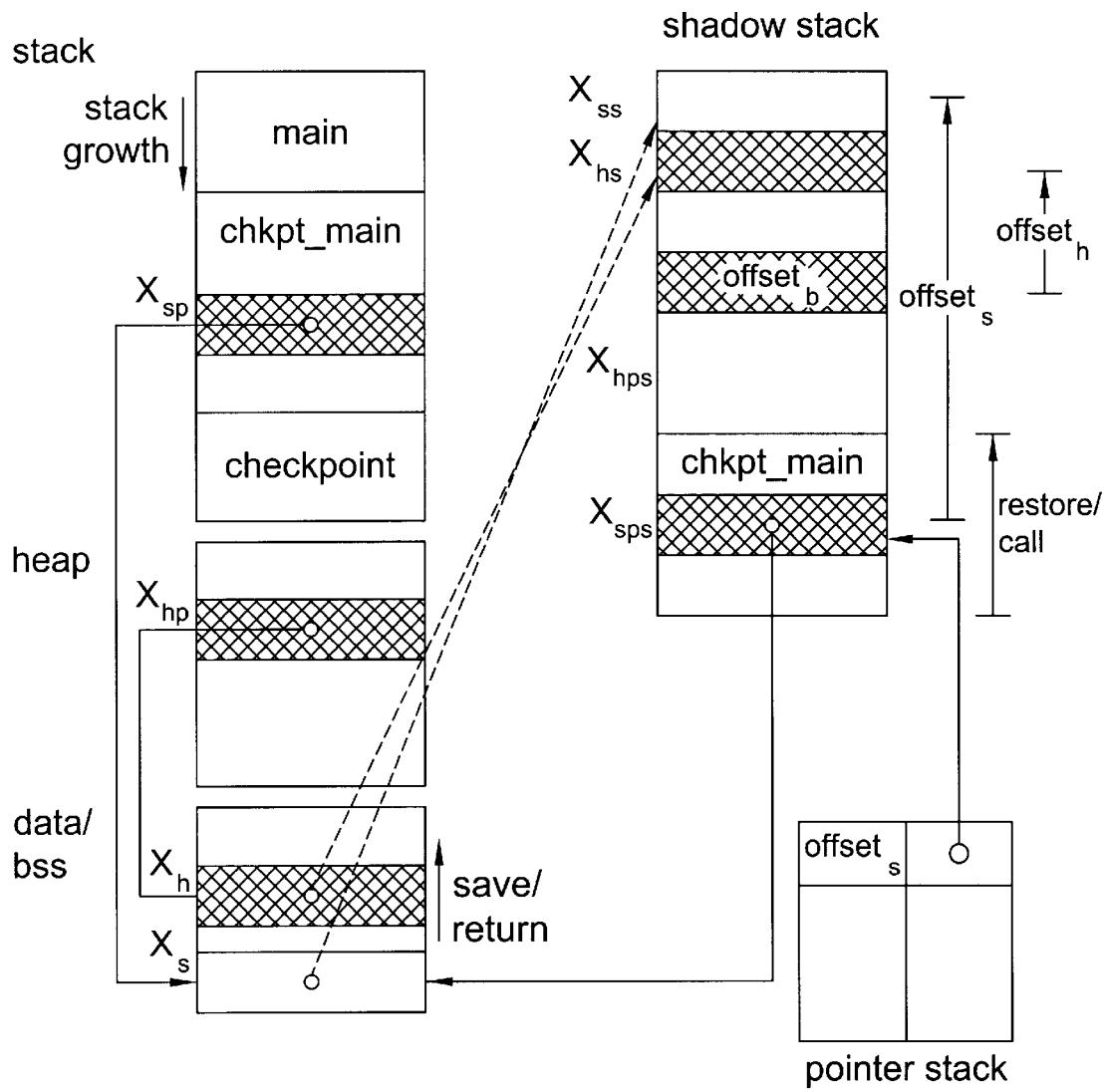
FIG. 14 shows checkpointing in the presence of data/bss pointers located on the stack and heap, according to an embodiment of the invention.
Figure 16:
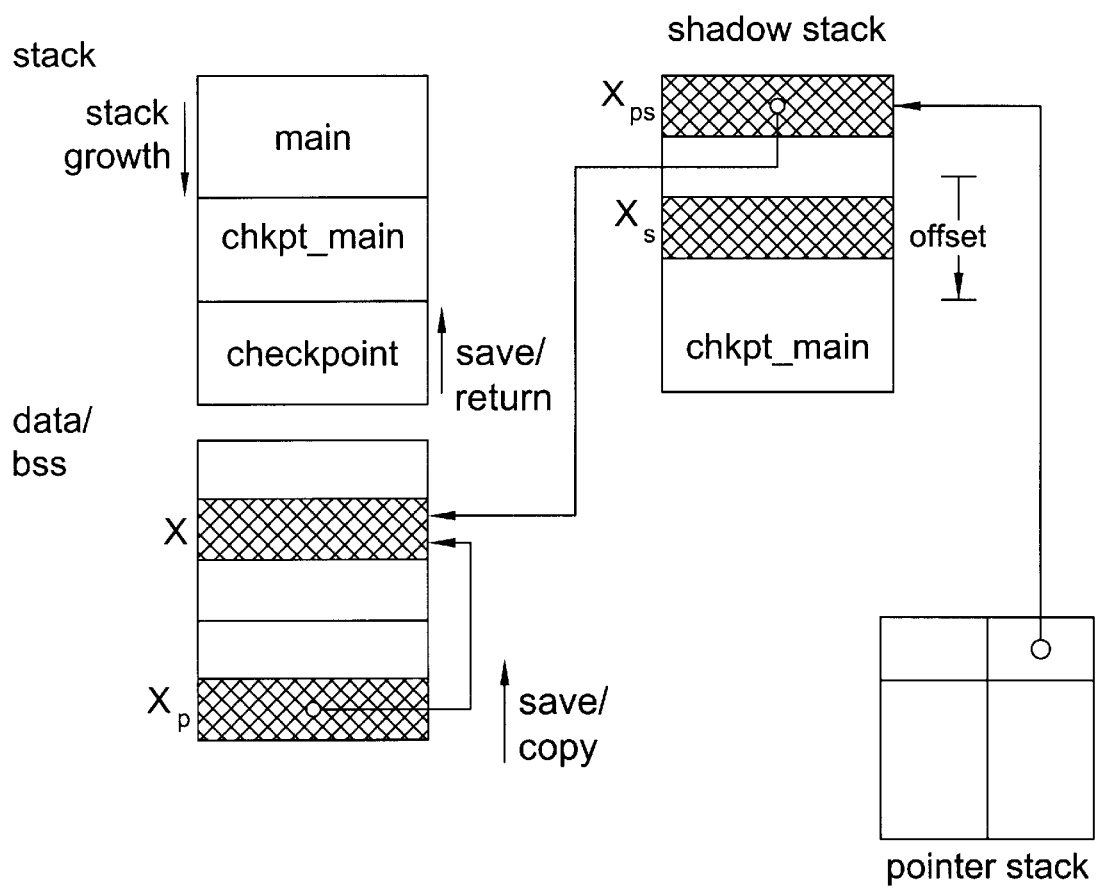
FIG. 16 shows checkpointing in the presence of forward pointers (forward referring to the direction of save traversal) within the data/bss segment, according to an embodiment of the invention.

During checkpointing, backward data/bss pointer located in the data/bss segment can be resolved immediately, because the target's shadow stack address can be found in the pointer target address, as indicated by the broken lines in FIG. 14. Data/bss-located forward data/bss pointers, however, require the use of the pointer stack to save the pointer's shadow address until the pointer target's shadow address is known. FIG. 16 illustrates this case. When the pointer target X is saved, the offset can be computed and stored in $X_{ps}$ immediately.

Recovery of data/bss-located data/bss pointers requires distinguishing between forward and backward pointers. With forward pointers, the pointer will be restored before its target. Consequently, the pointer stack is required to save the pointer temporarily. For backward pointers the method explained above (FIG. 15) can be applied.

Optimizations

The separation of checkpointing into two phases offers an advantage for handling pointers: During the save phase, all pointers are gathered on the pointer stack. Maintaining the pointer stack as a sorted list reduces the complexity of checking the pointer stack from O(n) to O(1) An O(n log n) sorting algorithm reduces the overall overhead for m potential pointer targets from O(n*m) to O(n log n+m). Unlike inter-frame pointers, intra-frame stack pointers can be resolved during the save phase. Introducing a separate "resolved pointer stack" to store offsets that can be computed during the save phase will improve performance by reducing n.

To reduce the overhead caused by forward pointers, the declaration list of variables can be reordered such that all pointers are declared after non-pointer variables. As a result, all intra-frame stack pointers and data/bss pointers to non-pointer targets will become backward pointers.

Further optimizations are also possible when checkpointing heap memory. Since memory management is performed by the runtime system, separately used and free lists of allocated blocks are maintained. Only blocks on lists of allocated blocks are maintained. Only blocks on the used list are currently checkpointed. This, however, may include unreachable memory that has been allocated but not freed. It may be cost effective to perform garbage collection before checkpointing the heap to further reduce the amount of information that needs to be checkpointed.

EXPERIMENTAL RESULTS

Two types of experiments were performed to evaluate the performance of portable checkpoints: (1) Microbenchmarks to shed light on the causes of overhead, and (2) three small application programs to demonstrate the runtime efficiency of one embodiment of the invention, in particular checkpointing overhead and performance in the presence of failures.

Microbenchmarks

Two simple programs are used to analyze the overhead induced by portable checkpoints:
1) The recursive formulation of the Fibonacci number computation shown in FIG. 4 consists almost entirely of checkpointing instrumentation overhead,
2) A simple version of the C-library function memcpy demonstrates the runtime penalty. All runtimes reported are average values of five measurements.

Code Instrumentation Penalty

The transformation of the Fibonacci program in FIG. 3 into the code in FIG. 4 results in a good test case for the runtime overhead due to code instrumentation. The extremely fine granularity of function fib yields a program to measure the destruction and reconstruction of small stack-frames corresponding to the save and restore phases, whenever the base case of the recursion is visited.

FIG. 17 shows fib(35) without storing checkpoints, but executing the save and restore phases of the Shadow Checkpoint Algorithm. Not surprisingly, code instrumentation generates substantial overhead for the Fibonacci example. Since this example represents the pathological case where each function call represents an insignificant amount of computation, it provides an empirical upper bound on the runtime penalty paid by the instrumentation.

Shadow Stack Overhead

The C-library routine memcpy copies the contents of an array bytewise into another array. In this example, two arrays on the heap are allocated, and pass pointers to their base addresses to the memcpy routine, analogous to the code in FIG. 7. Within this routine is a loop, that copies the array contents bytewise. A potential checkpoint location is specified within this loop.

The size of the two arrays is $10^6$, bytes. Thus, the checkpoint function is entered $10^6$ times. Since two large arrays are checkpointed entirely and the function calling sequence is only 2 deep, the checkpointing overhead is dominated by copying these arrays. Thus, this benchmark complements the measurement of the stack induced overhead of the Fibonacci program.

FIG. 18 shows the runtimes of different systems without checkpoint instrumentation (plain), with instrumentation but without storing a single checkpoint (instr), saving one checkpoint specified by using an appropriate timer value— on the shadow stack without writing it to disk (copy), saving one checkpoint on the shadow stack and writing it to a local disk (local and via NFS to a remote disk (NFS).

The overhead of code instrumentation is the difference of instr-plain. The cost of saving a single checkpoint on the shadow stack, including save and restore phase is the difference copy-instr. The time to store a single checkpoint to local or remote disk is local-copy or NFS-copy, respectively. The Linux PC was not connected to NFS for these experiments.

As expected, transferring the checkpoint to remote disk is the most expensive portion of checkpointing that determines the MinTBC (minimum time between checkpointing) eventually. Furthermore, the instrumentation overhead is not negligible, suggesting that potential checkpointing locations should be chosen carefully. The copying overhead onto the shadow stack is tolerable, because it enables us to hide the more time consuming transfer to disk with useful computation.

Application

Three applications are used to measure the overhead of checkpointing. Two applications, a Jacobi-type iteration and a matrix multiplication are floating point intensive and operate on large data sets, resulting in large checkpoints. The third application is a recursive depth-first search of prime numbers, which generates a deep stack hierarchy, where the stack save and recovery phases dominate the checkpointing overhead. Furthermore, the Jacobi-type iteration is also used to measure the lower bound of the runtime of the program in the present of failures.

FIG. 19 shows the amount of data stored in the checkpoints. The difference between checkpoint file sizes and the sum of the corresponding segment sizes is the checkpoint header size (64 bytes). No dynamic variables are allocated in prime; the 20 bytes of the heap segment contain memory management information.

All experiments are performed with sequential checkpointing, where the program is halted to copy its state onto the shadow stack, then writes the checkpoint to disk, and, after completion, continues to program execution. Optimizations, such as proposed in Elnozahy E. M., Johnson D. B., Zwaenepoel W. The performance of consistent checkpointing. In *IEEE Symposium on Reliable and Distributed Systems*, pages 39–47, October 1992 and Plank J. S., Beck M., Kingsley G., Li K. Libckpt: Transparent Checkpointing under Unix. In *Proceedings of the Usenix Winter Technical Conference*, San Francisco, Calif. January 1995 which are incorporated herein by reference, can be applied.

Heat Equation

A Jacobi-type iteration is used to solve the heat diffusion problem on a 256×256 grid, executing 1,000 iterations. Two dynamically allocated two-dimensional double arrays are used, one to hold the temperature values of the current iteration, the other to store the results of the five-point-stencil computation.

Figure 20A:
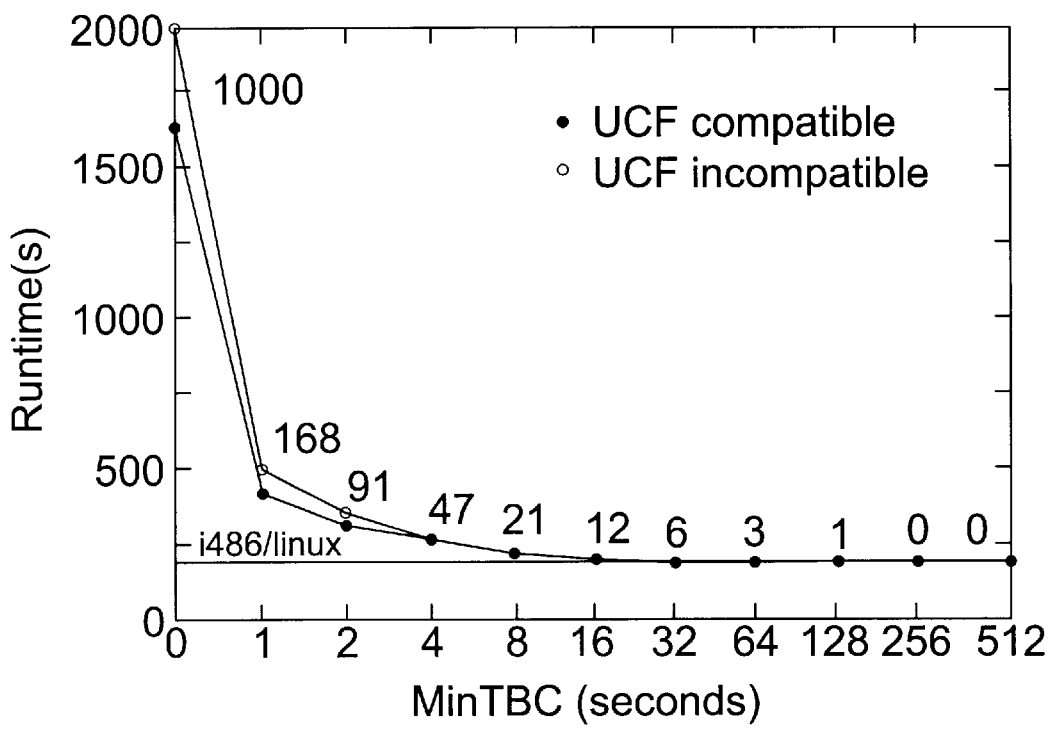
FIGS. 20A–C summarize the results of experiments with checkpointing to the local disk, according to an embodiment of the invention.
Figure 20B:
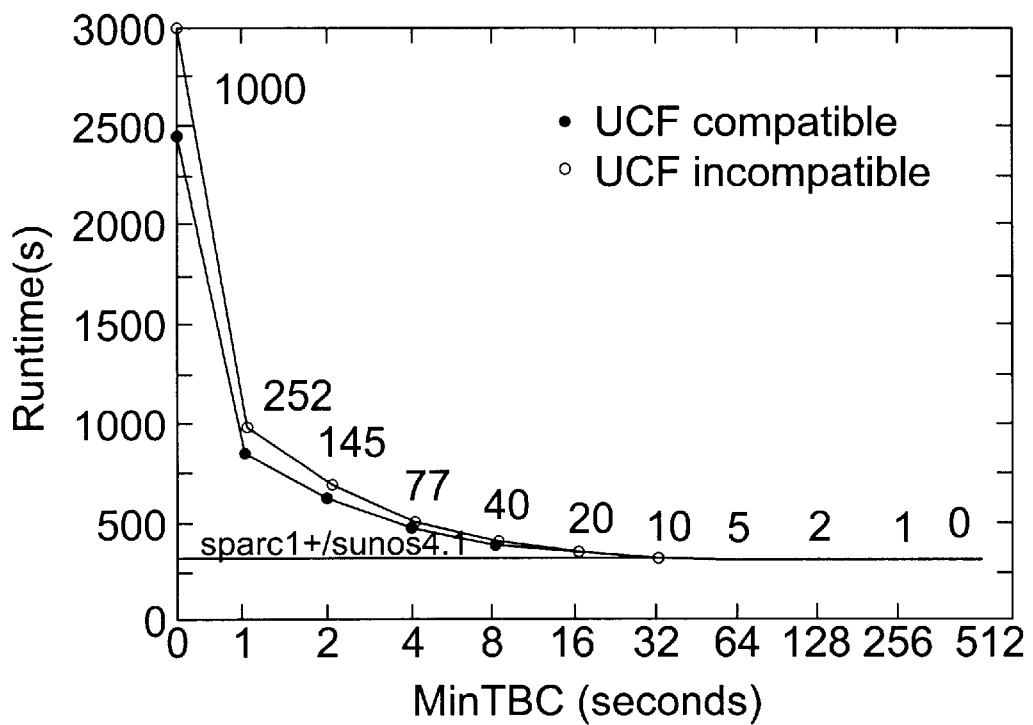
Figure 20C:
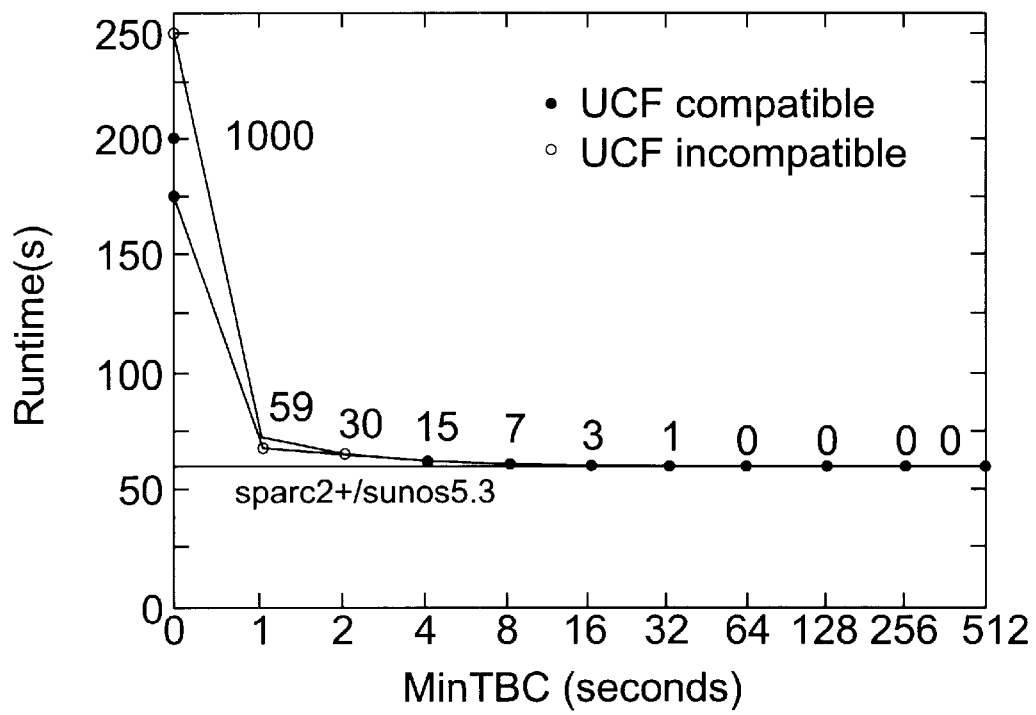

The potential checkpoint location is placed within the outer iteration loop. It is thus visited 1,000 times. FIGS. 17A–C summarize the results of our experiments with checkpointing to the local disk. The runtimes are measured for a range of MinTBC (time value) between 0 and 512 seconds. For MinTBC=0, each potential checkpoint location is activated. The graphs in FIGS. 20A–C plot the runtimes for UCF compatible and UCF incompatible checkpointing, Checkpointing is UCF compatible, if the UCF specification matches the system architecture, so that no conversion is required. With UCF incompatible checkpointing, alignments and conversions are performed on the i486 to match the format of the SPARCstations and vice versa. The node attributes give the number of checkpoints saved for the corresponding MinTBC.

FIGS. 20A–C illustrate how often checkpoints can be saved without affecting performance substantially, On all systems, a checkpointing interval (MinTBC) larger than 32 seconds restricts the overhead to less than 10%. Although this value depends on the checkpoint size, it is small compared to typical system MTBF values. Note that the conversion penalties paid for UCF incompatibility are only severe, if the checkpointing frequency becomes unrealistically high, i.e., MinTBC is very small.

Columns labelled $t_{rec}$ in FIGS. 20A–C give the minimum run times of the program, if failures occur approximately every MinTBC. This "ideal" failure situation is simulated by exiting the program just after a checkpoint has been stored, capturing the exit status within a shell script that immediately invokes the program again with the recover option enabled. Since the program is aborted immediately after a checkpoint is stored, no recomputation of lost computation is required. Furthermore, the time for failure detection as well as downtimes are approximately zero. Since the state is recovered from local disk, no overhead is incurred by transferring the checkpoint via the network.

A single recovery on a UCF compatible architecture costs about 2 s on the i486, about 1.5 s on the SPARCstation+, and 0.4 s on the SPARCstation2O. These numbers are determined by the use of the local disk as stable storage for the checkpoint. All systems suffer from an overhead penalty due to data representation conversion during recovery. The difference between the runtimes of the recovered experiments with UCF incompatible architectures and UCF compatible architectures give the overhead of two conversions, one during checkpointing and the other during recovery.

Matrix Multiplication

The dense matrix-matrix multiplication, implemented by Plank J. S., Beck M., Kingsley G., Li K. Libckpt: Transparent Checkpointing under Unix. In *Proceedings of the Usenix Winter Technical Conference*, San Francisco, Calif., January 1995 which is incorporated herein by reference, is instrumented for this benchmark. FIG. 21 summarizes the runtimes and overheads for the checkpointed dense matrix-matrix multiplications of two dense 615×615 matrices without failures.

The performance of the i486 is dominated by its local disk performance. Data conversion overhead of the UCF incompatible run times if submerged by the variance of the disk performance, which is primarily caused by swap activity. The 8 MB of main memory cannot quite hold Linux plus two copies of the three matrices one on the run time heap and the other on the shadow stack. Consequently, even a single checkpoint adds a significant overhead of 20–30%. This leads to two conclusions: (1) Avoid swapping by choosing the problem size such that stack and heap segments as well as shadow stack fit into main memory. As future memory capacities are growing, it is more likely that cache effects will determine performance. (2) Dense matrix-matrix multiplication is a basic linear algebra operation that hardly appears standalone, but is usually embedded within a larger application. Obviously, it is more sensible to checkpoint after the multiplication rather than within. Such observations raise interesting incentives for pre-compiler data flow analysis to identify potential checkpoint locations automatically.

The SPARCstation1+ measurements show that data conversion adds a significant overhead of approximately 5% compared to the UCF compatible runtimes. Storing checkpoints to the local disk introduces an overhead that depends on the capability of the memory buffers for disk access and the speed of the disk. Obviously, the i486 system delivers a substantially better local disk performance than the SPARCstation1+. When storing the checkpoint to remote disk, as presented for the SPARCstation20, the overhead increases dramatically, as already shown with the memory micro-benchmark.

Prime

The prime benchmark uses a recursive divide-and-conquer algorithm to compute the primes among all natural numbers less than a user-specified upper bound. The user also specifies a grain size which determines the depth of the divide-and-conquer tree. The range 2-upper bound is recursively partitioned into two equal halves until each partition is less than or equal to the grain size. An optimized Eratosthenes sieve algorithm is used on each partition to determine which numbers in that range are prime. The conquer phase is used to compute the total number of primes found.

FIG. 22 shows the results of running prime without failures on the first 10,000,000 natural numbers with a grain size of 250. The last line in the table provides the reference measurement without any checkpointing or instrumentation overhead. All overheads are reported relative to this case. Note that when checkpoints are taken every 2 seconds, the overhead on all three machines is less than 7%. Although not reported here, the data for writing to a remote disk via NFS yields marginally higher overheads for checkpoints taken every 2 seconds or greater. This is not surprising since the size of each checkpoint is relatively small with less than 11 K bytes (see FIG. 19). Note that the prime example of evolutionary computer architecture, the i486, is up to three times faster than a SPARCstation 20, and almost 10 times faster than a SPARCstation1+.

ADDITIONAL PREFERRED EMBODIMENTS

Figure 23A:
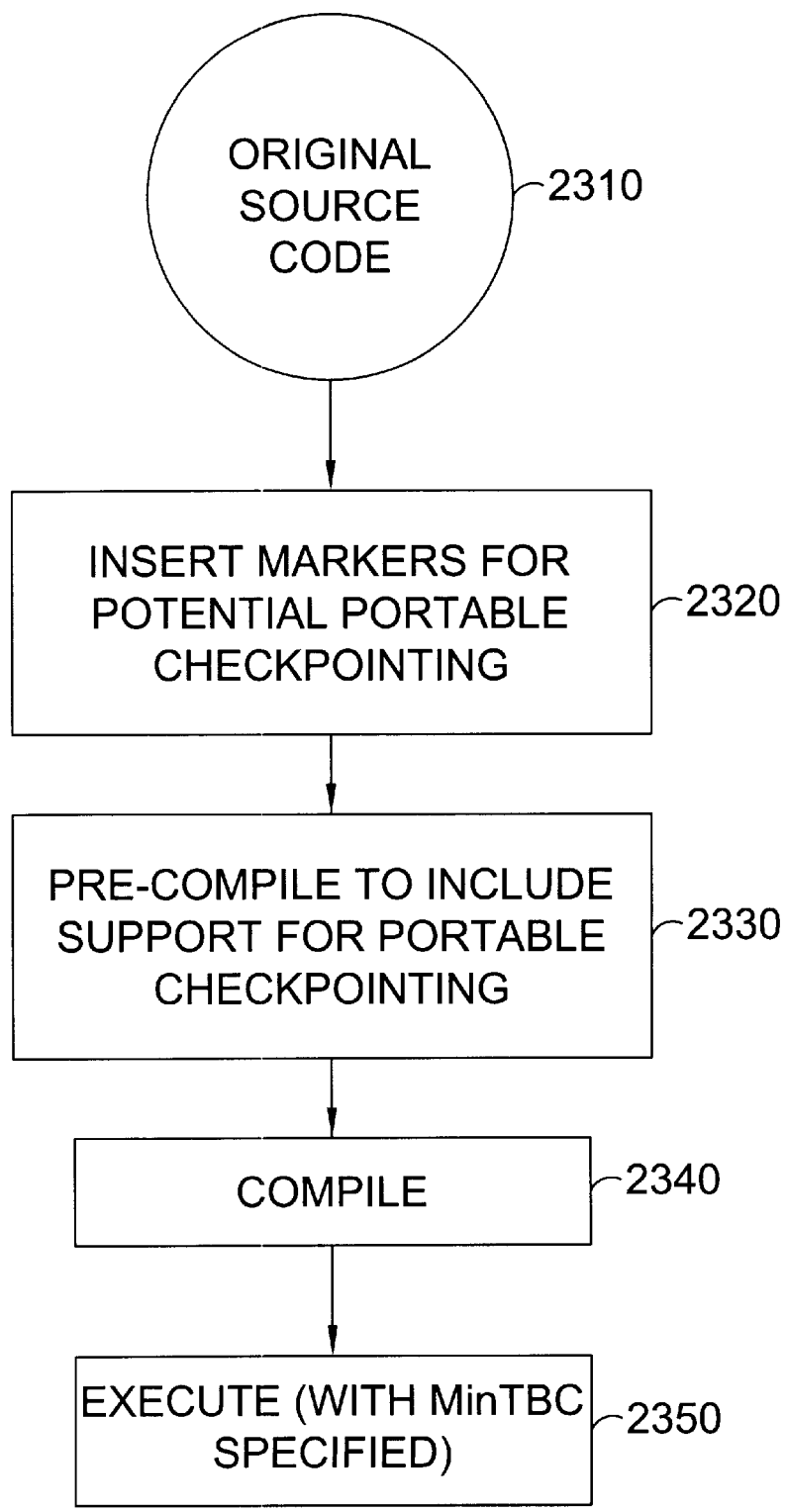
FIG. 23A shows a method of pre-compiling input source code and outputting an output source code which includes support for portable checkpointing, according to a preferred embodiment of the invention.

FIG. 23A shows a method of pre-compiling input source code and outputting an output source code which includes support for portable checkpointing, according to a preferred embodiment of the invention. The input for the method is original source code 2310 which can be written in any general purpose language (e.g., C, C++, Fortran, Java, etc.). Original source code 2310 is input to step 2320 which involves inserting markers for potential portable checkpointing. Step 2320 can be implemented by a programmer who manually inserts portable checkpointing markers, or alternatively, it can be implemented automatically, for example, by a pre-compiler.

The method proceeds from step 2320 to step 2330 which involves pre-compiling the input source code, from step 2320, to produce output source code which includes support for portable checkpointing. The locations of the included support for portable checkpointing is related to the markers which were inserted in step 2320. Since marker insertion step 2320 could be implemented with a pre-compiler, in one embodiment of the invention, steps 2320 and 2330 can be combined into a single pre-compile step.

The method proceeds from step 2330 to step 2340 which involves compiling the output source code to produce object code. It is important to note that by performing the addition of support for portable checkpointing in pre-compile step 2330 rather than in compile step 2340, the method has achieved independence from the specific machine object code. In other words, by inserting the support for portable checkpoints during the source-to-source pre-compile step 2330, the method is interoperable with a variety of different compilers.

The method proceeds from step 2340 to step 2350 which involves executing the code on a particular processing platform. During execution step 2350, the method determines which of the portable checkpoints will actually be implemented, for example, based upon a MinTBC Minimum Time Between Checkpoints).

FIG. 23B shows an apparatus 2355 for pre-compiling input source code and outputting an output source code which includes support for portable checkpointing, according to a preferred embodiment of the invention. Apparatus 2355 includes a marker inserter 2360 and a pre-compiler 2370. In addition, apparatus 2355 can further include a compiler 2380.

Original source code is input to the marker inserter which inserts markers for potential portable checkpointing. The output of marker inserter 2360 is input source code which is input to pre-compiler 2370. Pre-compiler 2370 which pre-compiles the input source code to produce output source code which includes support for portable checkpointing.

In a further embodiment, apparatus 2355 can include compiler 2380 which receives the output source code from pre-compiler 2370 and compiles the output source code to produce object code.

Marker inserter 2360, pre-compiler 2370, and compiler 2380 can be implemented in a variety of ways. For example, marker inserter 2360 and pre-compiler 2370 can be combined into a single pre-compiler as previously discussed. Alternatively, each of the elements could be implemented on totally independent platforms. In addition, each of these elements can be implemented using any combination of software, firmware, and hardware depending on the requirements of the specific application. For example, a hardware implementation could include use of a single platform with a single processor or multiple processors for implementation of all of the elements. Alternately, each element in apparatus 2355 could be implemented on a single or multiprocessor. Firmware for each element could also be implemented.

Figure 24:
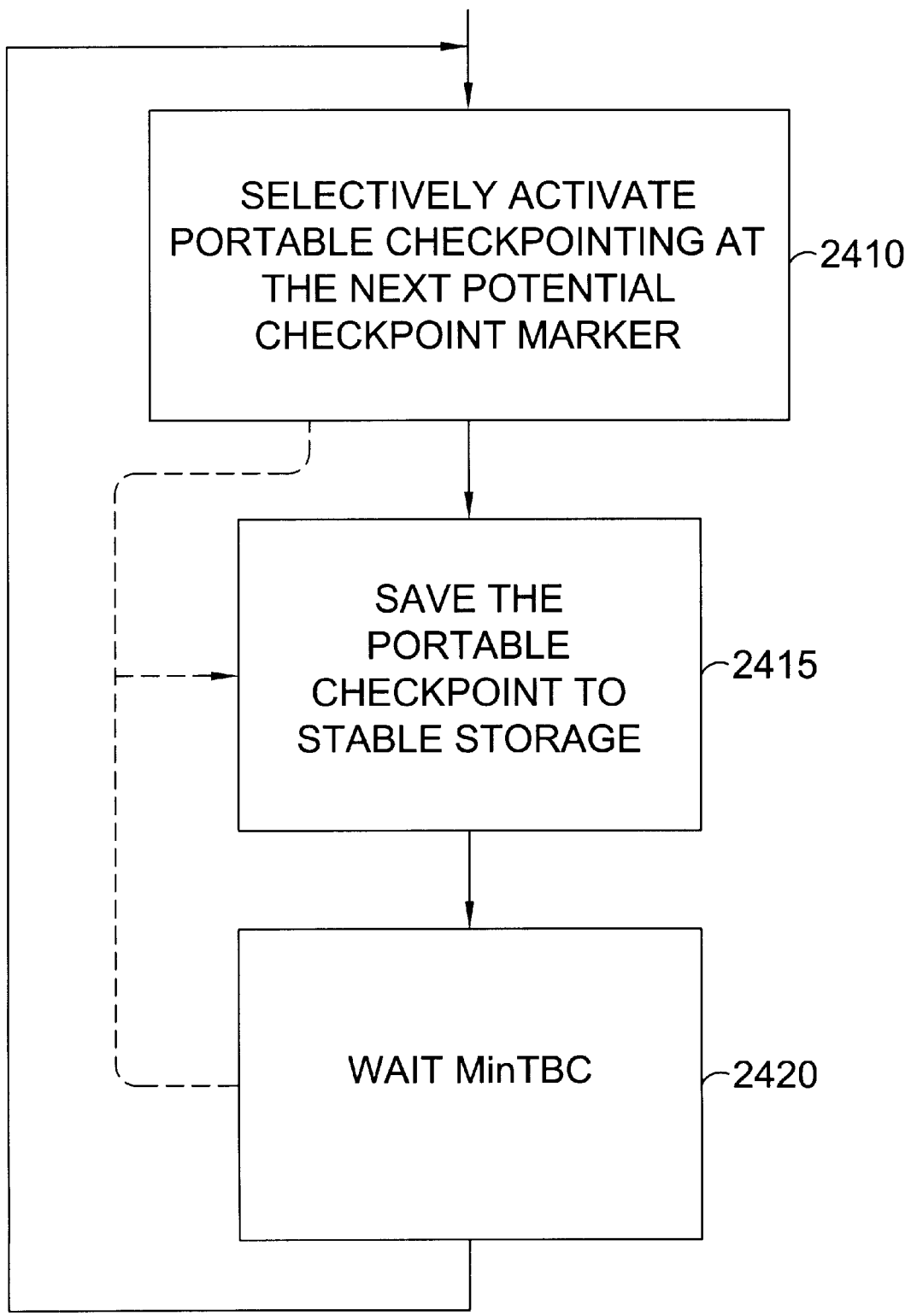
FIG. 24 shows a method for selectively activating portable checkpoints at the next potential checkpoint marker, according to a preferred embodiment of the invention.

FIG. 24 shows a method for selectively activating portable checkpoints at the next potential checkpoint marker, according to a preferred embodiment of the invention. As the code is executed, step 2410 selectively activates portable checkpointing at the next potential checkpoint marker. The method proceeds from step 2410 to step 2415 which involves saving the portable checkpoint to stable storage. The method proceeds from step 2415 to step 2420 which involves waiting MinTBC (Minimum Time Between Checkpoints) while program execution continues. This wait can be implemented, for example, by using a timer. If potential checkpoint markers are encountered during wait step 2420, they are ignored and not implemented.

After the timer expires, the method proceeds from step 2420 back to step 2410 which selectively activates portable checkpointing at the next potential checkpoint marker. This method of implementation greatly reduces the checkpoint overhead by not performing too many checkpoints, while simultaneously allowing reasonable recovery through the use of MinTBC so the checkpoints will not be spaced too far apart in time.

FIG. 24 also includes a further embodiment of the invention (shown with the dashed line) in which step 2410 proceeds to steps 2415 and 2420 approximately at the same time. This method is a non-blocking method in which wait step 2420 does not have to wait for completion of save step 2415.

Figure 25:
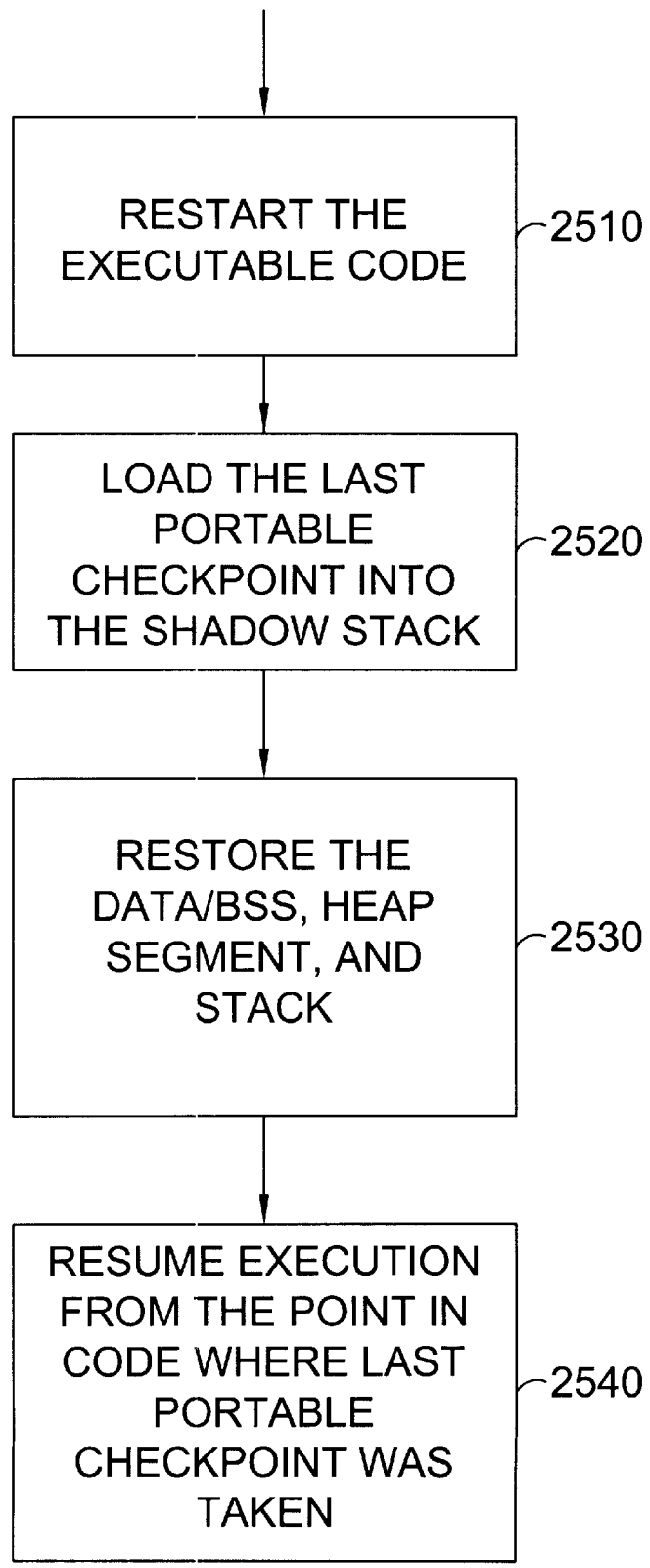
FIG. 25 shows a method for recovering from portable checkpoints, according to a preferred embodiment of the invention.

FIG. 25 shows a method for recovering from portable checkpoints, according to a preferred embodiment of the invention. The method begins at step 2510 which involves restarting the executable code. Restarting step 2510 can be part of a fault tolerant system in which recovery is started after a fault is detected or can be part of a multi-processor system in which the state of a process is being migrated from one processing platform to another processing platform. The processing platform includes not only computers, such as PCs or workstations, but any device which is processor-based such as embedded controllers.

The method proceeds from step 2510 to step 2520 which involves loading the last checkpoint into the shadow stack. The organization and use of the shadow stack has been extensively discussed in prior sections.

The method proceeds for step 2520 to step 2530 which involves restoring the data/bss, heap segment, and stack from the shadow stack in to their appropriate locations.

The method proceeds from step 2530 to step 2540 which involves resuming execution from the point in the code where the last portable checkpoint was taken.

OTHER PREFERRED EMBODIMENTS

The following methods, according to a further embodiment of the invention, present a new method for UCF conversion, comprising the design of a new conversion interface between the architecture and an application. This includes a general mechanism for: a) specifying architecture-specific parameters necessary for converting data layouts of basic data types between the target architecture and the UCF (this method is completely independent of the application); and b) computing type metrics of complex data types and structure metrics for complex data structures found in the application. This method facilitates a modularized approach for data representation conversion in a flexible and extensible manner. The type metrics and code required for the conversion of complex types is application-specific, but is compiler-generated.

In addition, according to a further embodiment of the invention, a new method is presented to allow general and efficient conversion of pointers into machine independent offsets and vice versa.

As previously discussed, the Universal Checkpoint Format (UCF) specifies the layout of a portable checkpoint by specifying the data representations and alignments of basic data types. UCF is a flexible and adaptable format that can be customized to a particular network by specifying byte order, size and alignment of basic types, as well as complex data representations such as denormalized numbers. Typically, data representations and alignments of the majority of available machines in the network should be chosen as the UCF format to minimize the overhead of converting data types to and from the UCF format on UCF-incompatible systems. In evolving networks, the UCF format can be changed as frequently as necessary; this only requires that the application program be recompiled before execution.

The UCF Conversion Method

The pre-compiler, c2ftc, handles architecture dependencies in two steps. The first step is integrated into the compilation of c2ftc. All architecture configurations, including UCF, must be known when compiling c2ftc. During the compilation, data structures are generated that contain architecture-specific type metric information for all basic data types. The second step involves generating application-specific data structure metrics, and resolving application and architecture dependencies. This is done when linking the application and conversion routines for a particular target architecture. The application-specific data structure metrics are architecture-independent, and interface to the architecture-specific conversion routines via a function call interface.

Figure 26A:
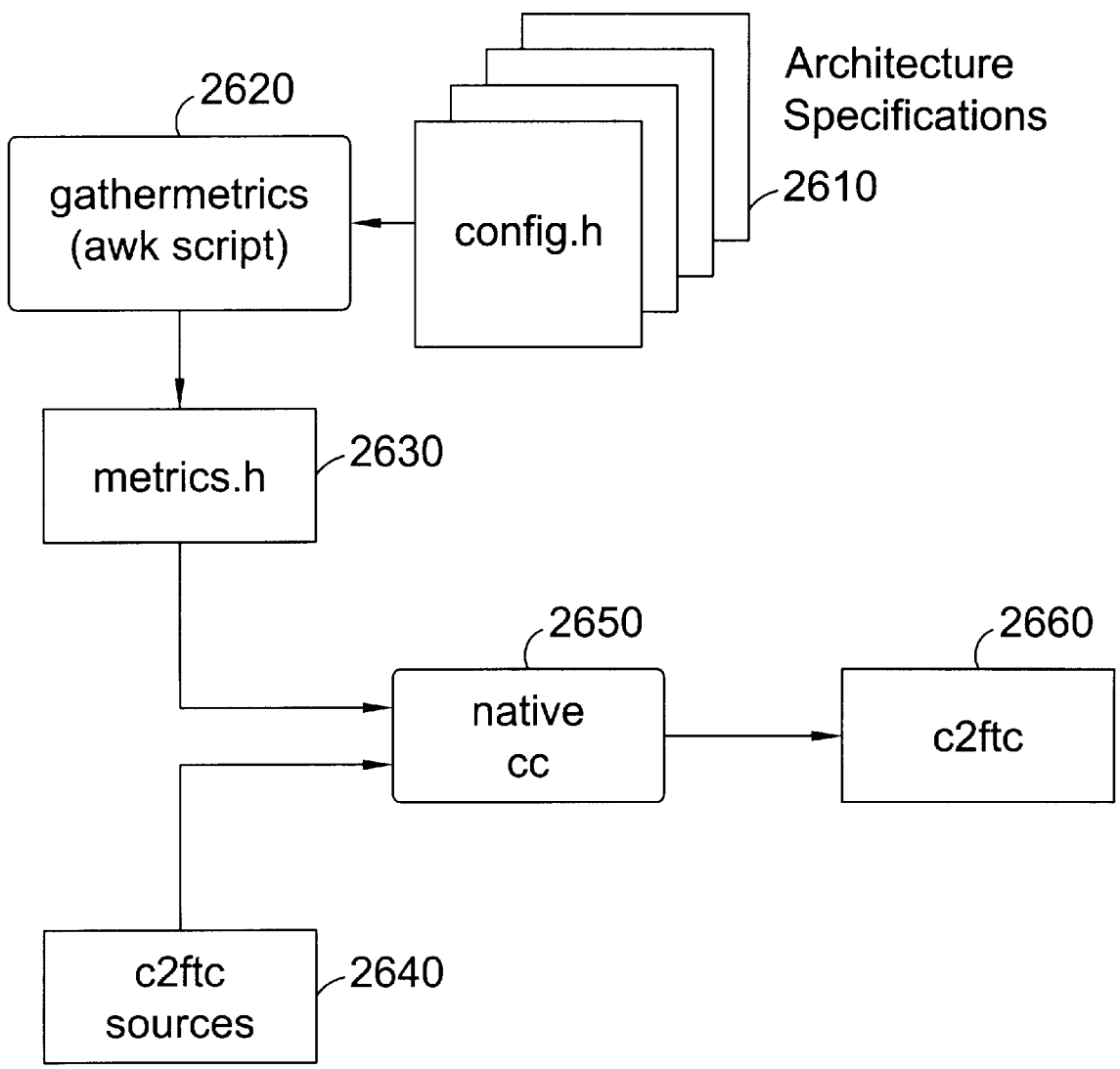
FIG. 26A–B show the information flow and method for introducing architecture specific configuration information into the c2ftc pre-compiler, according to a preferred embodiment of the invention.

FIG. 26A shows how the architecture specific configuration information is compiled into the c2ftc pre-compiler, according to a preferred embodiment of the invention. A variety of architecture specific configuration information files, config.h 2610, are produced for each type of architecture present on the computer network. There is a separate config.h file 2610 for each architecture. A script (e.g. an awk script) called gathermetrics 2620 identifies and examines the configuration information from config.h files 2610, describing the different architectures present in the target computer network. From these architecture specification files, a new file metrics.h 2630 is produced which contains an initialized data structure describing the type metrics of the basic data types of each architecture, including size, alignment, byte sex, and floating point representations.

Metrics.h 2630 and c2ftc source code 2640 can be compiled by a native compiler 2650 to produce object code for c2ftc pre-compiler 2660.

The type metrics for the basic data types represent the interface between the architecture and the application. They provide the information necessary to compute the data layout of complex data structures composed of basic data types, as well as the layout of stack frames and heap data. Based on the information supplied by the type metrics, c2ftc pre-compiler 2660 can generate code to save and restore a portable checkpoint, without knowing about the actual type conversions that may have to be applied at runtime. Thus, the type metrics for basic data types are a means for modularizing and simplifying the compilation process.

Note that in particular no conversion routines for data representations are compiled into c2ftc pre-compiler 2660. Conversion routines for all basic data types (cf. file convert.c in FIG. 27A) may be supplied by the user or architecture expert.

Separating architecture dependencies and applications dependencies introduces flexibility and extensibility: The UCF specification can be changed whenever desired. Application programs merely have to be recompiled.

Figure 26B:
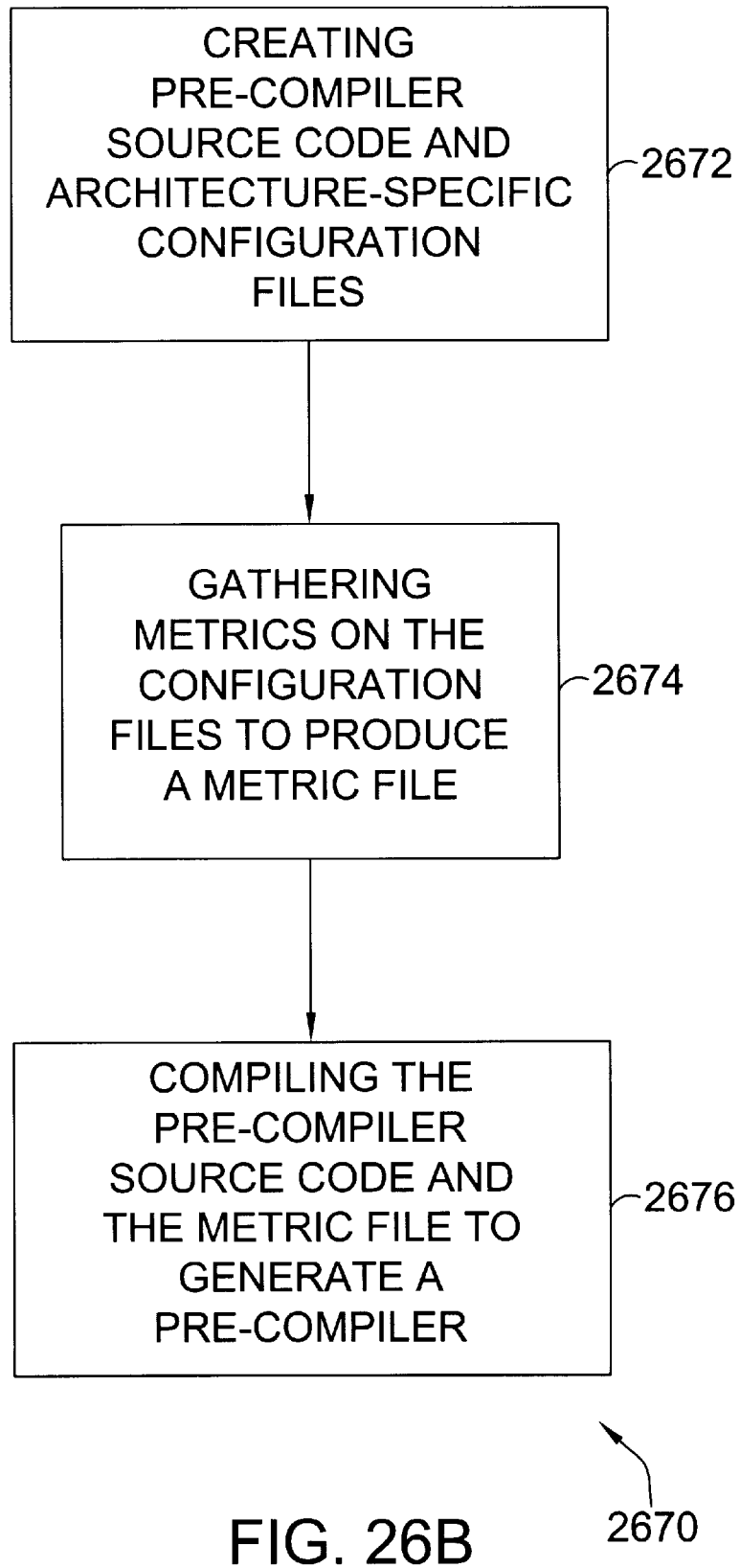

FIG. 26B shows a method 2670 for introducing architecture specific configuration information into the c2ftc pre-compiler, according to a preferred embodiment of the invention. Method 2670 begins with a creating step 2672 which involves creating pre-compiler source code and architecture-specific configuration files for each of the target machine architectures.

Method 2670 proceeds from creating step 2672 to a gathering step 2674 which involve gathering metrics on the configuration files to produce a metric file. For example, gathering step 2674 can be performed by a script or batch file which produces the metric file based upon input configuration files. If the list of target machines increases, new architecture-specific configuration files can be produced for the new target machines. This modular approach allows maximum flexibility in pre-compiler design.

Method 2670 proceeds from gathering step 2674 to a compiling step 2676 which involves compiling the pre-compiler source code and the metric file to generate a pre-compiler.

Figure 27A:
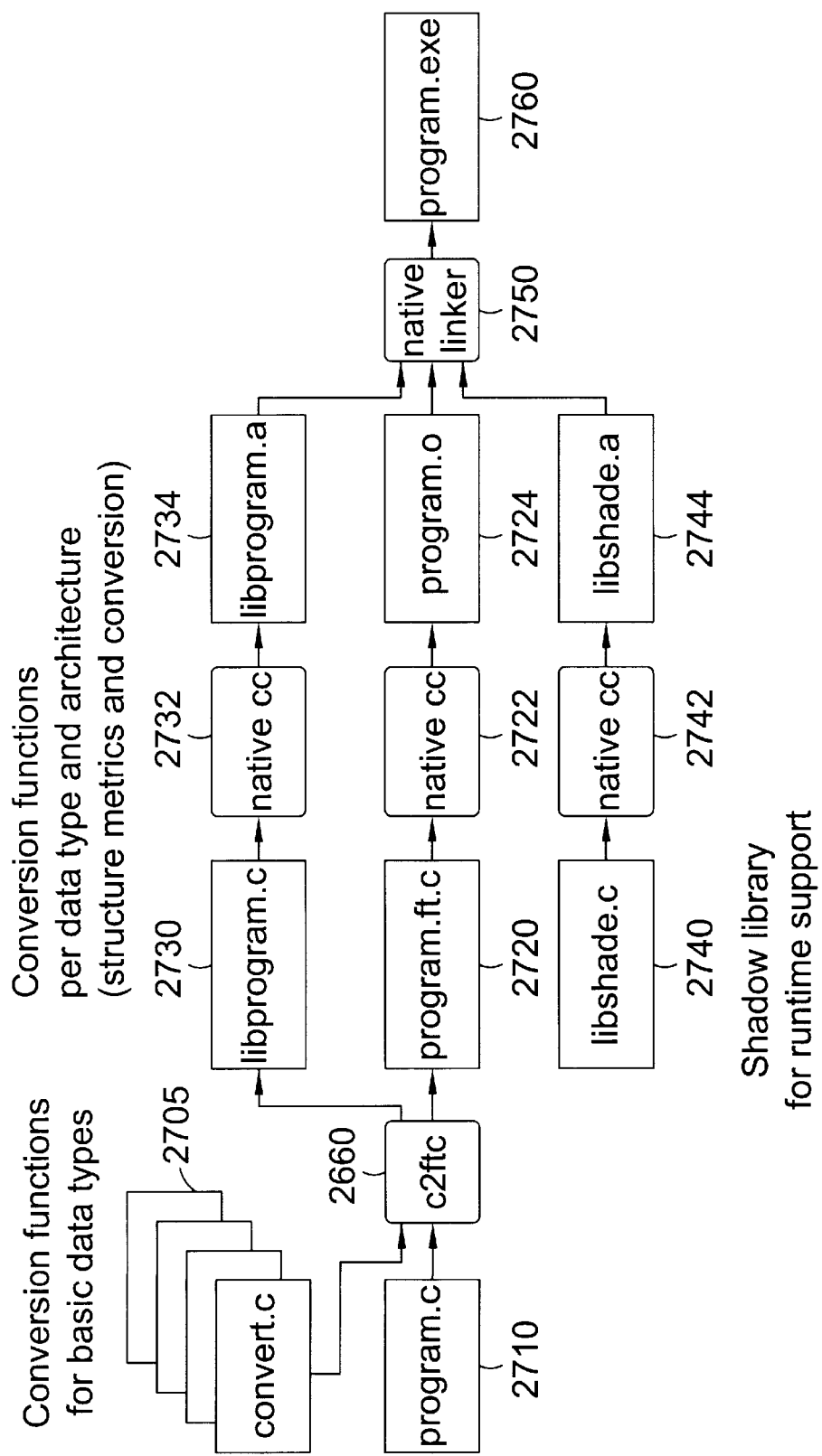
FIGS. 27A–B show the information flow and method for pre-compiling and compiling program.c to produce program.exe, according to a preferred embodiment of the invention.

FIG. 27A shows the information flow when pre-compiling and compiling program.c (typical input application source code) to produce program.exe (typical application executable code), according to a preferred embodiment of the invention. Pre-compiler c2ftc 2660 uses the type metric data structure generated during the compilation of c2ftc 2660 (shown in FIG. 26A) to determine whether the target architecture requires conversion with respect to the chosen UCF data representations. If no conversion is required, efficient checkpointing code is generated that omits data representation conversion. If, however, conversion is required, application-specific conversion code needs to be generated.

Application-specific conversion is necessary for all live variables at a potential checkpoint location in the program. Converting complex data types such as user-defined structures can be based on compiler support, because the structure layout is static and known at compile time. For such application-defined data structures code is generated that allows for reducing the conversion problem to that of basic data types. For example, conversion functions for basic data types, convert.c 2705, can be pre-compiled by c2ftc 2660 along with typical input application source code, program.c 2710, to produce a library of conversion functions with application data types and architectures, libprogram.c 2730, and application source code with support for checkpointing, program.ft.c 2720.

The separation of compile time support for conversion of application-specific complex data types and the runtime conversion of basic data types is based on a data structure called the structure metric. The design of this data structure is described below.

The target architecture-specific conversion files as well as all files containing application-specific conversion information are bundled into library libprogram.a 2734 which is produced by compiling libprogram.c 2730 with a native compiler 2732. Thus, libprogram.a 2734 is a customized package of structure metrics and conversion routines for application program.c 2710 according to the chosen UCF data representations.

Likewise, the application program source code, program.ft.c 2720, is input to native compiler 2722 to produce application program object code, program.o 2724.

The runtime library, libshade.a 2744, also called the shadow library, provides all necessary runtime support for address space manipulation, shadow stack, object stack and pointer stack operations, and saving and restoring a checkpoint to disk or transferring it via a network. Libshade.a 2744 is produced by a native compiler 2742 from shadow library source code, libshade.c 2740. It is well known to those skilled in the art that native compilers 2722, 2732, and 2742 can be different compilers or the same compiler.

The object code program.o 2724, libprogram.a 2734, and libshade.a 2744 are input to a native linker 2750 which produces an executable application program, program.exe 2760.

Figure 27B:
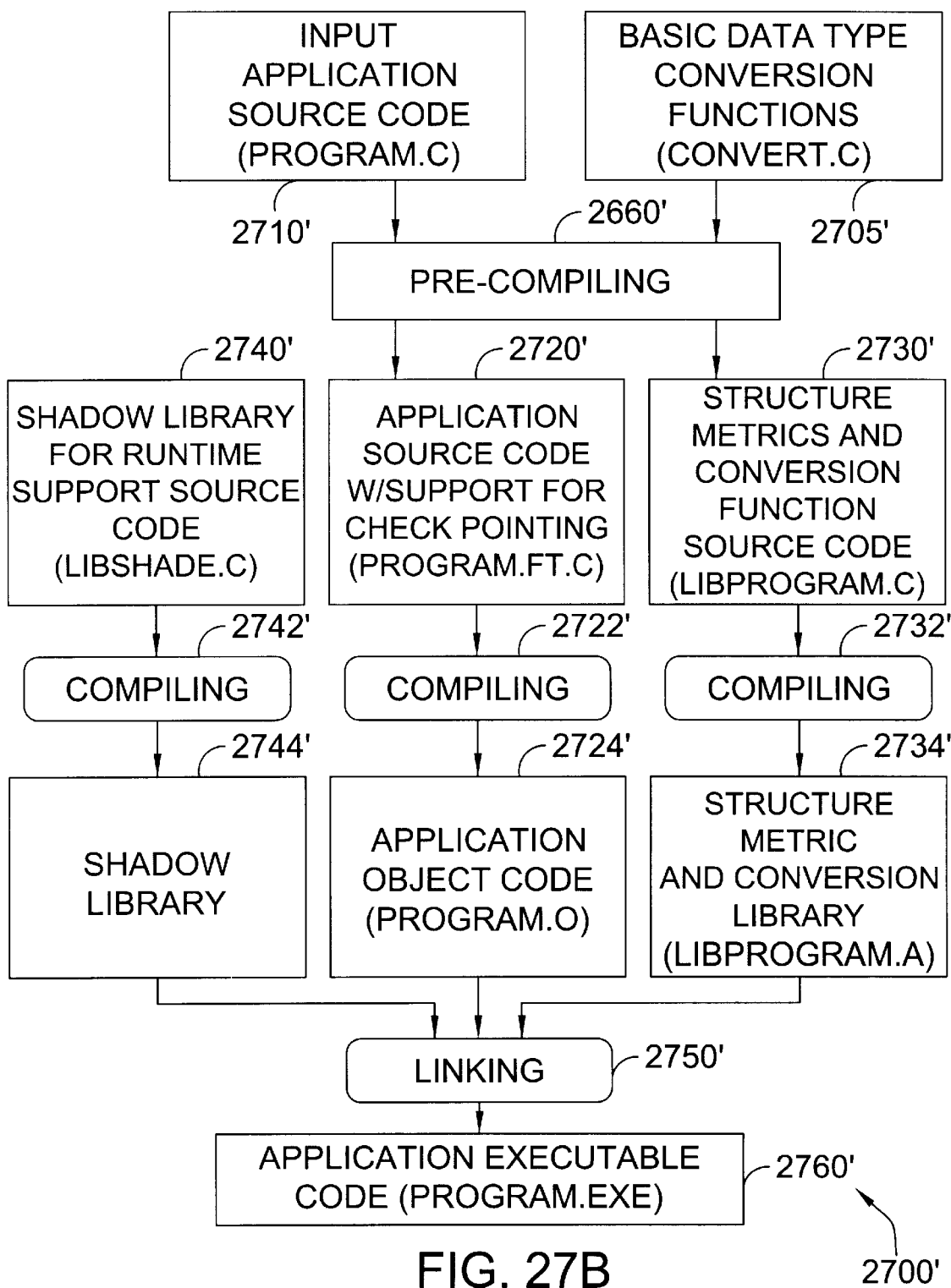

FIG. 27B shows a method 2700' for pre-compiling and compiling program.c to produce program.exe, according to a preferred embodiment of the invention. Method 2800' starts with a precompiling step 2660' which involves precompiling input application source code (program.c) 2710' and basic data type conversion functions (convert.c) 2705'. Basic data type conversion functions 2705' include separate convert.c files for each machine architecture on the target network. The outputs of pre-compiling step 2660' are application source code with support for checkpointing (program.ft.c) 2720' and structure metric and conversion function source code libprogram.c) 2730'.

Method 2700' proceeds with a series of compiling steps 2722', 2732', and 2742'. Compiling step 2722' involves receiving application source code 2720' and outputting application object code (program.o) 2724'. Compiling step 2732' involves receiving structure metrics and conversion function source code 2730' and outputting a structure metric and conversion library 2734'. Compiling step 2742' involves receiving a shadow library for run-time support source code libshade.c) 2740' and outputting a shadow library 2744'.

Method 2700' proceeds with a linking step 2750' which receives application object code 2724', structure metric and conversion library 2734', and shadow library 2744' and produces an application executable code (program.exe) 2760'.

Method for Generating Structure Metrics

Structure metrics include the layout and type information of application-defined data structures.

Figure 28:
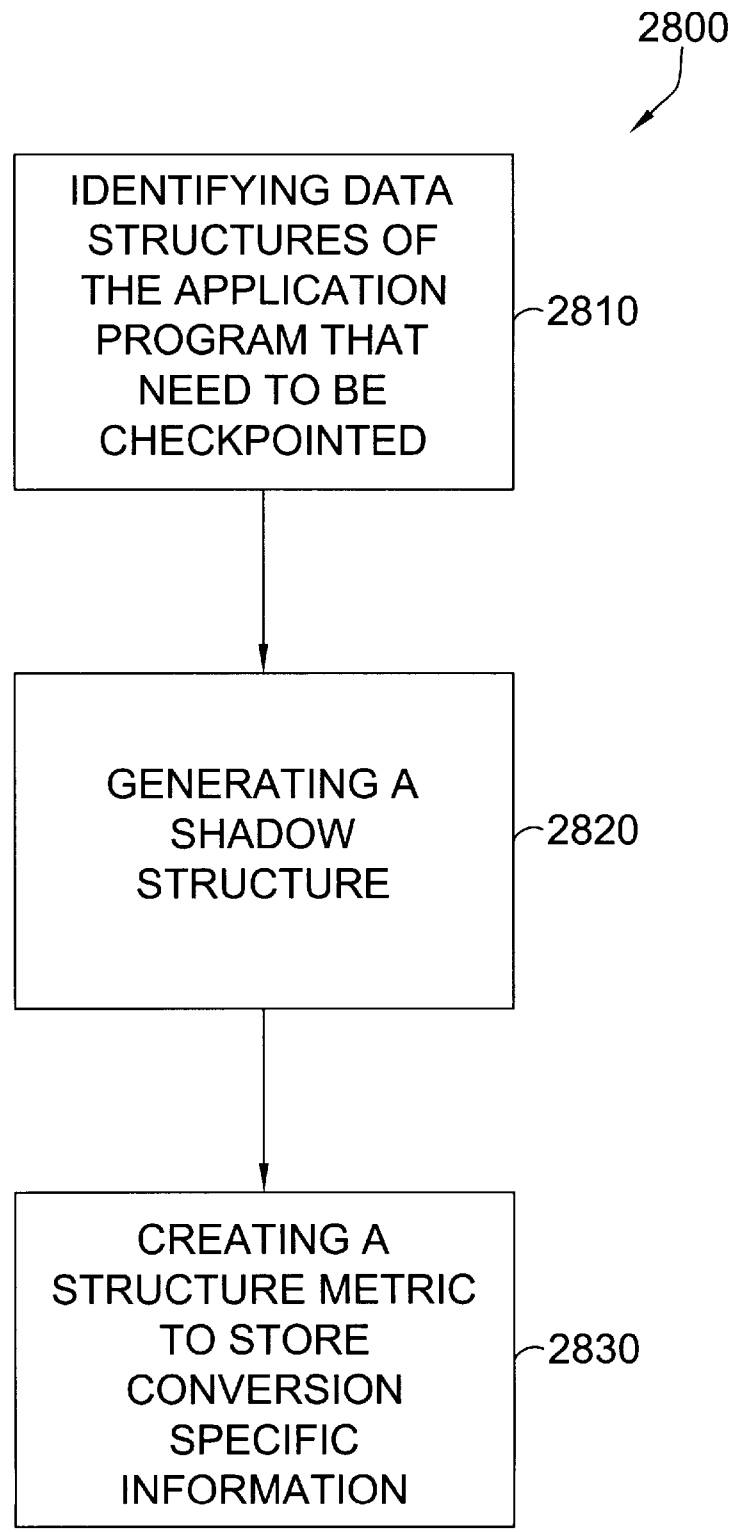
FIG. 28 shows a method for generating a structure metric, according to a preferred embodiment of the invention.

FIG. 28 shows a method 2800 for generating a structure metric, according to a preferred embodiment of the invention. Method 2800 starts with an identifying step 2810 which involves identifying all data structures of the application program that need to be checkpointed. Method 2800 proceeds from identifying step 2810 to generating step 2820 which involves generating a shadow structure, for example by padding the original structure according to the UCF specification. Method 2800 proceeds from generating step 2820 to a creating step 2830 which involves creating a structure metric for each of the data structures identified in identifying step 2810, to store the necessary conversion-specific information.

Identifying step 2810 will now be discussed in more detail with reference to some example code. Since structures can be nested, finding all structures that are actually used in variable declarations is based on a pruning algorithm that identifies all structures that are actually needed during checkpointing and recovery. Initially, all declarations containing structures, including type definitions (typedefs) are gathered in a list. Using dependency analysis, this list is then systematically pruned to contain only those structures that are referenced (indirectly) with variable declarations. The design of this structure list needs to cope with name clashes that may arise when "lifting" data structures out of their lexical scope into a flat list.

FIG. 29A shows an example to illustrate the dependency analysis method, according to a preferred embodiment of the invention. The result of the dependency analysis is the identification of structures, X, Z and timeval.

Variable z is declared as struct Z. Therefore struct Z must be considered for to checkpointing. Because struct Z depends on struct X via field declaration x, struct X must also be considered for checkpointing. However, no variable of type struct Y is declared. Also, the declaration of pointer p to a structure of type struct Y does not cause an allocation of a struct Y. Finally, struct timeval is supplied by the operating system. Treating operating system supplied structures is consistent with that of application5 defined structures. Thus, declaring variable t of type struct timeval identifies this structure to be considered for checkpointing as well.

Generating step 2820 of FIG. 28 will now be discussed in more detail. In an earlier method, all data structures in the application program were padded at compile time such that all structures would conform to the layout to the UCF specification. This method of compile time padding suffers from several limitations:

- It restricts the sizes of the basic data types of the UCF specification to be at least the size of the largest size in the pool of processor architectures in the network
- Since data structures were padded according to the UCF specification for each target machine, transparency is lost, because the data layout was changed. This may not only cause increased memory consumption, but significant performance penalties due to a different (potentially uncontrollable) data cache behavior These limitations are removed in the metric-based conversion scheme of generating step 2820. Here, conversion between different data layouts of complex data structures is deferred to runtime, and structures are not padded in the program.

In the earlier method, structures were padded such that the data layout conformed to the rules of the UCF specification. According to method 2800, c2ftc employs padding only to generate a shadow structure for each of the data structures identified for checkpointing. The purpose of padding the internal shadow structure is to generate an Abstract Syntax Tree (AST) representation of the UCF layout of the structure. Once the AST representation of the UCF layout is available, it is straightforward to create the structure metric for the data structure.

Generating step 2820 has several. advantages over the earlier method:

(i) Only those structures that are part of a checkpoint are padded during compile time in order to facilitate computation of the structure metric (ii) Since padding is not performed on structures used during normal execution, it does not detrimentally affect performance.

Creating step 2830 of FIG. 28 will now be discussed in more detail. In order to convert an arbitrary C-structure into UCF, it is necessary to identify the type metrics and layout for its fields on both the target architecture and in UCF. With this information the type metrics for the structure itself can be computed.

FIG. 29B shows a simplified form of structure metric, according to a preferred embodiment of the invention. C-structure syntax is used to identify the fields necessary to make this characterization. Some simplifications have been made for ease of exposition.

Data structure StructMetric describes the layout of a C structure for both a particular target architecture as well as the architecture independent UCF layout. Field m is a pointer to an array of structures of type fieldmetric_t, one per field of the structure, where numfields is the number of field and, thus, the corresponding number of fieldmetric_t components. Fields size and align provide the size and alignment modulus of the machine-specific layout of the structure, and ucfsize and ucfalign the corresponding values for the UCF layout.

The fields of the structure are described by the array of fieldmetric_t structures. Field offset denotes the offset of a structure field from the base of the structure. size denotes the size of the field. Analogously, the field ucfoffset denotes the UCF offset from the base of the UCF structure, and ucfsize denotes the UCF size of the field.

For each structure, a structure metric is generated which is a structure of type structmetric_t.

Figure 30:
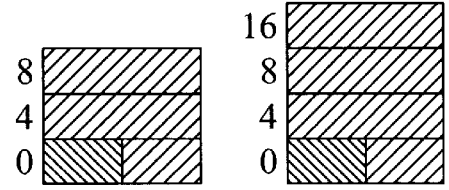
FIG. 30 shows a structure metric example, according to a preferred embodiment of the invention.

FIG. 30 shows a structure metric example, according to a preferred embodiment of the invention. Consider the following simple structure declaration for struct X, the corresponding shadow structure X_metric and the illustration of the data layouts on the right hand side. In the example, array a is identified as an array of three structures X, which contains two fields, a character array c of dimension 2, and a double d. The illustration in FIG. 30 shows two possible layouts of structure X. In both cases, a char is assumed to be of size 1 byte, and a double of size 8 bytes. However, the layout on the left hand side assumes that doubles are aligned to a 4 byte boundary, whereas an 8 byte alignment is assumed on the right.

For the structure metric example, it is assumed that the left layout corresponds to the target architecture and the right layout depicts the UCF representation of the structure. The fields of structure X_metric are interposed as follows: The 2 in the first field says that structure X contains 2 fields, which are described by the field metric array fm. The size of structure X on the target architecture is 12, its alignment is 4. The UCF size of structure X is 16, its alignment is 8.

The field metric array describes the layout of each of the fields of structure X. The first component of fm describes the character array c. Its offset to the base of structure X is zero, the size of a char is 1. The offset of c in the UCF image of structure X is 0, and the UCF size of a char is 1. The dimension of the array of char is 2. The second field in fm corresponds to the double field. Its offset on the target architecture is 4 bytes, its size is 8 bytes. In the UCF image, the offset is 8 bytes, and the size is 8 bytes. From a scalar data type the dimension is 1.

These structure metrics are used at runtime during checkpointing and recovery. Generic routines can be employed to convert data structures based on the information supplied by the structure metric. In contrast, earlier methods required functions to be generated to save, restore and recover each individual data structure.

A METHOD OF RUNTIME SUPPORT FOR POINTERS

Programming languages that provide pointers as first class objects have traditionally been viewed as inherently non-portable, because pointers may reference objects anywhere in the address space of a process, and the address space is typically not portable across binary incompatible machine architectures and operating systems. Hence, saving pointers in a checkpoint in a machine independent manner presents a challenge.

The method, according to one embodiment of the invention, for providing portability of pointer objects is based on the observation that a pointer can be represented as an offset between the address of the pointer location and the address of the pointer target, which is the value of the pointer object, provided that the state of the computation is captured in a machine independent manner. Please recall that the shadow stack is a data structure that holds the state in the UCF format, which is machine independent by definition. Within the shadow stack, a pointer is represented as displacement, or offset, between the address that holds the displacement itself, called pointer shadow address, and the address of the pointer's target object on the shadow stack, called target shadow address.

Computing the machine independent offset requires the knowledge of the pointer shadow address as well as the target shadow address of a pointer. However, when pushing the live variables of a computation onto the shadow stack, only the top of the shadow stack is accessible. At the time of pushing a value onto the top of the shadow stack, this value may be either a pointer or a pointer target. If a pointer is pushed, its target is not accessible directly, and if a target is pushed the pointer may not be known. Thus, a mechanism is required to temporarily save one of the values until the other one is being pushed onto the shadow stack. To this end, two additional runtime data structures are used: an object stack and a pointer stack.

The use of the object stack and pointer stack correlates with the classification of pointers into forward pointers and backward pointers:

Forward pointers are pushed onto the stack before their target objects.

Backward pointers are pushed onto the shadow stack after their target objects.

Whether a pointer is a forward pointer or a backward pointer depends on the sequence in which the segments of the address space, stack, heap and data/bss, are pushed onto the shadow stack, and at which addresses objects are placed into these segments. The latter aspect depends on the system, in particular the linker for the data/bss segments, and the register set organization and compiler for the stack segment. Further complexity is introduced by function pointers and constant string pointers, whose targets are allocated in the text segment. The layout of the text segment is compiler dependent. Function pointers are treated as previously described. The handling of constant strings is new and similar to that of function pointers; however, in addition to an identifier, the offset into the string must be checkpointed.

These system dependencies can be overcome by postponing the decision about whether a pointer is a forward or backward pointer to runtime. In accordance with the invention, the c2ftc pre-compiler generates code, that passes pointers to a runtime library routine during checkpointing and recovery. The runtime routines utilize the object stack to decide whether a pointer is a forward or backward pointer, and take the appropriate action as described below.

Backward Pointers

Figure 31:
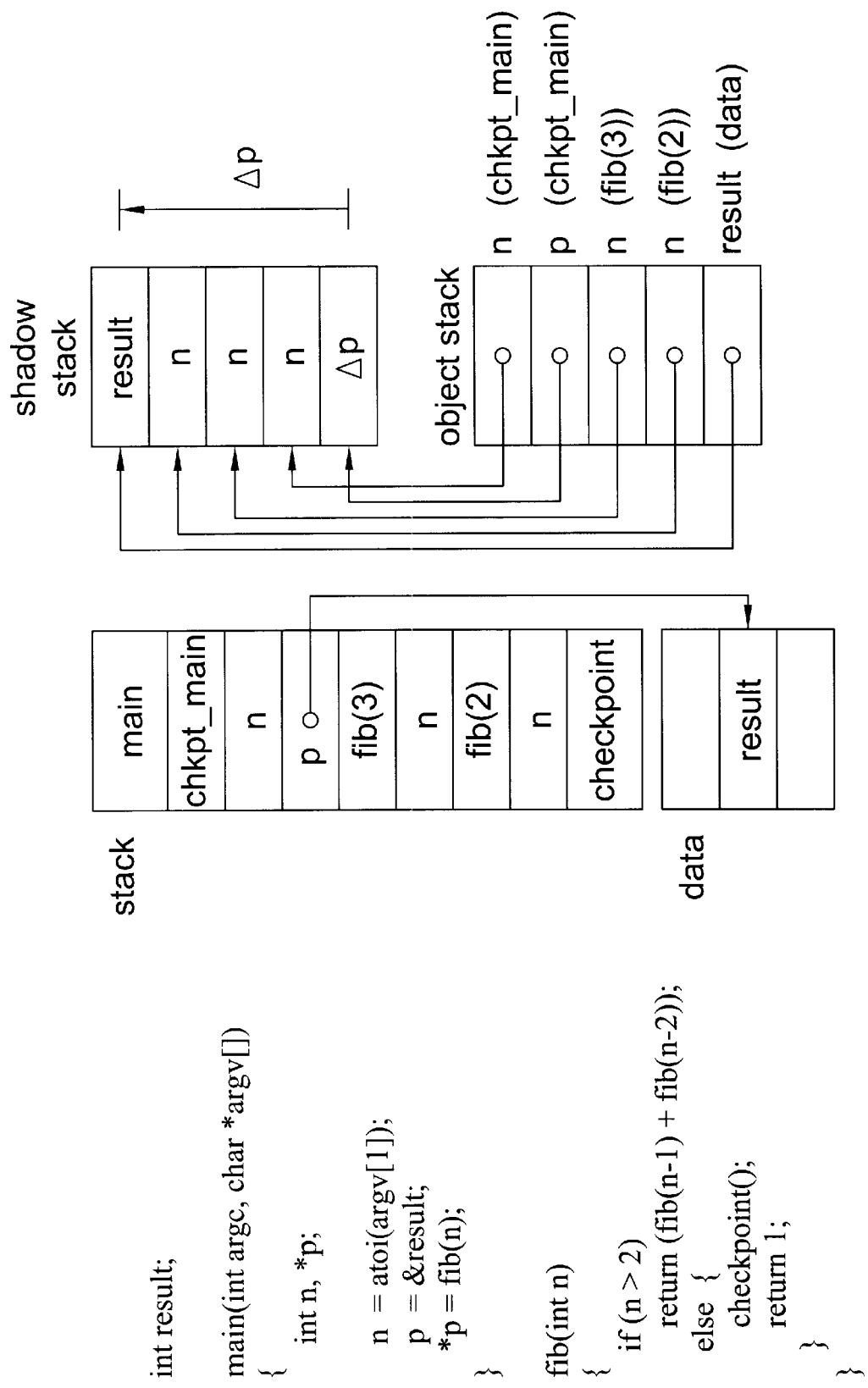
FIG. 31 shows a code fragment and stack for checkpointing backward pointers, according to a preferred embodiment of the invention.

FIG. 31 shows a code fragment and stack for checkpointing backward pointers, according to a preferred embodiment of the invention. Assume a pointer (p) is in the runtime stack segment pointing into a data/bss located object (result). Furthermore, assume that the checkpointing method saves the data/bss segment before the runtime stack.

Whenever an object is pushed onto the shadow stack, its address and size on the runtime stack as well as its address on the shadow stack are pushed onto the object stack. The shadow stack address is known when pushing the object onto the shadow stack. Thus, while saving the data/bss segments, all data/bss objects are pushed on the object stack. Data/bss objects are static and, therefore, need to be pushed onto the object stack only once after application startup, or after recovery. When saving the runtime stack segment, pointer p will be visited. Note that the pointer target result, which is assumed to be in the data/bss segment has already been pushed onto the shadow stack. Thus, pointer p is a backward pointer.

The compiler-generated code for visiting pointers invokes a runtime routine, which searches the object stack for the target address. Since the address range occupied by the target object result is already stored on the object stack, this search will be successful. Thus, the success of the search identifies pointer p as a backward pointer.

Next, since the target shadow address is available on the object stack, pointer p can be transformed into the architecture independent offset $\Delta p$. Note that the pointer shadow address is the current top of the shadow stack, whereas the target shadow address must be retrieved from the object stack. Subsequently, the displacement $\Delta p$ between these two addresses is computed, and pushed onto the shadow stack.

Forward Pointers

Figure 32:
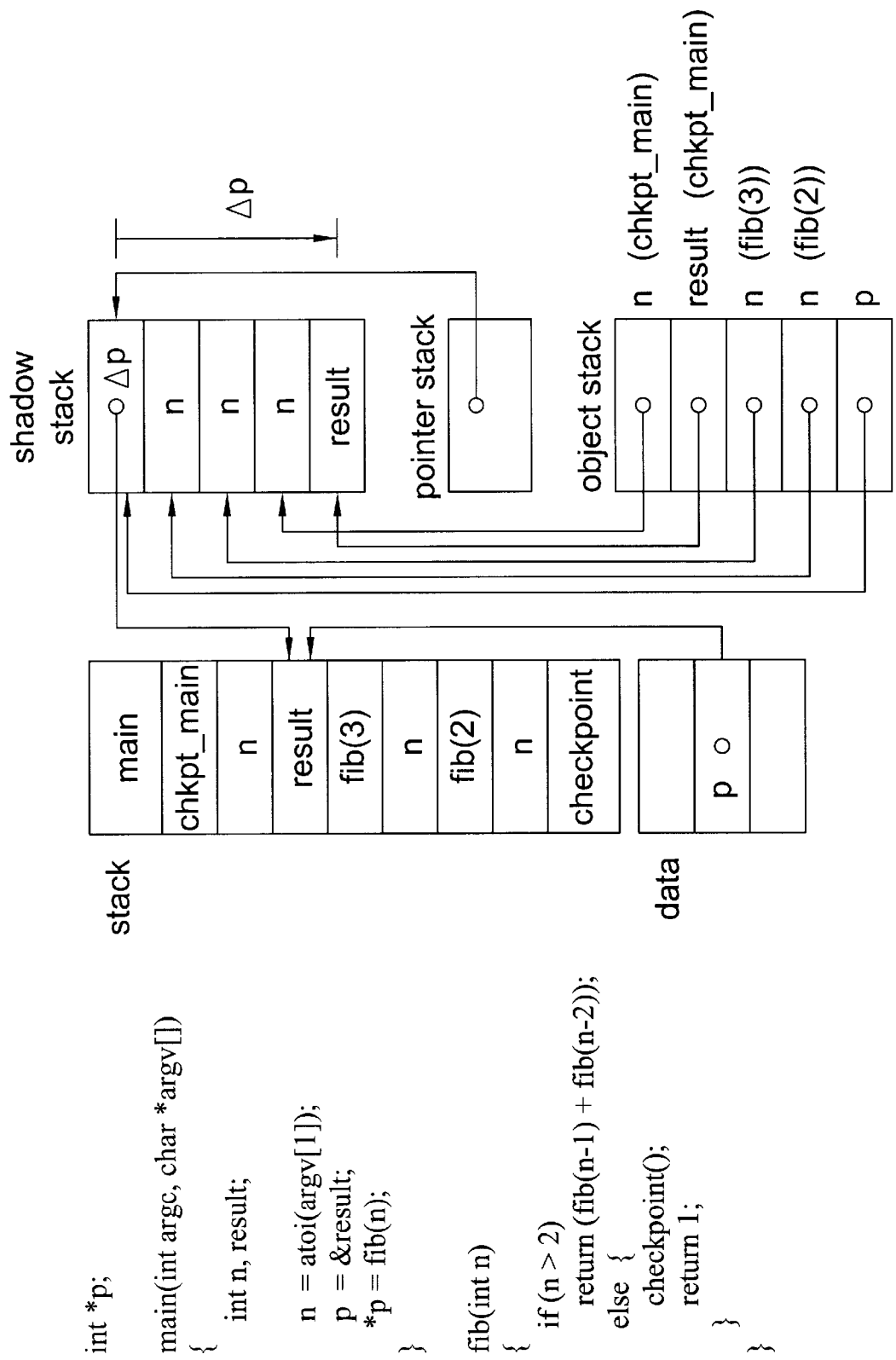
FIG. 32 shows a code fragment and stack for checkpointing forward pointers, according to a preferred embodiment of the invention.

FIG. 32 shows a code fragment and stack for checkpointing forward pointers, according to a preferred embodiment of the invention. The forward pointer is the opposite situation of the backward pointer which was discussed in the previous section: a pointer p in the data/bss segment pointing into a runtime stack located object result.

Assume that the checkpointing algorithm saves the data/bss segment before the runtime stack. When the data/bss segment is pushed onto the shadow stack pointer p will be visited before its target result on the runtime stack. Thus, pointer p is a forward pointer.

When visiting a pointer, a compiler-generated checkpointing code will call a runtime routine, which will search the object stack for the pointer target result. In this case, the search will be unsuccessful, implying that pointer p is a forward pointer. Since the target shadow address is not known at the current state of the checkpointing procedure, the pointer needs to be saved temporarily to be resolved at a later stage. This temporary storage is provided by the pointer stack. Pointer p is pushed onto the shadow stack, and additionally a pointer is saved to the pointer's shadow address, the current top of the shadow stack, on the pointer stack.

As the checkpointing procedure proceeds, the runtime stack is pushed onto the shadow stack including the pointer target result. However, no action is taken to resolve the pointer on the pointer stack upon visiting the pointer target object. Instead, the entire runtime stack is pushed onto the shadow stack first. Furthermore, each object on the runtime stack that can be pointed to is pushed onto the object stack. After the save phase is complete, the runtime stack is restored as previously disclosed.

After the restore phase is complete, the state of the computation is saved on the shadow stack, except those pointers which are gathered on the pointer stack. A final sweep through this pointer stack is necessary in order to complete the checkpoint. The information saved on the pointer stack and the object stack is sufficient to compute the offsets of all those pointers: The pointer shadow address is available on the pointer stack. A copy of the pointer target is stored in this very location on the shadow stack. The object stack is searched to retrieve the target shadow address. Given the pointer shadow address and the target shadow address, the displacement is computed and stored in the pointer shadow address accessible from the pointer stack. In FIG. 32, a pointer to the shadow address of pointer p is saved on the pointer stack, which in turn holds a copy of p. This copy is used to search the object stack for the shadow address of pointer target result. The offset Δp replaces the copy of p on the shadow stack.

Note that the introduction of the object stack facilitates a more efficient way to transform pointers into machine independent offsets at runtime, compared to the process described in the original disclosure. This new process is only possible because the structure metrics previously introduced allow for computing the shadow addresses of pointer targets given the offset into an object on an activation segment, and vice versa during recovery. Furthermore, this solution is more general than prior methods, because it allows for arbitrary segment layouts as defined by different linker algorithms and operating systems.

Dynamic Memory Management on the Heap

Dynamically allocated memory is maintained in the heap segment of a processes address space. In order to access all heap allocated objects when checkpointing, a customized memory allocator is provided to the programmer. It provides functions included in most C libraries, such as malloc, calloc, valloc, realloc, memalign, or free. Standard implementations of dynamic memory management prepend the size before each user allocated memory block. The size information is for example used by the free function to determine the amount of memory to be freed.

Figure 33:
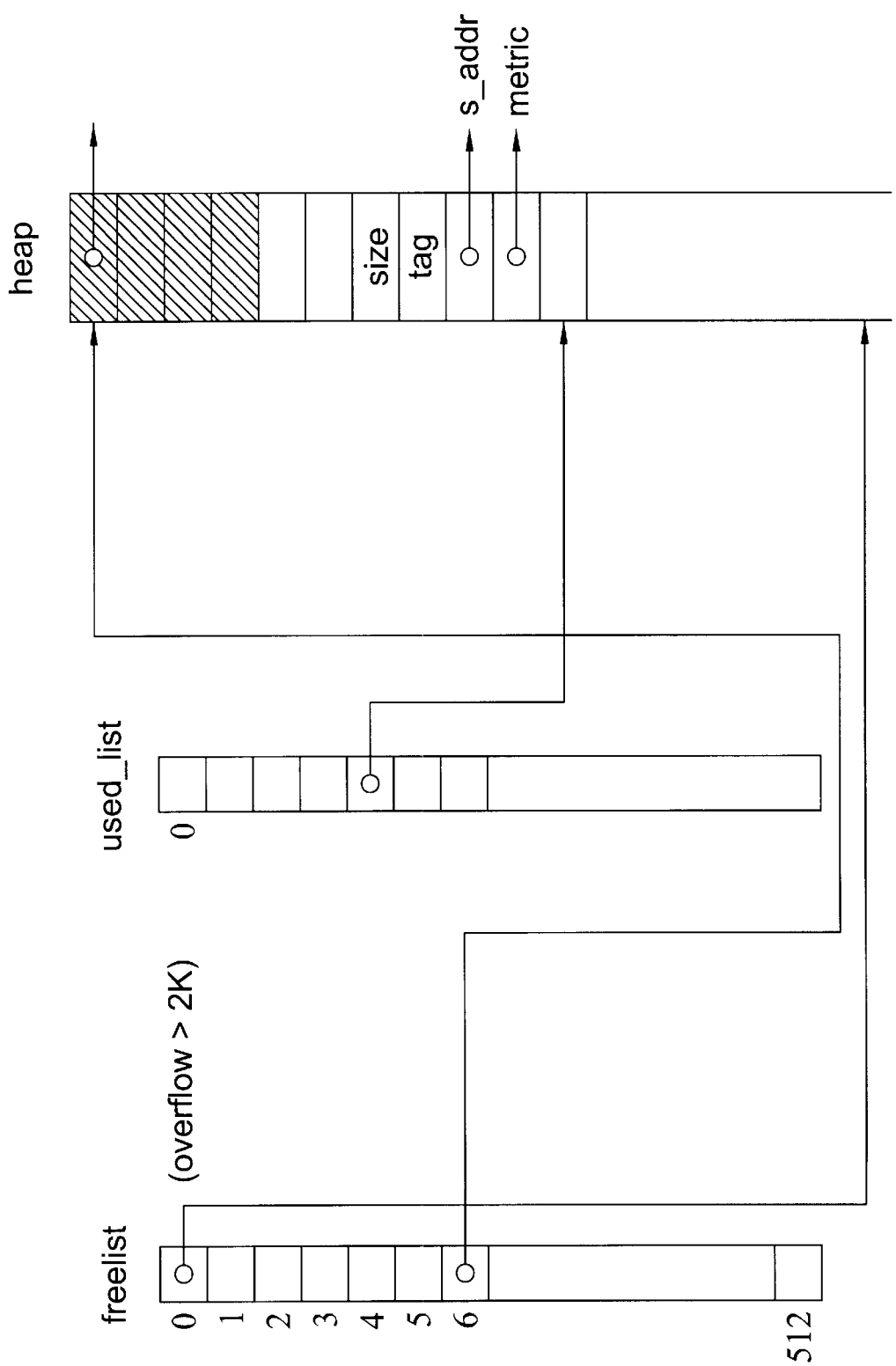
FIG. 33 shows data structures used for dynamic memory management, according to a preferred embodiment of the invention.

FIG. 33 shows data structures used for dynamic memory management, according to a preferred embodiment of the invention. To facilitate checkpointing of data structures allocated on the heap, the memory allocator maintains a used_list, which contains pointers to each allocated memory block. Besides the used_list, the memory block header is extended to also store additional information. For example, a tag, the shadow address s_addr and a pointer to the type metric describing the data type of the heap object can be stored as additional information. These fields of memory block header serve the same purpose as object stack entry fields for runtime stack and data/bss located objects.

Checkpointing the heap involves scanning the used_list and pushing all heap objects on this list onto the shadow stack. Pointers into the heap are resolved by extracting the address range, shadow address and metric information from the memory block header rather than the object stack. Moreover, maintaining the used_list allows for integrating garbage collection of the heap into the checkpointing process.

PREFERRED EMBODIMENTS FOR A METHOD OF RUNTIME SUPPORT FOR POINTERS

Figure 34:
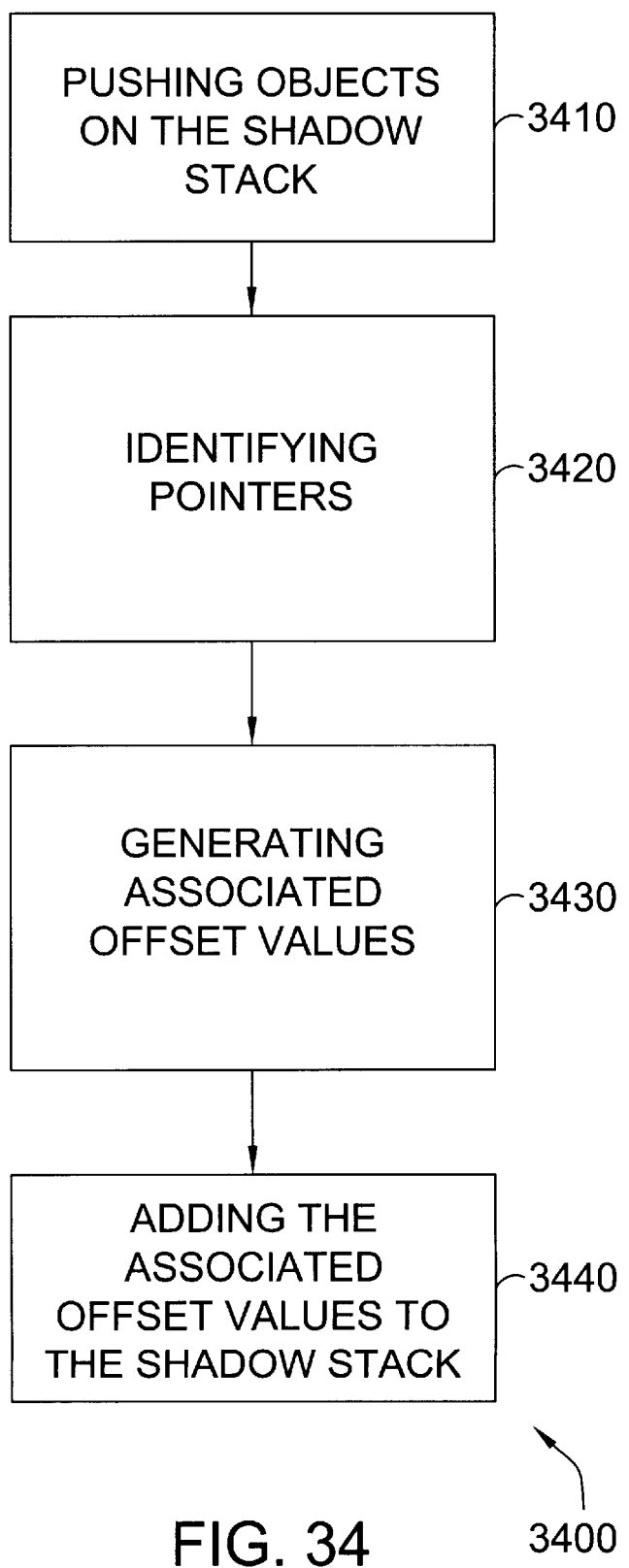
FIG. 34 shows a method for run-time support of pointers during portable checkpointing, according to a preferred embodiment of the invention.

FIG. 34 shows a method 3400 for run-time support of pointers during portable checkpointing, according to a preferred embodiment of the invention. Method 3400 starts with a pushing step 3410 which involves pushing objects on the shadow stack. These objects can be pointers, objects that include pointers (for example, structures that include pointers), objects that can be pointed to by pointers, or other objects.

Method 3400 proceeds from pushing step 3410 to an identifying step 3420 which involves identifying pointers. For example, pointers can easily be identified based upon type declarations made at compile time. The objects that can be pointed to varies depending on the source code language. For example, if the C language is used, virtually any object is an object that can be pointed to. In other languages, provisions can be made at compile time to identify objects that can be pointed to.

Method 3400 proceeds from identifying step 3420 to a generating step 3430 which involves generating an associated offset value for each pointer in the shadow stack. The offset value is the difference between a known value and the location of the object pointed to. There are a variety of different offsets that can be used in accordance with the invention. For example, the offset can be the difference between the location of the pointer in the shadow stack and the location of the object pointed to. As an alternative, the offset can be the difference between the bottom of the shadow stack and the location of the object pointed to. More generally, the offset can be the difference between any known location and the location of the object pointed to.

Method 3400 proceeds from generating step 3430 to an adding step 3440 which involves adding the associated offset values to the shadow stack. For example, the offset can be added to the shadow stack by replacing the pointer in the shadow stack with the address (with appropriate identification in the shadow stack that the added value represents an offset). Alternatively, the offset may be added to the shadow stack without replacing the pointer.

Figure 35:
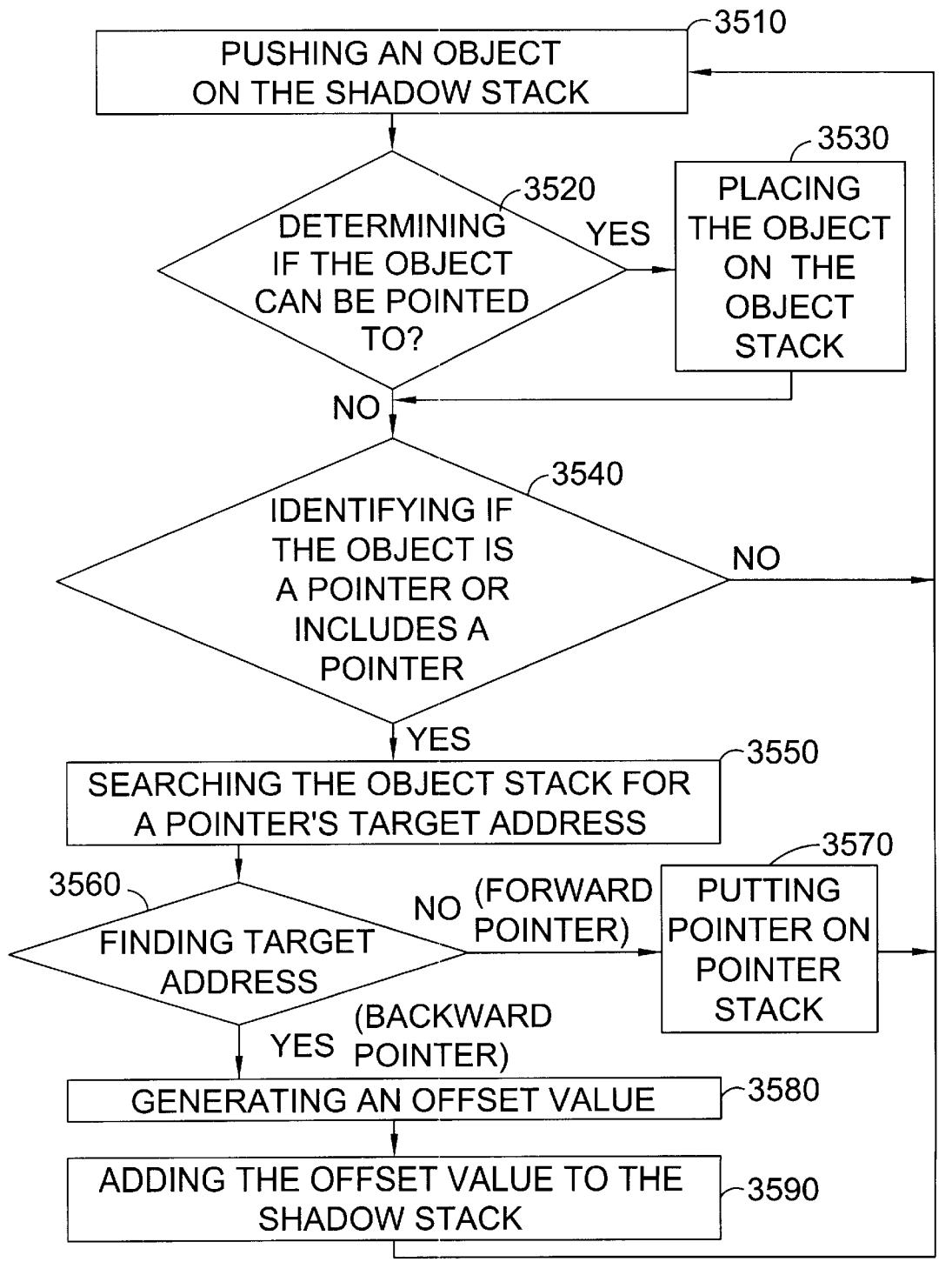
FIG. 35 shows a further method for run-time support of pointers during portable checkpointing, according to a preferred embodiment of the invention.

FIG. 35 shows a further method 3500 for run-time support of pointers during portable checkpointing, according to a preferred embodiment of the invention. Method 3500 begins with a pushing step 3510 which involves pushing an object onto the shadow stack.

Method 3500 proceeds from pushing step 3510 to a determining step 3520 which involves determining if the object can be pointed to. As previously explained, in the C language all objects can be pointed to so that determining step 3520 is not needed. In other languages, determining step 3520 can be based on an identifier generated at compile time as to whether an object can be pointed to.

If the answer to determining step 3520 is yes, method 3500 proceeds from determining step 3520 to a placing step 3530 which involves placing the object on an object stack. The actual object may be placed on the object stack or preferably some form of reference to the object. For example, the address and size of the object in the run-time stack can be placed on the object stack. Alternatively, the address and size of the object in the shadow stack can be placed on the object stack. As a further alternative, some combination of the previous two alternatives can be used.

If the answer to determining step 3520 is no, method 3500 proceeds from determining step 3520 to an identifying step 3540 which involves identifying if the object is a pointer or includes a pointer (for example, the object could be a structure which includes a pointer). As previously discussed, pointers can easily be identified based upon type declarations made at compile time. Method 3500 also proceeds from placing step 3530 to identifying step 3540.

If the object is not identified as a pointer or as including a pointer, then method 3500 returns to pushing step 3510.

If the object is identified as a pointer or as including a pointer, then method 3500 proceeds from identifying step 3540 to a searching step 3550 which involves searching the object stack for the pointer's target address.

Method 3500 proceeds from searching step 3550 to a finding step 3560 which involves determining if the pointer's address is in the object stack. If the answer is no, then the pointer is a forward pointer and method 3500 proceeds from finding step 3560 to a putting step 3570 which involves putting the pointer on a pointer stack. Method 3500 then proceeds from putting step 3570 back to pushing step 3510.

If the pointer's target address is found on the object stack (indicating that the pointer is a backward pointer), then method 3500 proceeds from finding step 3560 to a generating step 3580 which involves generating an offset value.

As previously discussed, there are a variety of different offsets that can be used in accordance with the invention. For example, the offset can be the difference between the location of the pointer in the shadow stack and the location of the object pointed to. As an alternative, the offset can be the difference between the bottom of the shadow stack and the location of the object pointed to. More generally, the offset can be the difference between any known location and the location of the object pointed to.

Method 3500 proceeds from generating step 3580 to an adding step 3590 which involves adding the offset value to the shadow stack. As previously discussed, the offset can be added to the shadow stack by replacing the pointer in the shadow stack with the address (with appropriate identification in the shadow stack that the added value represents an offset). Alternatively, the offset may be added to the shadow stack without replacing the pointer.

Method 3500 proceeds from adding step 3590 back to pushing step 3510 which involves pushing the next object on the shadow stack.

It is well known to those skilled in the art, that the above method can be modified in terms of elimination of certain steps and re-ordering of certain steps. For example, determining step 3520 and identifying step 3540 can be re-ordered so that method 3500 identifies if the object is a pointer prior to determining if the object can be pointed to.

Figure 36:
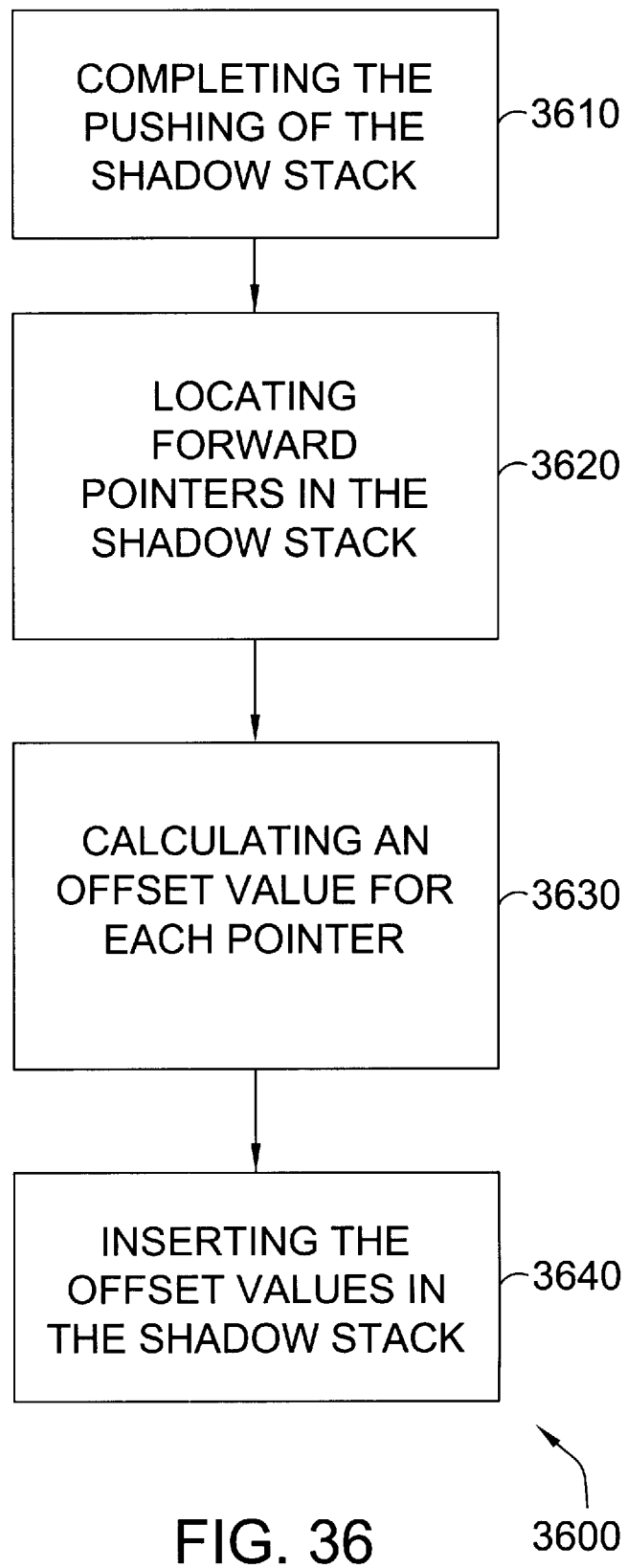
FIG. 36 shows a method for run-time support of forward pointers during portable checkpointing, according to a preferred embodiment of the invention.

FIG. 36 shows a method 3600 for run-time support of forward pointers during portable checkpointing, according to a preferred embodiment of the invention. Method 3600 begins with a completing step 3610 which involves completing the pushing of objects on to the shadow stack.

Method 3600 proceeds from completing step 3610 to a locating step 3620 which involves locating forward pointers in the shadow stack.

Method 3600 proceeds from locating step 3620 to a calculating step 3630 which involves calculating an offset value for each pointer. The alternatives for calculating offset have been previously discussed.

Method 3600 proceeds from calculating step 3630 to an inserting step 3640 which involves inserting the offset values into the shadow stack. As previously discussed, inserting step 3640 can comprise the replacement of the pointers in the shadow stack with the offset values or can comprise not replacing these pointers.

Figure 37:
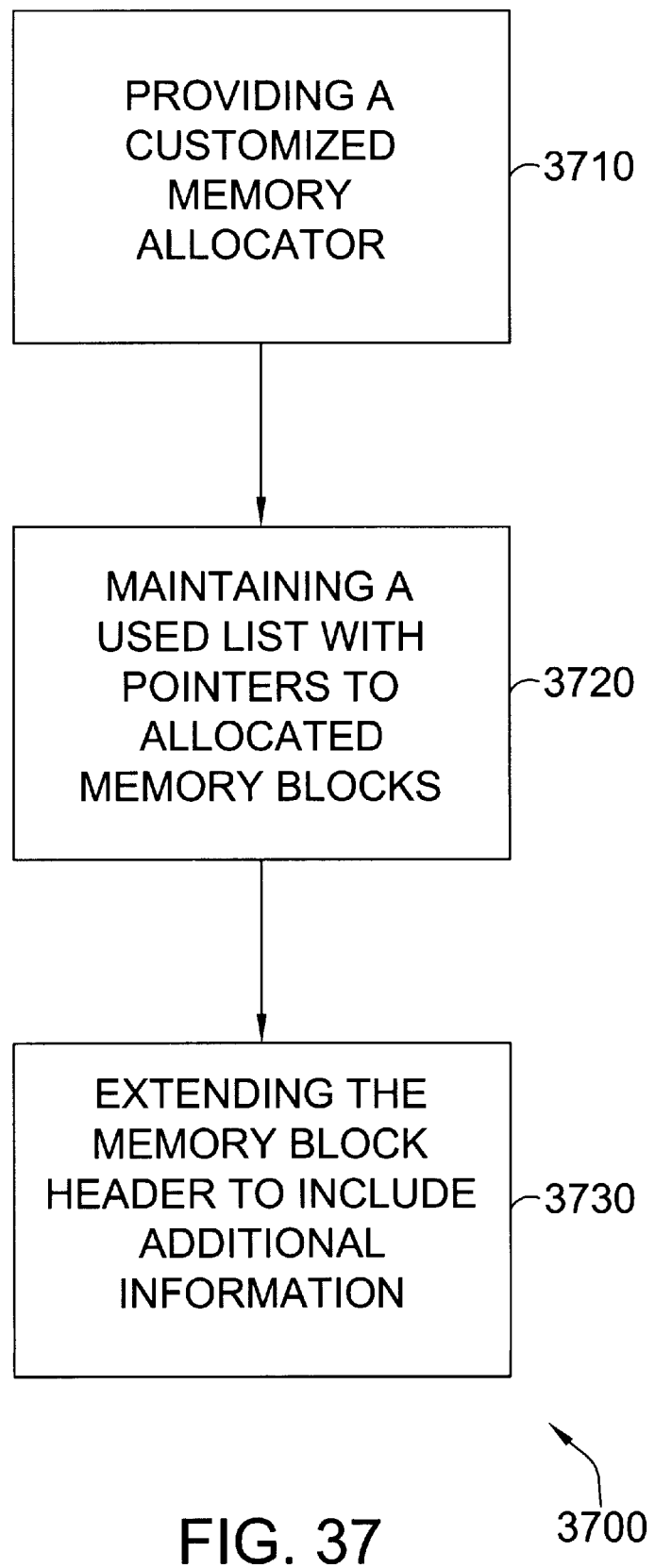
FIG. 37 shows a method for supporting portable checkpointing of heap data structures, according to a preferred embodiment of the invention.

FIG. 37 shows a method 3700 for supporting portable checkpointing of heap data structures, according to a preferred embodiment of the invention. Method 3700 includes a providing step 3710 which involves providing a customized memory allocator to the programmer. For example, if the C programming language is used the customized memory allocator can provide standard memory functions such as malloc, calloc, valloc, realloc, memalign, or free. Method 3720 additionally includes a maintaining step 3720 which involves maintaining a used list with pointers to allocated memory blocks. One possible implementation of the used list was previously discussed. Method 3700 additionally includes an extending step 3730 which involves extending the memory block header to include additional information. For example, this additional information can include a tag, the shadow address, the type metric, etc. It is important to note that there is no required order for the steps of method 3700.

Figure 38:
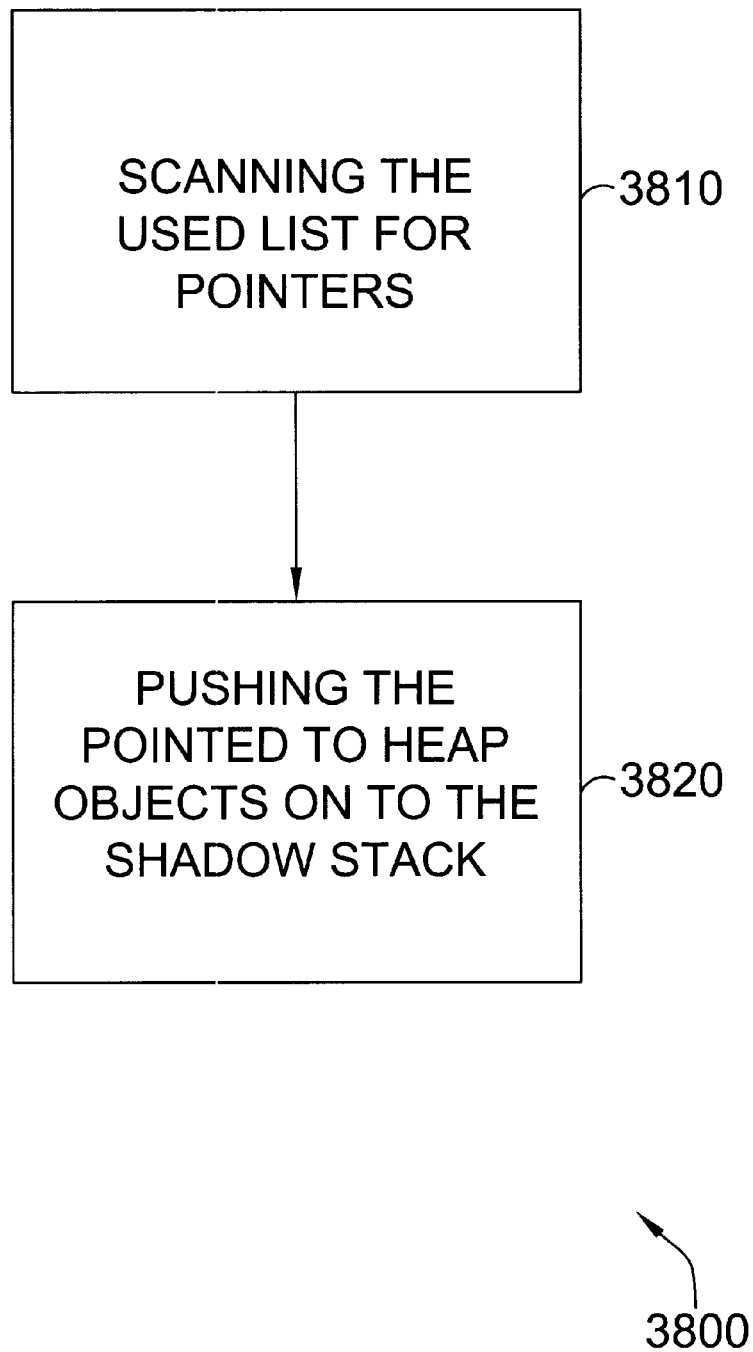
FIG. 38 shows a method for portable checkpointing of heap data structures, according to a preferred embodiment of the invention.

FIG. 38 shows a method 3800 for portable checkpointing of heap data structures, according to a preferred embodiment of the invention. Method 3800 can be used in conjunction with method 3700 which was described above. Method 3800 includes a scanning step 3810 which involves scanning the used list for pointers. Method 3800 additionally includes a pushing step 3820 which involves pushing the pointed to heap objects on to the shadow stack.

LIMITATIONS

The generation of code to save and recover portable checkpoints by means of source-to-source pre-compilation is a powerful and versatile method. However, the approach has its limitations. The following problems will limit any solution for the problem of portable checkpointing of C programs:

Use of non-portable features in programs: If checkpoints are to be portable, it is essential that the programs being checkpointed themselves be portable.

Loss in floating point accuracy due to data representation conversion: This problem can only be addressed by conformance to standards.

Ambiguous type information when generating checkpointing code: If variables, for example, are declared as integers and casted to pointers, the checkpoint is likely to be incorrect. A similar ambiguity arises when interpreting the value of a union via fields of different type. This problem would not arise in programming languages with a strict type system.

Functions with side effects: If a function in a call sequence to a checkpoint causes side effects, and is called in expressions such as if conditions, it may not be possible to instrument such function calls for checkpointing without changing the program semantics. The programmer will need to clean up the code if c2ftc detects such a situation.

CONCLUSIONS

A method for portable checkpointing has been described including the runtime and pre-compiler support needed to implement portable checkpoints. Furthermore, it has been demonstrated that the overhead introduced by portable checkpointing is very low when reasonable checkpoint intervals are chosen, even without hiding the latency of transferring the checkpoint to remote storage. For programs with large checkpoints such as heat or matrix multiplication, network/disk performance is the primary obstacle, compared to which the overhead of saving a checkpoint on the shadow stack is negligible.

A universal checkpoint format (UCF) that permits checkpoints to be ported across UCF-compatible and UCF-incompatible systems has been developed. The overhead of converting checkpoints into a UCF-compatible format on non-UCF machines was found to be negligible except when the frequency of checkpointing was unrealistically high. Checkpoint portability was validated on the three systems reported by checkpointing the program on one system, transferring the checkpoint onto a different system, and successfully resuming the execution there.

The cost of recovery from failures in the method was found to be very low on UCF-compatible machines, and a little higher on UCF-incompatible machines. Our experiments show that the total volume of data that needs to be recovered is the determining factor in recovery cost; the system overhead is very small.

The instrumented versions of the benchmark programs were hand-translated to obtain the data reported in this paper.

The method according to one embodiment of the invention only requires that (1) a user program be submitted to a front-end source-to-source C pre-compiler before compilation on the desired target machine, and (2) the run time library be linked to produce the final executable. It does not limit the choice of compiler or impose any system-specific demands. This makes it easy to render any C program robust in the presence of faults and recoverable on any UNIX-based system.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for portable checkpointing comprising the steps of:
    pre-compiling an input application source code and basic data type conversion functions; and
    outputting an associated output application source code and structure metrics and conversion function source code, wherein the output application source code includes support for portable checkpointing, wherein the portable checkpointing provides at least one portable checkpoint that can be executed on a destination platform that is independent of operating system restrictions and processor restrictions including one of memory page size, firmware byte-ordering and word size.

2. The method for portable checkpointing of claim 1, wherein the basic data type conversion functions include a separate conversion function for each target machine architecture.

3. The method for portable checkpointing of claim 1, wherein the structure metrics and conversion function source code includes code associated to structures in the input application source code.

4. The method for portable checkpointing of claim 1, comprising the further step of:
    compiling the output application source code and structure metrics and conversion function source code to produce application object code and a structure metric and conversion library, respectively.

5. The method for portable checkpointing of claim 4, wherein said compiling step includes compiling shadow library for runtime support source code to produce a shadow library.

6. The method for portable checkpointing of claim 4, comprising the further step of:
    linking the application object code and the structure metric and conversion library to produce application executable code.

7. The method for portable checkpointing of claim 5, comprising the further step of:
    linking the application object code, the structure metric and conversion library, and the shadow library to produce application executable code.

8. The method for portable checkpointing of claim 1, wherein said step of pre-compiling includes the sub-steps of:
    identifying data structures in the input application source code that need to be checkpointed;
    generating a shadow structure; and
    creating a structure metric to store conversion-specific information.

9. The method for portable checkpointing of claim 1, wherein the input application source code includes a general-purpose programming language code.

10. The method for portable checkpointing of claim 1, wherein the input application source code includes C code.

11. A system for portable checkpointing, comprising:
    a marker inserter for receiving original source code, and inserting markers for support of portable checkpointing to produce input source code; and
    a pre-compiler, coupled to said marker inserter, for pre-compiling the input application source code and basic data type conversion functions, and for outputting an associated output application source code and structure metrics and conversion function source code, wherein the output application source code includes support for portable checkpointing, wherein the portable checkpointing provides at least one portable checkpoint that can be executed on a destination platform that is independent of operating system restrictions and processor restrictions including one of memory page size, firmware byte-ordering and word size.

12. A method for generating a structure metric for portable checkpointing, comprising:
    identifying data structures in an input application source code that need to be checkpointed;
    generating a shadow structure; and
    creating a structure metric to store conversion-specific information, wherein the portable checkpointing provides at least one portable checkpoint that can be executed on a destination platform that is independent of operating system restrictions and processor restrictions including one of memory page size, firmware byte-ordering and word size.

13. A method for generating a pre-compiler for portable checkpointing, wherein the portable checkpointing provides at least one portable checkpoint that can be executed on a destination platform that is independent of operating system restrictions and processor restrictions including one of memory page size, firmware byte-ordering and word size, comprising:
    creating pre-compiler source code and architecture-specific configuration files;
    gathering metrics on the architecture-specific configuration files to produce a metric file; and
    compiling the pre-compiler source code and the metric file to generate a pre-compiler.

14. A method for run-time support of pointers during portable checkpointing, wherein the portable checkpointing provides at least one portable checkpoint that can be executed on a destination platform that is independent of operating system restrictions and processor restrictions including one of memory page size, firmware byte-ordering and word size, the method comprising:
    pushing objects on a shadow stack;
    identifying which of the objects include pointers;
    generating an associated offset value for the identified pointers and objects that are pointed to; and
    adding the associated offset value to the shadow stack.

15. The method for run-time support of claim 14, wherein said step of adding comprises replacing the identified pointer with the associated offset value.

16. The method for run-time support of claim 14, further comprising the step of:
    placing objects that can be pointed to on an object stack.

17. The method for run-time support of claim 16, further comprising the step of:
    searching the object stack for a target address of at least one of the identified pointers.

18. The method for run-time support of claim 17, further comprising the steps of:
- finding the identified pointer's target address on the object stack; and
- putting the identified pointer on a pointer stack.

19. The method for run-time support of claim 17, further comprising the step of:
- finding that the identified pointer's target address is not on the object stack.

20. The method for run-time support of claim 16, wherein said step of placing the objects that can be pointed to on the object stack comprises placing object information on the object stack.

21. The method for run-time support of claim 20, wherein the object information includes at least one of an address on a run-time stack, a size on the run-time stack, and an address on the shadow stack.

22. The method for run-time support of claim 14, wherein the associated offset value is the difference between a pointer address on the shadow stack of the pointer and an object address on the shadow stack of the object that is pointed to.

23. The method for run-time support of claim 14, wherein at least one of the objects that includes a pointer is a pointer.

24. The method for run-time support of claim 14, further comprising a step of:
- determining if the object can be pointed to.

25. The method for run-time support of claim 24, wherein said step of determining is based upon compile-time information.

26. A method for run-time support of forward pointers during portable checkpointing, wherein the portable checkpointing provides at least one portable checkpoint that can be executed on a destination platform that is independent of operating system restrictions and processor restrictions including one of memory page size, firmware byte-ordering and word size, the method comprising:
- completing pushing of objects on a shadow stack;
- locating forward pointers in the shadow stack;
- calculating an associated offset value for each forward pointer; and
- inserting the associated offset values in the shadow stack.

27. The method for run-time support of claim 26, wherein said step of inserting comprises replacing the forward pointer with the associated offset value.

28. The method for run-time support of claim 26, wherein the associated offset value is the difference between a pointer address on the shadow stack of the forward pointer and an object address on the shadow stack of an object that is pointed to.

29. A method for supporting portable checkpointing of heap data structures, wherein the portable checkpointing provides at least one portable checkpoint that can be executed on a destination platform that is independent of operating system restrictions and processor restrictions including one of memory page size, firmware byte-ordering and word size, the method comprising:
- providing a customized memory allocator;
- maintaining a used list with pointers to allocated memory blocks; and
- extending a memory block header to include additional information.

30. The method for supporting portable checkpointing of claim 29, wherein the additional information includes at least one of a tag, a shadow address, and a pointer to a type metric.

31. A method for portable checkpointing of heap data structures, comprising:
- scanning a used list for pointers;
- pushing a pointed to heap object on to a shadow stack; and
- performing garbage collection based on said scanning step.

32. A method for run-time support of pointers during portable checkpointing, wherein the portable checkpointing provides at least one portable checkpoint that can be executed on a destination platform that is independent of operating system restrictions and processor restrictions including one of memory page size, firmware byte-ordering and word size, comprising:
- identifying which objects for checkpointing include pointers; and
- generating an associated offset value for the identified pointers and objects that are pointed to.

* * * * *